US012610365B2

(12) United States Patent
Wang et al.

(10) Patent No.: US 12,610,365 B2
(45) Date of Patent: Apr. 21, 2026

(54) METHOD FOR TRANSMITTING DATA ON PHYSICAL UPLINK SHARED CHANNEL, DATA TRANSMISSION METHOD, TERMINAL, NETWORK DEVICE, AND CHIP SYSTEM

(71) Applicant: HUAWEI TECHNOLOGIES CO., LTD., Shenzhen (CN)

(72) Inventors: Mingzhe Wang, Shanghai (CN); Liuliu Ji, Shanghai (CN); Xiang Ren, Shanghai (CN); Haicun Hang, Shanghai (CN); Hongzhe Shi, Shenzhen (CN); Xiaoyan Bi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 595 days.

(21) Appl. No.: 17/889,674

(22) Filed: Aug. 17, 2022

(65) Prior Publication Data

US 2022/0417965 A1 Dec. 29, 2022

Related U.S. Application Data

(63) Continuation of application No. PCT/CN2020/075772, filed on Feb. 18, 2020.

(51) Int. Cl.
| | |
|---|---|
| *H04L 5/00* | (2006.01) |
| *H04B 7/06* | (2006.01) |
| *H04W 72/1268* | (2023.01) |
| *H04W 72/54* | (2023.01) |

(52) U.S. Cl.
CPC ...... *H04W 72/1268* (2013.01); *H04B 7/0639* (2013.01); *H04L 5/0051* (2013.01); *H04W 72/54* (2023.01)

(58) Field of Classification Search
None
See application file for complete search history.

(56) References Cited

U.S. PATENT DOCUMENTS

| | | | |
|---|---|---|---|
| 2018/0167183 A1* | 6/2018 | Zhang | ................. H04B 7/0456 |
| 2019/0140729 A1 | 5/2019 | Zhang et al. | |

(Continued)

FOREIGN PATENT DOCUMENTS

| | | |
|---|---|---|
| CN | 105589506 A | 5/2016 |
| CN | 109565311 A | 4/2019 |

(Continued)

OTHER PUBLICATIONS

Extended European Search Report issued in corresponding European Application No. 20920381.9, dated May 2, 2023, pp. 1-22.

(Continued)

*Primary Examiner* — Minh Trang T Nguyen

(74) *Attorney, Agent, or Firm* — HAUPTMAN HAM, LLP

(57) ABSTRACT

This disclosure provides a method for transmitting data on a physical uplink shared channel, a data transmission method, a terminal, a network device, and a chip system. A terminal receives indication information delivered by a plurality of network devices. The indication information is used to indicate a plurality of precoders (precoders). The terminal determines the plurality of precoders based on the indication information, and repeatedly sends a physical uplink shared channel PUSCH by using the plurality of precoders. Different precoders are used for at least two of the PUSCHs. In this disclosure, the PUSCH is repeatedly sent by using different precoders. This disclosure is applicable to 5G and future wireless networks.

20 Claims, 17 Drawing Sheets

(56)     References Cited

U.S. PATENT DOCUMENTS

| | | | |
|---|---|---|---|
| 2019/0280751 A1 | 9/2019 | Tsai et al. | |
| 2021/0044385 A1* | 2/2021 | Hosseini | H04L 1/1887 |
| 2021/0352665 A1* | 11/2021 | Kang | H04L 1/08 |

FOREIGN PATENT DOCUMENTS

| | | | |
|---|---|---|---|
| CN | 110419188 A | 11/2019 | |
| EP | 3480968 A1 | 5/2019 | |
| WO | 2020019317 A1 | 1/2020 | |

OTHER PUBLICATIONS

NTT Docomo, Inc., Enhancements on multi-TRP/panel transmission. 3GPP TSG RAN WG1 Meeting #95, Spokane, USA, Nov. 12-16, 2018, R1-1813333, 20 pages.

Huawei, HiSilicon, Summary of AI: 7.2.8.2 Enhancements on Multi-TRP/Panel Transmission. 3GPP TSG RAN WGI Meeting #95, Spokane, USA, Nov. 12-16, 2018, R1-1814002, 31 pages.

Partial Supplementary European Search Report issued in corresponding European Application No. 20920381.9, dated Jan. 2, 2023, pp. 1-20.

NTT Docomo, Inc, Enhancements on multi-TRP/panel transmission. 3GPP TSG RAN WG1 #98bis, Chongqing, China, Oct. 14-20, 2019, R1-1911184, 32 pages.

Huawei, HiSilicon, UL SRS design for CSI acquisition and beam management. 3GPP TSG RAN WG1 NR Ad Hoc Meeting, Spokane, USA, Jan. 16-20, 2017, R1-1700074, 8 pages.

International Search Report issued in corresponding International Application No. PCT/CN2020/075772, dated Oct. 30, 2020, pp. 1-9.

* cited by examiner

Codebook based uplink repetition transmission

Time unit 1

Time unit 1                    Time unit 2

Codebook based uplink joint reception

METHOD FOR TRANSMITTING DATA ON PHYSICAL UPLINK SHARED CHANNEL, DATA TRANSMISSION METHOD, TERMINAL, NETWORK DEVICE, AND CHIP SYSTEM

CROSS-REFERENCE TO RELATED APPLICATIONS

This application is a continuation of International Application No. PCT/CN2020/075772, filed on Feb. 18, 2020, the disclosure of which is hereby incorporated by reference in its entirety.

TECHNICAL FIELD

This application relates to the field of communication technologies, and in particular, to a method for transmitting data on a physical uplink shared channel, a data transmission method, a terminal, a network device, and a chip system.

BACKGROUND

With rapid development of mobile communication, in some scenarios, higher requirements are posed on communication reliability. For example, an ultra-reliable low-latency communication (ultra-reliable low-latency communication, URLLC) technology has a reliability requirement of $10^5$ or even higher, which means that at most one error occurs during $10^5$ or more transmissions (bits).

During current physical uplink shared channel (physical uplink shared channel, PUSCH) transmission, a terminal can transmit a maximum of four data streams, and supports two types of transmission schemes: a codebook based (codebook based, CB) uplink transmission scheme (UL transmission scheme) and a non-codebook based (non-codebook based, NCB) uplink transmission scheme (UL transmission scheme). However, how to improve reliability in the two uplink transmission schemes is a technical problem to be resolved urgently.

In addition, in current new radio (New Radio, NR), to improve uplink coverage, a slot aggregation (slot aggregation) transmission scheme is supported. However, in this slot aggregation transmission scheme, it needs to be ensured that a same precoder is used in all slots (slots), and intra-slot (that is, mini-slot-based) transmission cannot be performed. Therefore, if an aggregated slot is very large, and a channel condition is changed in a plurality of aggregated slots or a location of a terminal is changed, one configured precoder may no longer be always applicable in the plurality of aggregated slots. As a result, decoding performance of data received by a network device deteriorates, and consequently, uplink performance of the terminal, especially performance of a cell edge terminal, cannot be ensured, and uplink coverage cannot be improved.

In conclusion, a problem of how to improve PUSCH reliability needs to be resolved urgently.

SUMMARY

This application discloses a method for transmitting data on a physical uplink shared channel, a data transmission method, a terminal, a network device, and a chip system.

According to a first aspect, this application provides a method for transmitting data on a physical uplink shared channel PUSCH. The method includes: A terminal receives indication information delivered by a plurality of network devices, where the indication information is used to indicate a plurality of precoders (precoders). The terminal determines the plurality of precoders based on the indication information, and repeatedly sends a PUSCH by using the plurality of precoders, where different precoders are used for at least two of the PUSCHs.

It can be learned that in the method provided in the first aspect, different precoders may be used to transmit data on the PUSCHs. In an implementation, the plurality of precoders indicated by the indication information may be delivered by one network device to the terminal. In comparison with always using one precoder, the terminal may use different precoders when a channel condition is changed, to ensure transmission decoding performance and improve uplink transmission reliability.

In another implementation, the indication information indicates the plurality of precoders, and the indication information is configured as different quasi-colocation (quasi-colocation, QCL) relationships or different transmission configuration indication (Transmission Configuration Indication, TCI) states. That is, the different precoders correspond to different network devices. The indication information indicating the plurality of precoders may be delivered to the terminal by one network device, or may be separately delivered to the terminal by a plurality of network devices. In this way, the terminal may repeatedly send the PUSCH to different network devices by using different precoders, to implement uplink PUSCH repetition transmission in a multi-station scenario. Different from an existing slot aggregation transmission scheme in which only a single same precoder may be used, different precoders may be used for PUSCH repetition transmission in the multi-station scenario, so that a diversity gain is obtained; and when the terminal moves to different cell coverage areas, the transmission decoding performance can also be ensured, and the uplink transmission reliability can be improved.

In an implementation, before the terminal receives the indication information, the method further includes the following steps: The terminal first receives a plurality of channel state information reference signals (Channel State Information Reference Signals, CSI-RSs) delivered by a plurality of network devices or a plurality of CSI-RSs delivered by one network device, and then the terminal separately performs channel measurement on the plurality of CSI-RSs to obtain a plurality of channel matrices. In this case, the terminal needs to respectively select sounding reference signal precoders (Sounding reference signal precoders, SRS precoders) based on the plurality of channel matrices, then the terminal configures a plurality of sounding reference signal resources (Sounding reference signal resources, SRS resources) based on the plurality of SRS precoders, and then sends sounding reference signals (Sounding reference signals, SRSs).

In comparison with a conventional technology in which the terminal performs measurement based on a CSI-RS delivered by the network device to obtain one SRS precoder, in this technical solution, the channel measurement may be performed based on the plurality of CSI-RSs delivered by the network device, to obtain the plurality of SRS precoders for the network device to select and deliver to the terminal, so as to provide a basis for the terminal to send the PUSCHs by using the different precoders.

In an implementation, the terminal configures the plurality of SRS resources by performing channel measurement based on the plurality of CSI-RSs. In other words, the plurality of SRS resources respectively correspond to the plurality of CSI-RSs.

In an implementation, the plurality of precoders received by the terminal are selected by the network device from the plurality of SRS precoders and indicated by using a sounding reference signal resource indicator (Sounding reference signal resource indicator, SRI) field. The plurality of precoders may be jointly indicated by using one SRI in the SRI field, to be specific, the plurality of precoders selected by the network device are indicated by using the SRI; or may be independently indicated by using a plurality of SRIs in the SRI field, to be specific, different SRIs are used to indicate different precoders.

In an implementation, the plurality of precoders received by the terminal may alternatively be respectively indicated by a plurality of TPMIs in a transmission precoding matrix indicator (Transmission precoding matrix indicator, TPMI) field, and each TPMI corresponds to one precoder; or the plurality of precoders received by the terminal may be separately indicated by one TPMI in a TPMI field, and each TPMI corresponds to a plurality of precoders. To be specific, the plurality of precoders indicated by the TPMI field are respectively determined based on different channel matrices. There are a plurality of implementations in which the TPMI field includes the plurality of TPMIs. For example, a quantity of bits in the TPMI field is increased, so that the quantity of bits in the TPMI field can simultaneously indicate the plurality of TPMIs; a reserved index (index) in a TPMI table (table) is used, so that the reserved index can indicate the plurality of TPMIs; or a new TPMI table is used, so that the TPMI table includes an index (index) that indicates the plurality of TPMIs.

In an implementation, the plurality of SRS resources configured by the terminal may be a plurality of SRS resources in one sounding reference signal resource set (Sounding reference signal resource set, SRS resource set), or may be a plurality of SRS resources in a plurality of SRS resource sets.

When the terminal configures one SRS resource set, one part of SRS resources in the SRS resource set may correspond to one CSI-RS received by the terminal, and the other part of SRS resources may correspond to another CSI-RS received by the terminal. This manner helps maximize utilization of the SRS resources.

When the terminal configures a plurality of SRS resource sets, all SRS resources in one SRS resource set correspond to one CSI-RS, and all SRS resources in another SRS resource set correspond to another CSI-RS. This manner helps maintain compatibility with an existing protocol. Alternatively, a part of SRS resources in one SRS resource set correspond to one CSI-RS, and the other part of SRS resources correspond to another CSI-RS.

In an implementation, the terminal may send the PUSCHs by using a same time domain resource, or may send the PUSCHs by using different time domain resources. To be specific, the terminal may send the PUSCHs at different time domain positions, where the different time domain positions may be different slots, consecutive slots, or different time domain symbols in a same slot.

In an implementation, the terminal may send the PUSCHs by using a same port, or may send the PUSCHs by using different ports, where the port may be an SRS port for sending an SRS, or may be a port for sending a PUSCH.

In an implementation, the terminal may send the PUSCHs by using a same frequency domain resource, or may send the PUSCHs by using different frequency domain resources, where the frequency domain resources may be consecutive or inconsecutive. According to a second aspect, this application further provides a method for transmitting data on a physical uplink shared channel PUSCH. The method includes:

After receiving a plurality of CSI-RSs, a terminal performs joint channel measurement by using the plurality of CSI-RSs, to obtain one or more SRS precoders.

The terminal performs joint channel measurement on the plurality of CSI-RSs; to be specific, considers that a plurality of channel matrices can be combined as a joint channel matrix, and then performs singular value decomposition (singular value decomposition, SVD) on the joint channel matrix to obtain an eigenvector of the joint matrix. The terminal selects a plurality of candidate SRS precoders based on the eigenvector and configures a plurality of SRS resources, and then sends an SRS that carries the plurality of SRS precoders to a network device. Finally, the terminal selects a precoder based on indication information that indicates one or more precoders and that is in an indication delivered by the network device, to send a PUSCH.

The plurality of CSI-RSs are configured as different QCL relationships. In other words, the plurality of CSI-RSs are CSI-RSs from different network devices.

It can be learned that, in the method provided in the second aspect, the uplink SRS precoder used for sounding is determined by using the joint channel matrix, that is, the terminal selects the SRS precoder based on the joint matrix of a plurality of transmission channels. Based on uplink-downlink channel reciprocity, the SRS precoder that is carried in the SRS and that is sent by the terminal to the network device corresponds to channel information obtained by the terminal by performing joint channel measurement. This is equivalent to an increase in a quantity of receive antennas. In addition, due to low correlation of the joint channel matrix, demodulation interference between MIMO antennas is also reduced, and a performance gain of a plurality of antennas is further ensured.

This method implements uplink PUSCH joint reception in a multi-station scenario, improves uplink decoding performance by combining received uplink signals, and improves transmission reliability.

In an implementation, the terminal separately configures the plurality of SRS resources based on the SRS precoder obtained by performing joint channel measurement based on the plurality of CSI-RSs. In other words, the plurality of SRS resources respectively correspond to the plurality of CSI-RSs.

In an implementation, the plurality of SRS resources configured by the terminal may be a plurality of SRS resources in one SRS resource set, or may be a plurality of SRS resources in a plurality of SRS resource sets.

In an implementation, the terminal may repeatedly send the PUSCH. In this scenario, at least two of the plurality of precoders received by the terminal are different. In other words, precoders used for at least two of the PUSCHs sent by the terminal are different.

According to this technical solution, on a basis that the terminal performs joint channel measurement on the plurality of CSI-RSs to obtain the SRS precoder, to provide a condition for the network device to jointly receive the plurality of PUSCHs, different PUSCHs sent to different network devices may be repeatedly transmitted by using different precoders, so that the uplink transmission reliability can be further improved.

In an implementation, the plurality of precoders received by the terminal are selected by the network device from the plurality of SRS precoders and indicated by using an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, the terminal may send the PUSCHs by using a same time domain resource, or may send the PUSCHs by using different time domain resources. To be specific, the terminal may send the PUSCHs at different time domain positions, where the different time domain positions may be different slots, consecutive slots, or different time domain symbols in a same slot.

In an implementation, the terminal may send the PUSCHs by using a same port, or may send the PUSCHs by using different ports, where the port may be an SRS port for sending an SRS, or may be a port for sending a PUSCH.

In an implementation, the terminal may send the PUSCHs by using a same frequency domain resource, or may send the PUSCHs by using different frequency domain resources, where the frequency domain resources may be consecutive or inconsecutive.

According to a third aspect, this application further provides a data transmission method, including:

A network device delivers CSI-RSs to a terminal, and the network device receives a plurality of SRSs, where a plurality of SRS resources for sending the plurality of SRSs correspond to a plurality of SRS precoders obtained by performing channel measurement based on the plurality of CSI-RSs. Then, the network device separately selects appropriate precoders from the plurality of SRS precoders, and finally sends indication information indicating the plurality of precoders.

In an implementation, in a single-station scenario, the network device may send the plurality of CSI-RSs to the terminal. The plurality of CSI-RSs are configured as a same QCL relationship, the indication information that is sent to the terminal and that indicates the plurality of precoders is configured as a same QCL relationship or TCI state, and at least two precoders are different. Different from an existing slot aggregation transmission scheme in which only a single same precoder can be used, different precoders may also be used for PUSCH repetition transmission in the single-station scenario. Therefore, when a channel condition is changed, transmission decoding performance can also be ensured, and uplink transmission reliability in the single-station scenario is improved.

In an implementation, the CSI-RSs sent by the network device and CSI-RSs sent by another network device are separately configured as different QCL relationships. In other words, a plurality of CSI-RSs received by the terminal are CSI-RSs from different network devices.

The network device sends, to the terminal, the indication information indicating the plurality of precoders, so that the terminal can repeatedly send a PUSCH by using the plurality of different precoders, so that uplink PUSCH repetition transmission in a multi-station scenario is implemented. Different from an existing slot aggregation transmission scheme in which only a single same precoder can be used, different precoders may be used for PUSCH repetition transmission in the multi-station scenario. Therefore, when the terminal moves to different cell coverage areas, transmission decoding performance can also be ensured, and uplink transmission reliability is improved.

In an implementation, the indication information that is delivered by the network device and that indicates the plurality of precoders is an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, the network device can further combine soft information of the plurality of PUSCHs, to simultaneously demodulate the plurality of PUSCHs, and combine and decode demodulated soft information, so as to improve a probability of correct uplink decoding.

According to a fourth aspect, this application further provides a data transmission method, including:

A network device receives a plurality of SRSs sent by a terminal, selects a plurality of precoders based on uplink channel states obtained by performing measurement by using the plurality of SRSs, and sends indication information indicating the plurality of precoders.

In the method provided in the fourth aspect, the network device sends, to the terminal, the indication information indicating the plurality of precoders. The indication information is configured as different QCL relationships or different TCI states. In other words, the different precoders correspond to different network devices. Therefore, the terminal can repeatedly send a PUSCH to the different network devices by using the plurality of different precoders, to implement uplink PUSCH repetition transmission in a multi-station scenario. This is different from an existing slot aggregation transmission scheme in which only a single same precoder can be used. Therefore, transmission decoding performance is ensured, and uplink transmission reliability is improved.

In an implementation, the indication information that is delivered by the network device and that indicates the plurality of precoders is a TPMI field. The TPMI field includes a plurality of TPMIs, and each TPMI corresponds to one precoder; or the plurality of precoders are separately indicated by one TPMI in the TPMI field, and each TPMI corresponds to a plurality of precoders. The plurality of precoders indicated by the TPMI field are respectively determined based on different channel matrices. There are a plurality of implementations in which the TPMI field includes the plurality of TPMIs. For example, a quantity of bits in the TPMI field is increased, so that the quantity of bits in the TPMI field can simultaneously indicate the plurality of TPMIs; a reserved index (index) in a TPMI table (table) is used, so that the reserved index can indicate the plurality of TPMIs; or a new TPMI table is used, so that the TPMI table includes an index (index) that indicates the plurality of TPMIs.

In an implementation, the network device may further receive a plurality of repeatedly sent PUSCHs, and precoders used for at least two of the PUSCHs are different.

In an implementation, the network device combines soft information of the plurality of PUSCHs, to simultaneously demodulate the plurality of PUSCHs, and combine and decode demodulated soft information, so as to improve a probability of correct uplink decoding.

According to a fifth aspect, this application further provides a data transmission method: A network device sends CSI-RSs to a terminal, where the CSI-RSs sent by the network device and CSI-RSs sent by another network device are configured as different QCL relationships, to indicate that the CSI-RSs are from different network devices. The network device receives a plurality of SRSs, where a plurality of SRS resources for sending the plurality of SRSs correspond to one or more SRS precoders obtained by performing joint measurement on the CSI-RSs. Then, the network device selects one or more precoders from the SRS precoders based on the plurality of SRSs sent by the terminal, and sends, to the terminal, indication information indicating the one or more precoders.

It can be learned that, in the method provided in the fifth aspect, the uplink SRS precoder used for sounding is determined by using a joint channel matrix, that is, the terminal selects the SRS precoder based on the joint matrix of a plurality of transmission channels. Based on uplink-downlink channel reciprocity, the SRS precoder that is carried in the SRS and that is sent by the terminal to the network device corresponds to channel information obtained by the terminal by performing joint channel measurement. This is equivalent to an increase in a quantity of receive antennas. In addition, due to low correlation of the joint channel matrix, demodulation interference between MIMO antennas is also reduced, and a performance gain of a plurality of antennas is further ensured. This method implements uplink PUSCH joint reception in a multi-station scenario, improves uplink decoding performance by combining received uplink signals, and improves transmission reliability.

In an implementation, the indication information that is delivered by the network device and that indicates the plurality of precoders is an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

According to this technical solution, on a basis that the terminal performs joint channel measurement on the plurality of CSI-RSs to obtain the SRS precoder, to provide a condition for the network device to jointly receive a plurality of PUSCHs, different PUSCHs sent to different network devices may be repeatedly transmitted by using different precoders, so that the uplink transmission reliability can be further improved. In an implementation, the network device may receive the PUSCHs sent by the terminal by using a same time domain resource, or may receive the PUSCHs sent by the terminal by using different time domain resources. To be specific, the network device may receive the PUSCHs at different time domain positions, where different time domain positions may be different slots, consecutive slots, or different time domain symbols in a same slot.

In an implementation, the network device may receive the PUSCHs sent by the terminal by using a same port, or may receive the PUSCHs sent by the terminal by using different ports, where the port may be an SRS port for sending an SRS, or may be a port for sending a PUSCH.

In an implementation, the network device may receive the PUSCHs sent by the terminal by using a same frequency domain resource, or may receive the PUSCHs sent by the terminal by using different frequency domain resources, where the frequency domain resources may be consecutive or inconsecutive.

In an implementation, the network device further combines the plurality of received PUSCHs, and demodulates a combined PUSCH to obtain soft information for decoding.

In an implementation, a same precoder is used for the plurality of PUSCHs received by the network device.

In an implementation, at least two of the plurality of precoders indicated by the indication information are different, and precoders used for at least two of the PUSCHs received by the network device are different.

According to a sixth aspect, this application further provides a data transmission method, including: A network device receives a plurality of SRSs sent by a terminal, performs joint channel measurement based on the plurality of SRSs, selects one or more appropriate precoders, and then sends, to the terminal, indication information indicating the one or more precoders.

It can be learned that, in the method provided in the sixth aspect, the network device performs joint channel measurement based on the plurality of SRSs to obtain an uplink joint channel state, selects the appropriate precoder, and sends the indication information to the terminal. The indication information is configured as different QCL relationships or different TCI states. In other words, the indication information indicating the plurality of precoders may be delivered to the terminal by one network device, or may be separately delivered to the terminal by a plurality of network devices. In this way, PUSCH joint reception in a multi-station scenario is implemented, uplink decoding performance is improved by combining received uplink signals, and transmission reliability is improved.

In an implementation, the network device is further configured to: combine a plurality of received PUSCHs, and demodulate a combined PUSCH to obtain soft information for decoding.

In an implementation, a same precoder is used for the plurality of PUSCHs received by the network device.

In an implementation, at least two of the plurality of precoders indicated by the indication information are different, and precoders used for at least two of the PUSCHs received by the network device are different.

According to a seventh aspect, this application further provides a terminal, and the terminal has a part or all of functions of implementing the terminal in the method example in the first aspect. The function may be implemented by hardware, or may be implemented by hardware executing corresponding software. The hardware or the software includes one or more units or modules corresponding to the function.

In a possible design, a structure of the terminal may include a processing unit and a communication unit. The processing unit is configured to support the terminal in performing a corresponding function in the foregoing method. The communication unit is configured to support the terminal in communicating with another device. The terminal may further include a storage unit, and the storage unit is configured to: be coupled to the processing unit and a sending unit, and store program instructions and data that are necessary for the terminal.

In an implementation, the terminal includes:
a communication unit, configured to receive indication information indicating a plurality of precoders; and
a processing unit, configured to determine the plurality of precoders based on the indication information, where the communication unit is further configured to repeatedly send a PUSCH based on the precoders determined by the processing unit; and
precoders used for at least two of the PUSCHs are different.

For example, the processing unit may be a processor, the communication unit may be a transceiver, and the storage unit may be a memory.

In an implementation, the terminal includes:
a transceiver, configured to receive indication information indicating a plurality of precoders; and
a processor, configured to determine the plurality of precoders based on the indication information, where the transceiver is further configured to repeatedly send a PUSCH based on the precoders determined by the processor, where precoders used for at least two of the PUSCHs are different.

In an implementation, the indication information indicates the plurality of precoders, and the indication information is configured as different QCL relationships or TCI states. That is, the different precoders correspond to different network devices.

In an implementation, before the transceiver receives the indication information, the transceiver first receives a plurality of CSI-RSs delivered by a plurality of network devices or a plurality of CSI-RSs delivered by one network device, and then the processor respectively performs channel measurement on the plurality of CSI-RSs to obtain a plurality of channel matrices. In this case, the processor needs to respectively select SRS precoders based on the plurality of channel matrices, then configures a plurality of SRS resources based on the plurality of SRS precoders, and sends a plurality of SRSs by using the transceiver.

In an implementation, the plurality of SRS resources are respectively configured by the processor based on the SRS precoders obtained by performing channel measurement on the plurality of CSI-RSs. In other words, the plurality of SRS resources respectively correspond to the plurality of CSI-RSs.

In an implementation, the plurality of precoders received by the transceiver are selected by the network device from the plurality of SRS precoders and indicated by using an SRI field. The plurality of precoders may be jointly indicated by using one SRI in the SRI field, to be specific, all the plurality of precoders selected by the network device are indicated by using the SRI; or may be independently indicated by using a plurality of SRIs in the SRI field, to be specific, different SRIs are used to indicate different precoders.

In an implementation, the plurality of precoders received by the transceiver may alternatively be respectively indicated by a plurality of TPMIs in a TPMI field, and each TPMI corresponds to one precoder; or the plurality of precoders may be separately indicated by one TPMI in a TPMI field, and each TPMI corresponds to a plurality of precoders. To be specific, the plurality of precoders indicated by the TPMI field are respectively determined based on different channel matrices. There are a plurality of implementations in which the TPMI field includes the plurality of TPMIs. For example, a quantity of bits in the TPMI field is increased, so that the quantity of bits in the TPMI field can simultaneously indicate the plurality of TPMIs; a reserved index (index) in a TPMI table (table) is used, so that the reserved index can indicate the plurality of TPMIs; or a new TPMI table is used, so that the TPMI table includes an index (index) that indicates the plurality of TPMIs.

In an implementation, the plurality of SRS resources configured by the processor may be a plurality of SRS resources in one SRS resource set, or may be a plurality of SRS resources in a plurality of SRS resource sets.

In an implementation, the transceiver may send the PUSCHs by using a same time domain resource, or may send the PUSCHs by using different time domain resources. To be specific, the transceiver may send the PUSCHs at different time domain positions, where the different time domain positions may be different slots, consecutive slots, or different time domain symbols in a same slot.

In an implementation, the transceiver may send the PUSCHs by using a same port, or may send the PUSCHs by using different ports, where the port may be an SRS port for sending an SRS, or may be a port for sending a PUSCH.

In an implementation, the transceiver may send the PUSCHs by using a same frequency domain resource, or may send the PUSCHs by using different frequency domain resources, where the frequency domain resources may be consecutive or inconsecutive.

In an implementation, the processor can further combine soft information of the plurality of PUSCHs, to simultaneously demodulate the plurality of PUSCHs, and combine and decode demodulated soft information, so as to improve a probability of correct uplink decoding.

According to an eighth aspect, this application further provides a terminal, and the terminal has a part or all of functions of implementing the terminal in the method example in the second aspect. The function may be implemented by hardware, or may be implemented by hardware executing corresponding software. The hardware or the software includes one or more units or modules corresponding to the function.

In a possible design, a structure of the terminal may include a processing unit and a communication unit. The processing unit is configured to support the terminal in performing a corresponding function in the foregoing method. The communication unit is configured to support the terminal in communicating with another device. The terminal may further include a storage unit, and the storage unit is configured to: be coupled to the processing unit and a sending unit, and store program instructions and data that are necessary for the terminal.

In an implementation, the terminal includes:

a communication unit, configured to receive a plurality of CSI-RSs; and a processing unit, configured to perform joint channel measurement based on the plurality of received CSI-RSs, to obtain one or more SRS precoders, where the processing unit is further configured to configure a plurality of SRS resources based on the SRS precoder;

the communication unit is further configured to send a plurality of SRSs on the plurality of SRS resources;

the communication unit is further configured to receive indication information indicating one or more precoders;

the processing unit is further configured to determine the one or more precoders based on the indication information; and the communication unit is further configured to send a PUSCH based on the one or more precoders determined by the processing unit.

For example, the processing unit may be a processor, the communication unit may be a transceiver, and the storage unit may be a memory.

In an implementation, the terminal includes:

a transceiver, configured to receive a plurality of CSI-RSs; and a processor, configured to perform joint channel measurement based on the plurality of received CSI-RSs, to obtain one or more SRS precoders, where the processor is further configured to configure a plurality of SRS resources based on the SRS precoder;

the transceiver is further configured to send a plurality of SRSs on the plurality of SRS resources;

the transceiver is further configured to receive indication information indicating one or more precoders;

the processor is further configured to determine the one or more precoders based on the indication information; and the transceiver is further configured to send a PUSCH based on the one or more precoders determined by the processor.

The plurality of CSI-RSs are configured as different QCL relationships. In other words, the plurality of CSI-RSs are CSI-RSs from different network devices.

In an implementation, the processor separately configures the plurality of SRS resources based on the SRS precoder obtained by performing joint channel measurement based on the plurality of CSI-RSs. In other words, the plurality of SRS resources respectively correspond to the plurality of CSI-RSs.

In an implementation, the plurality of SRS resources configured by the processor may be a plurality of SRS resources in one SRS resource set, or may be a plurality of SRS resources in a plurality of SRS resource sets. In an implementation, at least two of the plurality of precoders received by the transceiver are different. In other words, precoders used for at least two of the PUSCHs sent by the transceiver are different.

According to this technical solution, on a basis that the processor performs joint channel measurement on the plurality of CSI-RSs to obtain the SRS precoder, to provide a condition for the network device to jointly receive a plurality of PUSCHs, different PUSCHs sent to different network devices may be repeatedly transmitted by using different precoders, so that uplink transmission reliability can be further improved. In an implementation, the plurality of precoders received by the transceiver are selected by the network device from the plurality of SRS precoders and indicated by using an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, the transceiver may send the PUSCHs by using a same time domain resource, or may send the PUSCHs by using different time domain resources. To be specific, the terminal may send the PUSCHs at different time domain positions, where the different time domain positions may be different slots, consecutive slots, or different time domain symbols in a same slot.

In an implementation, the transceiver may send the PUSCHs by using a same port, or may send the PUSCHs by using different ports, where the port may be an SRS port for sending an SRS, or may be a port for sending a PUSCH.

In an implementation, the transceiver may send the PUSCHs by using a same frequency domain resource, or may send the PUSCHs by using different frequency domain resources, where the frequency domain resources may be consecutive or inconsecutive.

In an implementation, the processor can further combine soft information of the plurality of PUSCHs, to simultaneously demodulate the plurality of PUSCHs, and combine and decode demodulated soft information, so as to improve a probability of correct uplink decoding.

According to a ninth aspect, this application further provides a network device. The network device has a part or all of functions of implementing the network device in the method example in the third aspect. The function may be implemented by hardware, or may be implemented by hardware executing corresponding software. The hardware or the software includes one or more units or modules corresponding to the function.

In a possible design, a structure of the network device may include a processing unit and a communication unit. The communication unit is configured to support the network device in performing a corresponding function in the foregoing method. The communication unit is configured to support the network device in communicating with another device. The network device may further include a storage unit. The storage unit is configured to: be coupled to an obtaining unit and a sending unit, and store program instructions and data that are necessary for the network device.

In an implementation, the network device includes:

a communication unit, configured to send a plurality of CSI-RSs, where the communication unit is configured to receive a plurality of SRSs, where the plurality of SRSs correspond to a plurality of SRS precoders obtained by performing channel measurement based on the CSI-RSs, that is, the plurality of SRSs correspond to the plurality of SRS precoders, and the plurality of SRSs are obtained by performing channel measurement based on the CSI-RSs; and a processing unit, configured to select a plurality of precoders from the plurality of SRS precoders based on the SRSs, where the communication unit is configured to send indication information indicating the plurality of precoders.

In an example, the communication unit may be a transceiver, the storage unit may be a memory, and the processing unit may be a processor. In an implementation, the network device includes:

a transceiver, configured to send a plurality of CSI-RSs, where the transceiver is configured to receive a plurality of SRSs, where the plurality of SRSs correspond to a plurality of SRS precoders obtained by performing channel measurement based on the CSI-RSs, that is, the plurality of SRSs correspond to the plurality of SRS precoders, and the plurality of SRSs are obtained by performing channel measurement based on the CSI-RSs; and a processor, configured to select a plurality of precoders from the plurality of SRS precoders based on the SRSs, where the transceiver is configured to send indication information indicating the plurality of precoders.

The plurality of CSI-RSs are configured as different QCL relationships. In other words, the plurality of CSI-RSs are CSI-RSs from different network devices.

In an implementation, the indication information that is delivered by the transceiver and that indicates the plurality of precoders is an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, the transceiver may further receive a plurality of repeatedly sent PUSCHs, and precoders used for at least two of the PUSCHs are different.

In an implementation, the processor is further configured to combine soft information of the plurality of PUSCHs, to simultaneously demodulate the plurality of PUSCHs, and combine and decode demodulated soft information, so as to improve a probability of correct uplink decoding.

According to a tenth aspect, this application further provides a network device. The network device has a part or all of functions of implementing the network device in the method example in the fourth aspect. The function may be implemented by hardware, or may be implemented by hardware executing corresponding software. The hardware or the software includes one or more units or modules corresponding to the functions.

In a possible design, a structure of the network device may include a processing unit and a communication unit. The communication unit is configured to support the network device in performing a corresponding function in the foregoing method. The communication unit is configured to support the network device in communicating with another device. The network device may further include a storage unit. The storage unit is configured to: be coupled to an obtaining unit and a sending unit, and store program instructions and data that are necessary for the network device.

In an implementation, the network device includes:

a communication unit, configured to receive a plurality of SRSs; and a processing unit, configured to: obtain uplink channel states by performing measurement based on the plurality of received SRSs, and select a plurality of precoders based on the uplink channel states, where the communication unit is configured to send indication information indicating the plurality of precoders.

In an example, the communication unit may be a transceiver, the storage unit may be a memory, and the processing unit may be a processor.

In an implementation, the network device includes:

a transceiver, configured to receive a plurality of SRSs; and a processor, configured to: obtain uplink channel states by performing measurement based on the plurality of received SRSs, and select a plurality of precoders based on the uplink channel states, where the transceiver is configured to send indication information indicating the plurality of precoders.

In an implementation, the indication information sent by the network device and indication information sent by another network device are separately configured as different QCL relationships or different TCI states, to indirectly indicate that the different precoders correspond to different network devices.

In an implementation, the indication information that is delivered by the transceiver and that indicates the plurality of precoders is a TPMI field. The TPMI field includes a plurality of TPMIs, and each TPMI corresponds to one precoder; or the plurality of precoders are separately indicated by one TPMI in the TPMI field, and each TPMI corresponds to a plurality of precoders. The plurality of precoders indicated by the TPMI field are respectively determined based on different channel matrices. There are a plurality of implementations in which the TPMI field includes the plurality of TPMIs. For example, a quantity of bits in the TPMI field is increased, so that the quantity of bits in the TPMI field can simultaneously indicate the plurality of TPMIs; a reserved index (index) in a TPMI table (table) is used, so that the reserved index can indicate the plurality of TPMIs; or a new TPMI table is used, so that the TPMI table includes an index (index) that indicates the plurality of TPMIs. In an implementation, the network device may further receive a plurality of repeatedly sent PUSCHs, and precoders used for at least two of the PUSCHs are different.

In an implementation, the processor combines soft information of the plurality of PUSCHs, to simultaneously demodulate the plurality of PUSCHs, and combines and decodes demodulated soft information, so as to improve a probability of correct uplink decoding.

According to an eleventh aspect, this application further provides a network device. The network device has a part or all of functions of implementing the network device in the method example in the fifth aspect. The function may be implemented by hardware, or may be implemented by hardware executing corresponding software. The hardware or the software includes one or more units or modules corresponding to the function.

In a possible design, a structure of the network device may include a processing unit and a communication unit. The communication unit is configured to support the network device in performing a corresponding function in the foregoing method. The communication unit is configured to support the network device in communicating with another device. The network device may further include a storage unit. The storage unit is configured to: be coupled to an obtaining unit and a sending unit, and store program instructions and data that are necessary for the network device.

In an implementation, the network device includes:

a communication unit, configured to send CSI-RSs, where the communication unit is configured to receive a plurality of SRSs, where the plurality of SRSs correspond to one or more SRS precoders obtained by performing joint channel measurement on the CSI-RSs; and a processing unit, configured to select one or more SRS precoders from the plurality of SRS precoders based on the plurality of SRSs, where the communication unit is configured to send indication information indicating the one or more SRS precoders.

In an example, the communication unit may be a transceiver, the storage unit may be a memory, and the processing unit may be a processor. In an implementation, the network device includes:

a transceiver, configured to send CSI-RSs, where the transceiver is configured to receive a plurality of SRSs, where the plurality of SRSs correspond to one or more SRS precoders obtained by performing joint channel measurement based on the CSI-RSs; and a processor, configured to select one or more precoders from the plurality of SRS precoders based on the plurality of SRSs, where the transceiver is configured to send indication information indicating the one or more precoders.

The plurality of CSI-RSs are configured as different QCL relationships, to indicate that the CSI-RSs are from different network devices.

In an implementation, the indication information that is delivered by the transceiver and that indicates the plurality of precoders is an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, at least two of the plurality of precoders received by the transceiver are different. Precoders used for at least two PUSCHs sent by a terminal are different.

According to this technical solution, on a basis that the processor performs joint channel measurement on the plurality of CSI-RSs to obtain the SRS precoder, to provide a condition for the processor to jointly receive a plurality of PUSCHs, different PUSCHs sent to different processors may be repeatedly transmitted by using different precoders, so that uplink transmission reliability can be further improved.

In an implementation, the transceiver may receive the PUSCHs sent by the terminal by using a same time domain resource, or may receive the PUSCHs sent by the terminal by using different time domain resources. To be specific, the transceiver may receive the PUSCHs at different time domain positions, where the different time domain positions may be different slots, consecutive slots, or different time domain symbols in a same slot.

In an implementation, the transceiver may receive the PUSCHs sent by the terminal by using a same port, or may receive the PUSCHs sent by the terminal by using different ports, where the port may be an SRS port for sending an SRS, or may be a port for sending a PUSCH.

In an implementation, the transceiver may receive the PUSCHs sent by the terminal by using a same frequency domain resource, or may receive the PUSCHs sent by the terminal by using different frequency domain resources, where the frequency domain resources may be consecutive or inconsecutive.

In an implementation, the transceiver further combines the plurality of received PUSCHs, and demodulates a combined PUSCH to obtain soft information for decoding.

In an implementation, a same precoder is used for the plurality of PUSCHs received by the transceiver.

In an implementation, at least two of the plurality of precoders indicated by the indication information are different, and precoders used for at least two of the PUSCHs received by the transceiver are different.

According to a twelfth aspect, this application further provides a network device. The network device has a part or all of functions of implementing the network device in the method example in the sixth aspect. The function may be implemented by hardware, or may be implemented by hardware executing corresponding software. The hardware or the software includes one or more units or modules corresponding to the function.

In a possible design, a structure of the network device may include a processing unit and a communication unit. The communication unit is configured to support the network device in performing a corresponding function in the foregoing method. The communication unit is configured to support the network device in communicating with another device. The network device may further include a storage unit. The storage unit is configured to: be coupled to an obtaining unit and a sending unit, and store program instructions and data that are necessary for the network device.

In an implementation, the network device includes:

a communication unit, configured to receive a plurality of SRSs; and a processing unit, configured to perform joint channel measurement based on the plurality of SRSs, where the processing unit is configured to select one or more precoders based on a joint channel measurement result; and the communication unit is configured to send indication information indicating the one or more precoders.

In an example, the communication unit may be a transceiver, the storage unit may be a memory, and the processing unit may be a processor. In an implementation, the network device includes:

a transceiver, configured to receive a plurality of SRSs; and a processor, configured to perform joint channel measurement based on the plurality of SRSs, where the processor is configured to select one or more precoders based on a joint channel measurement result; and the transceiver is configured to send indication information indicating the one or more precoders.

In an implementation, the processor performs joint channel measurement based on the plurality of SRSs to obtain an uplink joint channel state, selects the appropriate precoder, and sends the indication information to a terminal. The indication information is configured as different QCL relationships or different TCI states. In other words, the indication information indicating the plurality of precoders may be delivered to the terminal through one interface, or may be separately delivered to the terminal through a plurality of interfaces.

In an implementation, at least two of the plurality of precoders received by the transceiver are different.

In an implementation, the processor can further combine soft information of the plurality of PUSCHs, to simultaneously demodulate the plurality of PUSCHs, and combine and decode demodulated soft information, so as to improve a probability of correct uplink decoding.

According to a thirteenth aspect, this application provides a chip system. The chip system includes a processor and an interface, to support a terminal in implementing a function in the first aspect, for example, determining or processing at least one of data and information in the foregoing method.

In a possible design, the chip system further includes a memory. The memory is configured to store program instructions and data that are necessary for the terminal device. The chip system may include a chip; or may include a chip and another discrete component.

In an implementation, the chip system includes at least one processor and an interface.

The interface is configured to input indication information indicating a plurality of precoders.

The processor is configured to determine the plurality of precoders based on the indication information.

The interface is further configured to output repeatedly sent physical uplink shared channels PUSCHs based on the plurality of precoders determined by the processor, where precoders used for at least two of the PUSCHs are different.

In an implementation, the indication information indicates the plurality of precoders, and the indication information is configured as different QCL relationships or TCI states. That is, the different precoders correspond to different network devices.

In an implementation, before the interface inputs the indication information, the following steps are further included: The interface first inputs a plurality of CSI-RSs delivered by a plurality of network devices or a plurality of CSI-RSs delivered by one network device, and then the processor respectively performs channel measurement on the plurality of CSI-RSs to obtain a plurality of channel matrices. In this case, the processor needs to respectively select SRS precoders based on the plurality of channel matrices, then the processor configures a plurality of SRS resources based on the plurality of SRS precoders, and sends a plurality of SRSs.

In an implementation, the plurality of SRS resources are respectively configured by the processor based on the SRS precoders obtained by performing channel measurement on the plurality of CSI-RSs. In other words, the plurality of SRS resources respectively correspond to the plurality of CSI-RSs.

In an implementation, the plurality of precoders input from the interface are selected by the network device from the plurality of SRS precoders and indicated by using an SRI field. The plurality of precoders may be jointly indicated by using one SRI in the SRI field, to be specific, all the plurality of precoders selected by the network device are indicated by using the SRI; or may be independently indicated by using a plurality of SRIs in the SRI field, to be specific, different SRIs are used to indicate different precoders.

In an implementation, the plurality of precoders input from the interface may alternatively be respectively indicated by a plurality of TPMIs in a TPMI field, and each TPMI corresponds to one precoder; or the plurality of precoders may be separately indicated by one TPMI in a TPMI field, and each TPMI corresponds to a plurality of precoders. To be specific, the plurality of precoders indicated by the TPMI field are respectively determined based on different channel matrices. There are a plurality of implementations in which the TPMI field includes the plurality of TPMIs. For example, a quantity of bits in the TPMI field is increased, so that the quantity of bits in the TPMI field can simultaneously indicate the plurality of TPMIs; a reserved index (index) in a TPMI table (table) is used, so that the reserved index can indicate the plurality of TPMIs; or a new TPMI table is used, so that the TPMI table includes an index (index) that indicates the plurality of TPMIs.

In an implementation, the plurality of SRS resources configured by the processor may be a plurality of SRS resources in one SRS resource set, or may be a plurality of SRS resources in a plurality of SRS resource sets.

In an implementation, the PUSCHs output from the interface may be sent by using a same time domain resource or different time domain resources. To be specific, the PUSCHs may be sent at different time domain positions, where the different time domain positions may be different slots, consecutive slots, or different time domain symbols in a same slot.

In an implementation, the PUSCHs output from the interface may be sent by using a same port or different ports, where the port may be an SRS port for sending an SRS, or may be a port for sending a PUSCH.

In an implementation, the PUSCHs output from the interface may be sent by using a same frequency domain resource or different frequency domain resources, where the frequency domain resources may be consecutive or inconsecutive.

In an implementation, the processor can further combine soft information of the plurality of PUSCHs, to simultaneously demodulate the plurality of PUSCHs, and combine and decode demodulated soft information, so as to improve a probability of correct uplink decoding.

According to a fourteenth aspect, this application provides a chip system. The chip system includes a processor and an interface, to support a terminal in implementing a function in the second aspect, for example, determining or processing at least one of data and information in the foregoing method. In a possible design, the chip system further includes a memory. The memory is configured to store program instructions and data that are necessary for the terminal device. The chip system may include a chip; or may include a chip and another discrete component.

In an implementation, the chip system includes at least one processor and an interface.

The interface is configured to input a plurality of channel state information reference signals CSI-RSs.

The processor is configured to perform joint channel measurement based on the plurality of input CSI-RSs, to obtain one or more sounding reference signal precoders SRS precoders.

The processor is further configured to configure a plurality of sounding reference signal resources SRS resources based on the SRS precoder.

The interface is further configured to output a plurality of sounding reference signals SRSs sent on the plurality of SRS resources.

The interface is further configured to input indication information indicating one or more precoders (precoders).

The processor is further configured to determine the one or more precoders based on the indication information.

The interface is further configured to output a physical uplink shared channel PUSCH sent based on the one or more precoders determined by the processor.

The plurality of CSI-RSs are configured as different QCL relationships. In other words, the plurality of CSI-RSs are CSI-RSs from different network devices.

In an implementation, the processor separately configures the plurality of SRS resources based on the SRS precoder obtained by performing joint channel measurement based on the plurality of CSI-RSs. In other words, the plurality of SRS resources respectively correspond to the plurality of CSI-RSs.

In an implementation, the plurality of SRS resources configured by the processor may be a plurality of SRS resources in one SRS resource set, or may be a plurality of SRS resources in a plurality of SRS resource sets. In an implementation, at least two of the plurality of precoders input from the interface are different. In other words, precoders used for at least two of the PUSCHs sent by the terminal are different.

According to this technical solution, on a basis that the processor performs joint channel measurement on the plurality of CSI-RSs to obtain the SRS precoder, to provide a condition for the network device to jointly receive a plurality of PUSCHs, different PUSCHs sent to different network devices may be repeatedly transmitted by using different precoders, so that uplink transmission reliability can be further improved.

In an implementation, the plurality of precoders input from the interface are selected by the network device from the plurality of SRS precoders and indicated by using an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, the interface may output the PUSCHs by using a same time domain resource, or may output the PUSCHs by using different time domain resources. To be specific, the interface may output the PUSCHs at different time domain positions, where the different time domain positions may be different slots, consecutive slots, or different time domain symbols in a same slot.

In an implementation, the interface may output the PUSCHs by using a same port, or may output the PUSCHs by using different ports, where the port may be an SRS port for sending an SRS, or may be a port for sending a PUSCH.

In an implementation, the interface may output the PUSCHs by using a same frequency domain resource, or may output the PUSCHs by using different frequency domain resources, where the frequency domain resources may be consecutive or inconsecutive.

In an implementation, the processor can further combine soft information of the plurality of PUSCHs, to simultaneously demodulate the plurality of PUSCHs, and combine and decode demodulated soft information, so as to improve a probability of correct uplink decoding.

According to a fifteenth aspect, this application provides a chip system. The chip system includes a processor and an interface, to support a network device in implementing a function in the third aspect, for example, determining or processing at least one of data and information in the foregoing method. In a possible design, the chip system further includes a memory. The memory is configured to store program instructions and data that are necessary for the network device. The chip system may include a chip; or may include a chip and another discrete component.

In an implementation, the chip system includes at least one processor and an interface.

The interface is configured to output a plurality of channel state information reference signals CSI-RSs.

The interface is configured to input a plurality of sounding reference signals SRSs, where sounding reference signal resources SRS resources for sending the plurality of SRSs correspond to a plurality of sounding reference signal precoders SRS precoders obtained by performing channel measurement based on the CSI-RSs.

The processor is configured to select a plurality of precoders (precoders) from the plurality of SRS precoders based on the SRSs.

The interface is configured to output indication information indicating the plurality of SRS precoders.

The plurality of CSI-RSs are configured as different QCL relationships. In other words, the plurality of CSI-RSs are CSI-RSs from different network devices.

In an implementation, the indication information that is output from the interface and that indicates the plurality of precoders is an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, a plurality of repeatedly sent PUSCHs may further be input from the interface, and precoders used for at least two of the PUSCHs are different.

In an implementation, the processor can further combine soft information of the plurality of PUSCHs, to simultaneously demodulate the plurality of PUSCHs, and combine and decode demodulated soft information, so as to improve a probability of correct uplink decoding.

According to a sixteenth aspect, this application provides a chip system. The chip system includes a processor and an interface, to support a network device in implementing a function in the fourth aspect, for example, determining or processing at least one of data and information in the foregoing method. In a possible design, the chip system further includes a memory. The memory is configured to store program instructions and data that are necessary for the network device. The chip system may include a chip; or may include a chip and another discrete component.

In an implementation, the chip system includes at least one processor and an interface.

The interface is configured to input a plurality of SRSs.

The processor is configured to: obtain uplink channel states by performing measurement based on the plurality of input SRSs, and select a plurality of precoders based on the uplink channel states.

The interface is configured to output indication information indicating the plurality of precoders.

In an implementation, the indication information is configured as different QCL relationships or TCI states. That is, the different precoders correspond to different network devices.

In an implementation, the indication information that is output from the interface and that indicates the plurality of precoders is a TPMI field. The TPMI field includes a plurality of TPMIs, and each TPMI corresponds to one precoder; or the plurality of precoders are separately indicated by one TPMI in the TPMI field, and each TPMI corresponds to a plurality of precoders. The plurality of precoders indicated by the TPMI field are respectively determined based on different channel matrices. There are a plurality of implementations in which the TPMI field includes the plurality of TPMIs. For example, a quantity of bits in the TPMI field is increased, so that the quantity of bits in the TPMI field can simultaneously indicate the plurality of TPMIs; a reserved index (index) in a TPMI table (table) is used, so that the reserved index can indicate the plurality of TPMIs; or a new TPMI table is used, so that the TPMI table includes an index (index) that indicates the plurality of TPMIs. In an implementation, the network device may further receive a plurality of repeatedly sent PUSCHs, and precoders used for at least two of the PUSCHs are different.

In an implementation, the processor combines soft information of the plurality of PUSCHs, to simultaneously demodulate the plurality of PUSCHs, and combines and decodes demodulated soft information, so as to improve a probability of correct uplink decoding.

According to a seventeenth aspect, this application provides a chip system. The chip system includes a processor and an interface, to support a network device in implementing a function in the fifth aspect, for example, determining or processing at least one of data and information in the foregoing method. In a possible design, the chip system further includes a memory. The memory is configured to store program instructions and data that are necessary for the network device. The chip system may include a chip; or may include a chip and another discrete component.

In an implementation, the chip system includes at least one processor and an interface.

The interface is configured to output CSI-RSs.

The transceiver is configured to input a plurality of SRSs, where the plurality of SRSs correspond to SRS precoders obtained by performing joint channel measurement based on the CSI-RSs.

The processor is configured to select one or more precoders from the plurality of SRS precoders based on the plurality of SRSs.

The interface is configured to output indication information indicating the one or more precoders.

The plurality of CSI-RSs are configured as different QCL relationships, to indicate that the CSI-RSs are from different network devices.

In an implementation, the indication information that is output from the interface and that indicates the plurality of precoders is an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, at least two of the plurality of precoders input from the interface are different. Precoders used for at least two PUSCHs sent by a terminal are different.

According to this technical solution, on a basis that the processor performs joint channel measurement on the plurality of CSI-RSs to obtain the SRS precoder, to provide a condition for the processor to jointly receive a plurality of PUSCHs, different PUSCHs sent to different processors may be repeatedly transmitted by using different precoders, so that uplink transmission reliability can be further improved.

In an implementation, the interface may input the PUSCHs sent by the terminal by using a same time domain resource, or may input the PUSCHs sent by the terminal by using different time domain resources. To be specific, the interface may input the PUSCHs at different time domain positions, where the different time domain positions may be different slots, consecutive slots, or different time domain symbols in a same slot.

In an implementation, the interface may input the PUSCHs sent by the terminal by using a same port, or may input the PUSCHs sent by the terminal by using different ports, where the port may be an SRS port for sending an SRS, or may be a port for sending a PUSCH.

In an implementation, the interface may input the PUSCHs sent by the terminal by using a same frequency domain resource, or may input the PUSCHs sent by the terminal by using different frequency domain resources, where the frequency domain resources may be consecutive or inconsecutive.

In an implementation, the processor further combines the plurality of received PUSCHs, and demodulates a combined PUSCH to obtain soft information for decoding.

In an implementation, a same precoder is used for the plurality of PUSCHs input by the interface.

In an implementation, at least two of the plurality of precoders indicated by the indication information are different, and precoders used for the at least two PUSCHs input by the interface are different.

According to an eighteenth aspect, this application provides a chip system. The chip system includes a processor and an interface, to support a network device in implementing a function in the sixth aspect, for example, determining or processing at least one of data and information in the foregoing method. In a possible design, the chip system further includes a memory. The memory is configured to store program instructions and data that are necessary for the network device. The chip system may include a chip; or may include a chip and another discrete component.

In an implementation, the chip system includes at least one processor and an interface.

The interface is configured to input a plurality of SRSs.

The processor is configured to perform joint channel measurement based on the plurality of SRSs.

The processor is configured to select one or more precoders based on a joint channel measurement result.

The interface is configured to output indication information indicating the one or more precoders.

In an implementation, the processor performs joint channel measurement based on the plurality of SRSs to obtain an uplink joint channel state, selects the appropriate precoder, and sends the indication information to a terminal. The indication information is configured as different QCL relationships or different TCI states. In other words, the indication information indicating the plurality of precoders may be delivered to the terminal through one interface, or may be separately delivered to the terminal through a plurality of interfaces.

In an implementation, at least two of the plurality of precoders input from the interface are different.

In an implementation, the processor can further combine soft information of a plurality of PUSCHs, to simultaneously demodulate the plurality of PUSCHs, and combine and decode demodulated soft information, so as to improve a probability of correct uplink decoding.

According to a nineteenth aspect, an embodiment of the present invention provides a computer-readable storage medium, configured to store computer software instructions used by the foregoing terminal. The computer software instructions include a program for performing the foregoing method in the first aspect or the second aspect.

According to a twentieth aspect, an embodiment of the present invention provides a computer-readable storage medium, configured to store computer software instructions used by the foregoing network device. The computer software instructions include a program for performing the foregoing method in any one of the third aspect to the sixth aspect.

According to a twenty-first aspect, this application further provides a computer program product including instructions. When the computer program product runs on a computer, the computer is enabled to perform the method in the first aspect or the second aspect.

According to a twenty-second aspect, this application further provides a computer program product including instructions. When the computer program product runs on a computer, the computer is enabled to perform the method in any one of the third aspect to the sixth aspect.

DESCRIPTION OF EMBODIMENTS

The following describes technical solution of this application with reference to the accompanying drawings.

The technical solutions provided in embodiments of this application may be applied to various communication systems, for example, a new radio (new radio, NR) communication system using a 5G communication technology, a future evolved system, and various convergence communication systems. The technical solutions provided in this application may be applied to a plurality of application scenarios, for example, scenarios such as machine to machine (machine to machine, M2M), macro-micro communication, enhanced mobile broadband (enhanced mobile broadband, eMBB), uRLLC, and massive machine-type communications (massive machine-type communications, mMTC). These scenarios may include but are not limited to a scenario of communication between communication devices, a scenario of communication between network devices, a scenario of communication between a network device and a communication device, and the like. The following provides descriptions by using an example in which the technical solutions are applied to a scenario of communication between a network device and a terminal.

Figure 1:
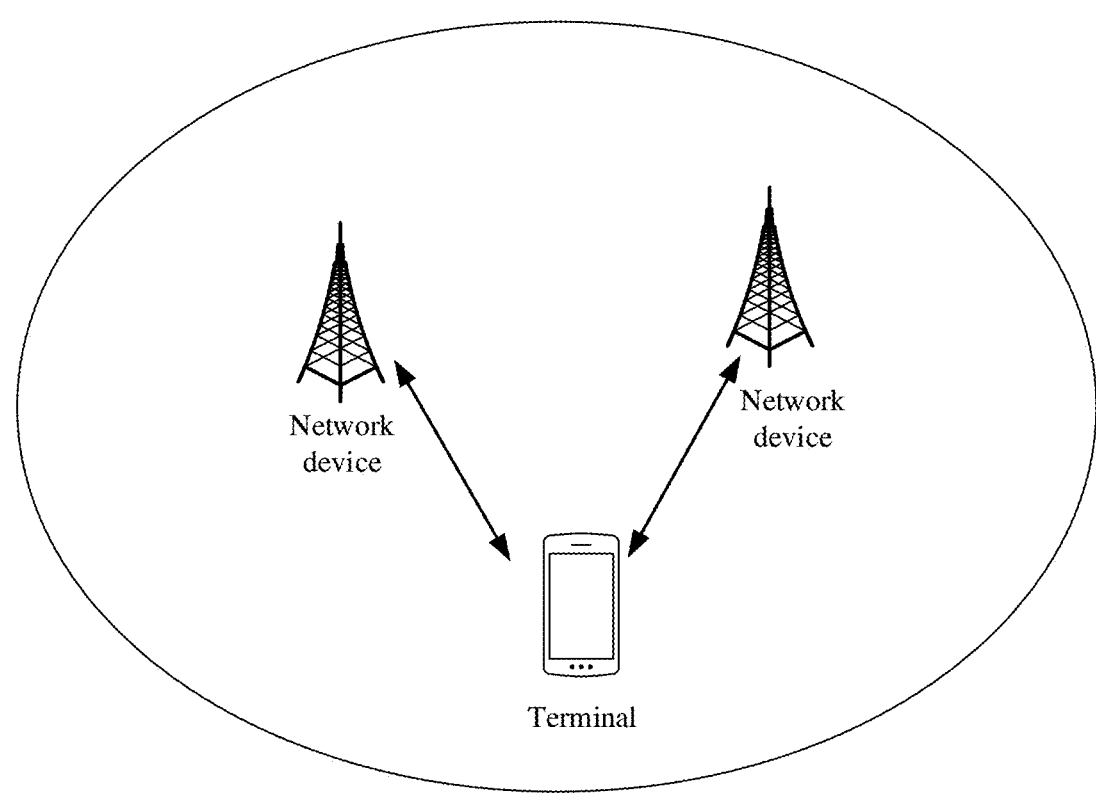
FIG. 1 is a schematic diagram of a wireless communication system according to an embodiment of this application.

FIG. 1 is a schematic diagram of a communication system to which the technical solutions provided in this application are applicable. The communication system may include one or more network devices (where FIG. 1 shows only two network devices) and one or more terminals (where FIG. 1 shows only one terminal). One terminal may simultaneously communicate with a plurality of network devices. Alternatively, one terminal communicates with one network device. FIG. 1 is merely a schematic diagram, and does not constitute any limitation on a scenario to which the technical solutions provided in this application are applicable.

The network device may be a base station, a base station controller, or the like in wireless communication. The base station may include various types of base stations, such as a micro base station (also referred to as a small cell), a macro base station, a relay station, and an access point. This is not specifically limited in embodiments of this application. In embodiments of this application, the base station is an evolved NodeB (evolved NodeB, eNB or e-NodeB) in long term evolution (long term evolution, LTE), an eNB in an internet of things (internet of things, IoT) or a narrowband internet of things (narrowband internet of things, NB-IoT), a transmission reception point (transmission reception point, TRP) in a 5G mobile communication network, a TRP, or a base station in a future evolved public land mobile network (public land mobile network, PLMN). The TRP may be various types of base stations or controllers, or may be an antenna panel or the like. This is not limited in embodiments of this application. A network device or a TRP is subsequently used as an example for description in embodiments of this application.

The base station described in this application usually includes a baseband unit (baseband unit, BBU), a remote radio unit (remote radio unit, RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. A distributed base station greatly shortens a length of the feeder between the RRU and the antenna, to reduce a signal loss, and reduce costs of the feeder. In addition, the RRU and the antenna are relatively small and can be installed anywhere, making network planning more flexible. The RRU may be remotely placed. In addition to that, all BBUs may be centralized and placed in a central office (Central Office, CO). In this centralized manner, a quantity of base station equipment rooms can be greatly reduced, energy consumption of auxiliary devices, especially air conditioners, can be reduced, and carbon ($CO_2$) emission can be greatly reduced. In addition, after distributed BBUs are integrated into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling. The terminal in embodiments of this application is configured to provide a voice or data connectivity service or provide a voice and data connectivity service for a user. The terminal may have different names, for example, user equipment (user equipment, UE), an access terminal, a terminal unit, a terminal station, a mobile station, a remote station, a remote terminal, a mobile device, a wireless communication device, a terminal agent, or a terminal apparatus. Optionally, the terminal may be any type of handheld device, vehicle-mounted device, wearable device, or computer that has a communication function. This is not limited in embodiments of this application. For example, the handheld device may be a smartphone. The vehicle-mounted device may be an in-vehicle navigation system. The wearable device may be a smart band or a virtual reality (virtual reality, VR) device. The computer may be a personal digital assistant (personal digital assistant, PDA) computer, a tablet computer, or a laptop computer (laptop computer).

In the 3rd generation partnership project (the 3rd generation partnership project, 3GPP), a vehicle to everything (vehicle to everything, V2X) technology (where X represents anything) for vehicle to everything communication is proposed. Communication modes in a V2X system are collectively referred to as V2X communication. For example, the V2X communication includes vehicle to vehicle (vehicle to vehicle, V2V) communication, vehicle to infrastructure (vehicle to infrastructure, V2I) communication, vehicle to pedestrian (vehicle to pedestrian, V2P) communication, or vehicle to network (vehicle to network, V2N) communication. Communication between terminal devices in the V2X system is widely referred to as sidelink (sidelink, SL) communication. The technical solutions of this application may be further applied to vehicle to everything. To be specific, the terminal in this application may alternatively be a vehicle or a vehicle component used in a vehicle.

Figure 2:
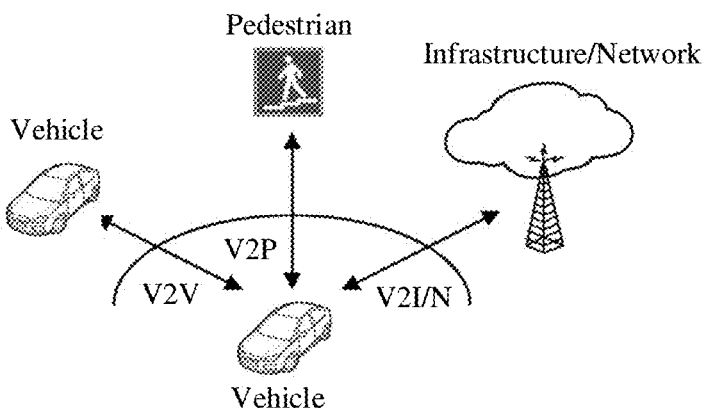
FIG. 2 is a schematic diagram of a V2X system according to an embodiment of this application.

At present, a vehicle or a vehicle component can obtain road condition information or receive service information in time in a V2V, V2I, V2P, or V2N communication mode, and these communication modes may be collectively referred to as V2X communication. FIG. 2 is a schematic diagram of a V2X system in a conventional technology. The schematic diagram includes V2V communication, V2P communication, and V2I/N communication. The V2X communication is intended for high-speed devices representative of vehicles, and is a basic and key technology to be used in future scenarios that have a quite high latency requirement in communication, such as scenarios of smart vehicles, autonomous driving, and intelligent transportation systems.

As shown in FIG. 2, vehicles or vehicle components communicate with each other through the V2V communication. A vehicle or vehicle component may broadcast information such as a vehicle speed, a driving direction, a specific location, and whether an emergency brake is stepped on to a surrounding vehicle. A driver of the surrounding vehicle can better learn of a traffic status outside a line of sight by obtaining the information, and therefore, can predict and avoid a risk status in advance. The vehicle or vehicle component communicates with a road side infrastructure through the V2I communication, and the road side infrastructure can provide various service information and data network access for the vehicle or vehicle component. Functions such as non-parking toll and in-vehicle entertainment greatly improve traffic intelligence. The road side infrastructure, for example, as a road side unit (road side unit, RSU) includes two types. One type is an RSU of a terminal device type. Because the RSU is distributed on the road side, the RSU of the terminal device type is in a non-mobile state, and mobility does not need to be considered. The other type is an RSU of a network device type. The RSU of the network device type may provide timing synchronization and resource scheduling for a vehicle or a vehicle component that communicates with a network device. A vehicle or a vehicle component communicates with a person through the V2P communication, and a vehicle or a vehicle component communicates with a network through the V2N communication. V2N and the foregoing V2I may be collectively referred to as V2I/N.

The network architecture and service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

In embodiments of this application, all aspects, embodiments, or features of this application are presented by describing a system including a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the term "for example" in embodiments of this application is used to represent giving an example, an illustration, or a description. Any embodiment or design scheme described as an "example" in this application should not be explained as being more preferred or having more advantages than another embodiment or design scheme. Specifically, the term "example" is used for presenting a concept in a specific manner.

In embodiments of this application, "of (of)", "relevant (relevant)", and "corresponding (corresponding)" may be interchangeably used sometimes. It should be noted that meanings expressed by the terms are consistent when differences are not emphasized. In embodiments of this application, "at least one" may also be described as "one or more", and "a plurality of" may be "two, three, four, or more". This is not limited in this application. In embodiments of this application, "first", "second", "third", "A", "B", "C", "D", and the like are used for distinguishing between technical features described by them. There is no chronological order or no size order between the technical features described by "first", "second", "third", "A", "B", "C", and "D".

For ease of understanding, the following first briefly describes related terms in this specification.

1. Sounding Reference Signal (SRS) and Channel State Information Reference Signal (CSI-RS)

A sounding reference signal (Sounding reference signal, SRS) has a plurality of purposes in the NR protocol: uplink beam management, channel measurement in codebook based and non-codebook based transmission, and antenna switching. In embodiments of this application, the SRS is mainly used for uplink channel measurement in codebook based and non-codebook based transmission, and a base station may estimate an uplink channel parameter by using an SRS reference signal.

Channel state information reference signal (Channel State Information Reference Signal, CSI-RS): In NR, there is no cell-specific reference signal (Cell-specific reference signal, CRS). Therefore, the CSI-RS is required for multi-antenna port (up to 32) channel status feedback and time-frequency domain tracking (Tracking). There are a plurality of types of CSI-RSs channel state information-interference measurement (Channel state information-interference measurement, CSI-IM), which can be used for interference measurement; a zero power channel state information reference signal (Zero power Channel State Information Reference Signal, ZP-CSI-RS), which is used for rate adaptation; and a non-zero power channel state information reference signal (Non-zero power Channel State Information Reference Signal, NZP-CSI-RS), which can also be used for beam management, mobility management measurement, time-frequency tracking, and CSI-RS channel measurement, in NR. In this application, the CSI-RS is mainly used for downlink channel measurement in non-codebook (Non-Codebook, NCB) based transmission.

2. Codebook Based Uplink Transmission Scheme (Codebook Based UL Transmission Scheme)

Figure 3:
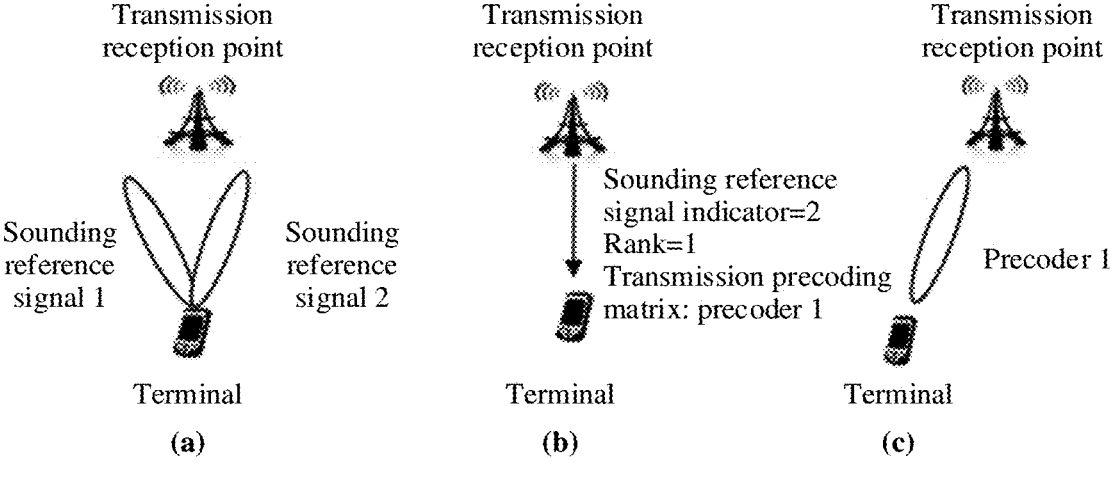
FIG. 3 is a schematic diagram of a codebook based uplink transmission scheme according to an embodiment of this application.

A codebook based uplink transmission scheme is also referred to as a CB uplink transmission scheme or a CB scheme for short. As shown in FIG. 3, in a single-station scenario including a TRP and UE, a procedure in the CB uplink transmission scheme is briefly described as follows:

(a) When RRC signaling is configured as the CB transmission scheme, a terminal (also referred to as UE for short subsequently) receives the RRC signaling, and sends an SRS to a TRP based on an RRC configuration. For example, the UE sends a sounding reference signal 1 (referred to as an SRS 1 for short subsequently) and a sounding reference signal 2 (referred to as an SRS 2 for short subsequently) to the TRP.

(b) The TRP performs channel measurement based on the SRS to obtain an uplink channel state, selects, based on a channel condition, an appropriate precoder and a quantity of ranks (ranks) for sending a PUSCH, and delivers the precoder and the quantity of ranks to the UE by using downlink control information (downlink control information, DCI). Specifically, an SRS resource indicator (SRS resource indicator, SRI), a transmission rank indicator (Transmission rank indicator, TRI), or a transmission precoding matrix indicator or a transmit precoding matrix indicator (Transmission precoding matrix indicator, TPMI) is used to indicate, to the UE, the precoder and the quantity of ranks for sending the PUSCH. The SRI is carried in an SRI field in the DCI, the TRI is carried in a TRI field in the DCI, and the TPMI is carried in a TPMI field in the DCI.

In embodiments of this application, functions of the SRI, the TRI, and the TPMI are described as follows:

(i) The TRI is used to notify the UE of an actual quantity of ranks for uplink transmission, namely, an actual quantity of ports (ports) for sending the PUSCH. Specifically, the TRP configures, for the UE, a maximum quantity (a maximum of 4) of ranks for the uplink transmission by using RRC signaling, and then selects the actual quantity of ranks and notifies the UE of the actual quantity of ranks by using the TRI in the DCI.

(ii) The SRI is used to select a specific SRS resource from a plurality of SRS resources (SRS resources) in one SRS resource set. Specifically, the SRI indicates an index of the SRS resource. A maximum of two SRS resources can be configured for the UE, and at least one SRS resource is configured for the UE. A maximum of four SRS ports can be configured for each SRS resource, and a quantity of SRS ports is configured by using RRC signaling nrofSRS-Ports.

(iii) The TPMI is used to indicate the UE to select the precoder for sending the PUSCH. For example, the TRP may assign a value to the SRI field in the DCI to indicate SRI=2, to indicate an SRS resource whose index number is 2, assign a value to the TRI field to indicate rank=1, to indicate that the actual quantity of ranks for the uplink transmission is 1, and assign a value to the TPMI field to indicate a precoder 1, to indicate that a precoder whose index is 1 is used to send the PUSCH.

(c) Based on the SRI, TRI, and TPMI in the DCI, the UE obtains the precoder and the actual quantity of ranks for the uplink transmission for sending the PUSCH, to send uplink data.

Specifically, the UE performs operations based on information, such as:

(1) the quantity of SRS ports (which is equal to a quantity of antenna ports) in the SRS resource indicated by the SRI;

(2) the maximum quantity of ranks for the uplink transmission (ULmaxRank) indicated by the RRC;

(3) whether precoder transformation (precoder transformation) needs to be enabled (4) whether a codebook subset (codebook Subset) is coherent (coherent). The UE may determine a table, and the UE selects one row in the table based on a precoding information and number of layers (Precoding information and number of layers) field in the DCI. The row includes a TRI and a TPMI. Then, the UE may determine one codebook (codebook) based on the quantity of SRS ports and the TRI, and then select a specific precoder from the codebook based on the TPMI. A dimension of the precoder is [the quantity of SRS ports in the SRS resource*a quantity of ranks indicated by the TRI], and the UE performs PUSCH transmission based on the precoder.

Figure 4:
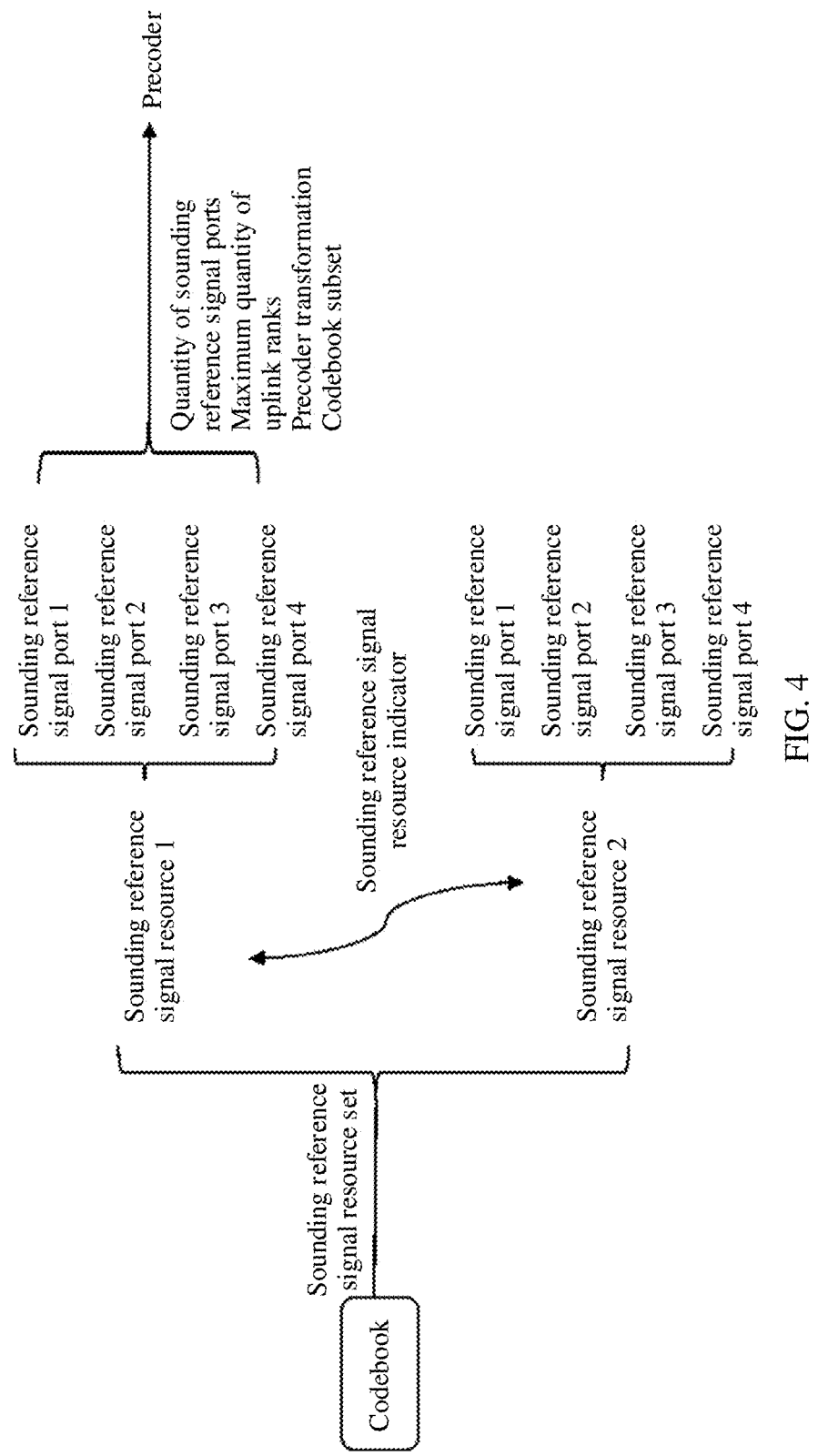
FIG. 4 is a schematic diagram of a process in which a terminal obtains a precoder in a codebook based uplink transmission scheme according to an embodiment of this application.

In a specific implementation, as shown in FIG. 4:

(i) When a plurality of SRS resources (SRS resources) (an SRS resource 1 and an SRS resource 2 shown in FIG. 4) are configured for the UE, the UE selects one SRS resource from the plurality of SRS resources based on an SRI, then selects, based on a TPMI, one precoder from a codebook corresponding to a quantity of SRS ports included in the SRS resource and an actual quantity of ranks indicated by a TRI, and the UE performs PUSCH transmission by using the precoder.

(ii) When one SRS resource is configured for the UE, there is no SRI information. The UE selects, based on a TPMI, one precoder from a codebook corresponding to a quantity of SRS ports included in the SRS resource and a quantity of ranks indicated by a TRI, and the UE performs PUSCH transmission by using the precoder.

It should be noted that a precoder used for PUSCH transmission is selected from an uplink codebook (codebook), and a dimension of the codebook is determined based on a quantity of SRSs included in an SRS resource and a quantity of ranks indicated by a TRI (where a column indicates the quantity of SRSs, and a row indicates the quantity of ranks indicated by the TRI). The codebook is predefined and stored in the TRP and the terminal, and some optional precoders are predefined in each codebook based on a channel feature.

The following uses Table 1, Table 2, and Table 3 as examples to describe how the UE determines a precoder. A specific procedure is as follows: The UE receives RRC signaling that is sent by the TRP to the UE, and selects a TPMI table from a plurality of prestored TPMI configuration information tables based on a quantity of SRS ports in an SRS resource and a maximum quantity of ranks, for uplink transmission, indicated by the RRC. For example, if the quantity of SRS ports is 2 and the maximum quantity of ranks for the uplink transmission is 2, Table 2 corresponding to the two antenna ports and maxRank=2 is selected.

TABLE 1

Precoding information and number of layers, for two antenna ports, if precoder transformation is disabled and a maximum quantity of rank is 2 (Precoding information and number of layers, for 2 antenna ports, if precoder transformation is disabled and maxRank = 2)

| Bit field mapped to index (Bit field mapped to index) | Codebook subset = Fully, partial, and non-coherent (codebookSubset = fullyAnd PartialAndNonCoherent) | Bit field mapped to index (Bit field mapped to index) | Codebook subset = Non-coherent (codebookSubset = nonCoherent) |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3-15 | Reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | Reserved | | |

The TRP selects one TPMI and one TRI based on a channel measured by using the SRS ports in the SRS resource, and delivers the TPMI and the TRI to the UE by using DCI.

The UE selects one row (an index in the table) from the selected TPMI table based on the precoding information and number of layers field in the received DCI, to determine the TRI and the TPMI that are delivered by the TRP. For example, the UE selects a row corresponding to an index number 5, and determines that the TRI delivered by the TRP is 1 layer (that is, rank=1) and the TPMI is 4.

The UE selects a codebook table based on the quantity of SRS ports in the SRS resource and the quantity of ranks indicated by the TRI.

For example, Table 2 corresponding to a single layer and two antenna ports is selected on a basis that the quantity of SRS ports is 2 and the quantity of ranks (namely, a quantity of layers) is 1.

TABLE 2

Precoding matrix W for single-layer transmission using two antenna ports (Precoding matrix W for single-layer transmission using two antenna ports)

| Transmission precoding matrix indicator index (TPMI index) | W Ordered from left to right in increasing order of transmit precoding matrix indicator indexes (ordered from left to right in increasing order of TPMI indexes) |
|---|---|
| 0-5 | $\frac{1}{\sqrt{2}}\begin{bmatrix}1\\0\end{bmatrix}$  $\frac{1}{\sqrt{2}}\begin{bmatrix}0\\1\end{bmatrix}$  $\frac{1}{\sqrt{2}}\begin{bmatrix}1\\1\end{bmatrix}$  $\frac{1}{\sqrt{2}}\begin{bmatrix}1\\-1\end{bmatrix}$  $\frac{1}{\sqrt{2}}\begin{bmatrix}1\\j\end{bmatrix}$  $\frac{1}{\sqrt{2}}\begin{bmatrix}1\\-j\end{bmatrix}$  — — |

For another example, the UE selects, on a basis that the quantity of SRS ports is 2 and the quantity of layers is 4, Table 3 corresponding to four layers and two antenna ports is selected.

TABLE 3

Precoding matrix for four-layer transmission using four antenna ports with precoder transformation disabled (Precoding matrix for four-layer transmission using four antenna ports with precoder transformation disabled)

| Transmission precoding matrix indicator index (TPMI index) | W Ordered from left to right in increasing order of transmit precoding matrix indicator indexes (ordered from left to right in increasing order of TPMI indexes) |
|---|---|
| 0-3 | $\frac{1}{2}\begin{bmatrix}1&0&0&0\\0&1&0&0\\0&0&1&0\\0&0&0&1\end{bmatrix}$  $\frac{1}{2\sqrt{2}}\begin{bmatrix}1&1&0&0\\0&0&1&1\\1&-1&0&0\\0&0&1&-1\end{bmatrix}$  $\frac{1}{2\sqrt{2}}\begin{bmatrix}1&1&0&0\\0&0&1&1\\j&-j&0&0\\0&0&j&-j\end{bmatrix}$  $\frac{1}{4}\begin{bmatrix}1&1&1&1\\1&-1&1&-1\\1&1&-1&-1\\1&-1&-1&1\end{bmatrix}$ |

TABLE 3-continued

Precoding matrix for four-layer transmission using four antenna ports with
precoder transformation disabled (Precoding matrix for four-layer transmission using four
antenna ports with precoder transformation disabled)

| Transmission precoding matrix indicator (TPMI index) | W Ordered from left to right in increasing order of transmit precoding matrix indicator indexes (ordered from left to right in increasing order of TPMI indexes) | | |
| --- | --- | --- | --- |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

Finally, the UE determines a precoder for a PUSCH (where a dimension is the quantity of SRS ports*the quantity of ranks) in the selected codebook table based on the determined TPMI. For example, the UE determines, in Table 2 based on TPMI=4, that a corresponding precoder is $$\frac{1}{\sqrt{2}}\begin{bmatrix} 1 \\ j \end{bmatrix}.$$

3. Non-Codebook Based Uplink Transmission Scheme (Non-Codebook Based UL Transmission Scheme)

Figure 5:
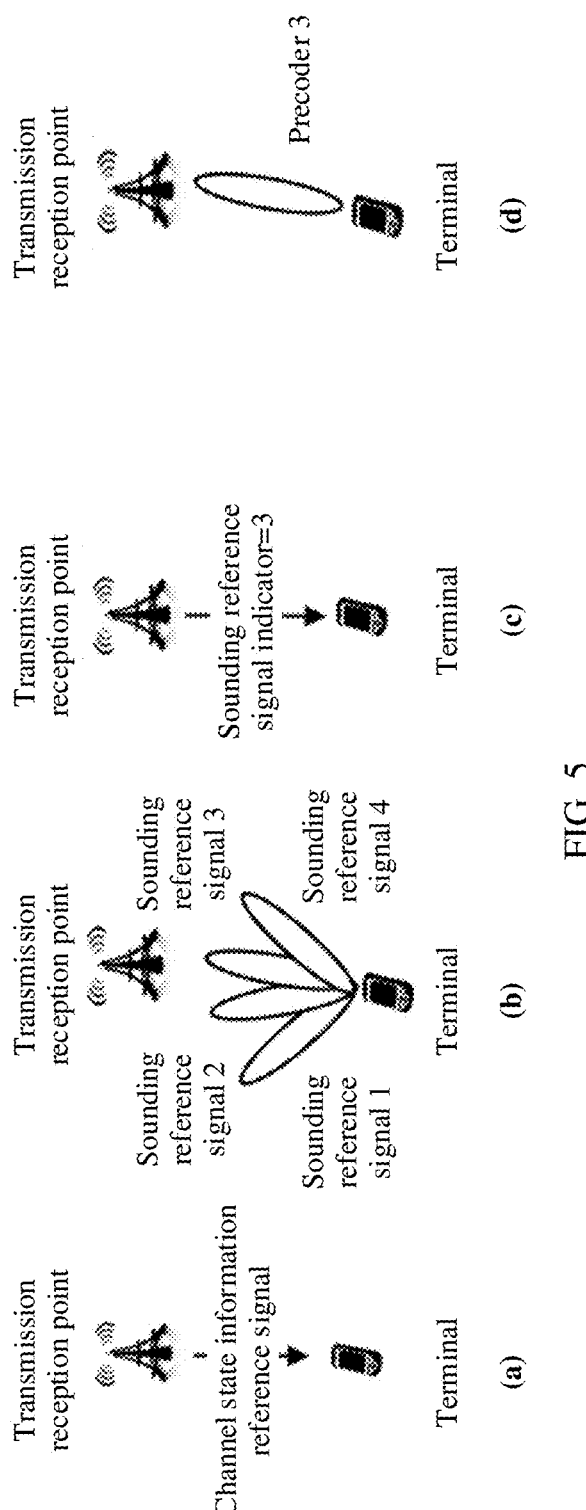
FIG. 5 is a schematic diagram of a non-codebook based uplink transmission scheme according to an embodiment of this application.

A non-codebook based uplink transmission scheme is also referred to as an NCB uplink transmission scheme or an NCB scheme for short subsequently. As shown in FIG. 5, an example in which a single-station scenario including a TRP and UE is used, and a procedure of the NCB uplink transmission scheme is briefly described as follows:

(a) When RRC signaling is configured as the NCB transmission scheme, a TRP sends a CSI-RS to a terminal.

(b) After receiving the CSI-RS, the UE performs channel measurement to obtain a downlink channel state, then obtains an uplink channel state through calculation based on channel reciprocity, designs, based on an uplink channel condition, a plurality of SRS precoders used to send a PUSCH, configures a plurality of SRS resources based on the plurality of SRS precoders, and sends SRSs. Specifically, the UE configures a maximum of four SRS resources, and each resource includes only one SRS port. The UE sends an SRS 1, an SRS 2, an SRS 3, and an SRS 4 on the four SRS resources.

(c) The TRP receives the plurality of SRSs, selects, based on channel states on the plurality of SRSs, an appropriate precoder used to send the PUSCH, and delivers the precoder to the UE by using DCI. Specifically, the TRP sends, to the UE by using the DCI, one or more indexes (indexes) of one or more selected SRSs and a quantity of ranks used for PUSCH transmission.

(d) After receiving the DCI delivered by the TRP, the UE selects, based on an SRI in the DCI, the corresponding precoder and the quantity of ranks to send the PUSCH.

Figure 6:
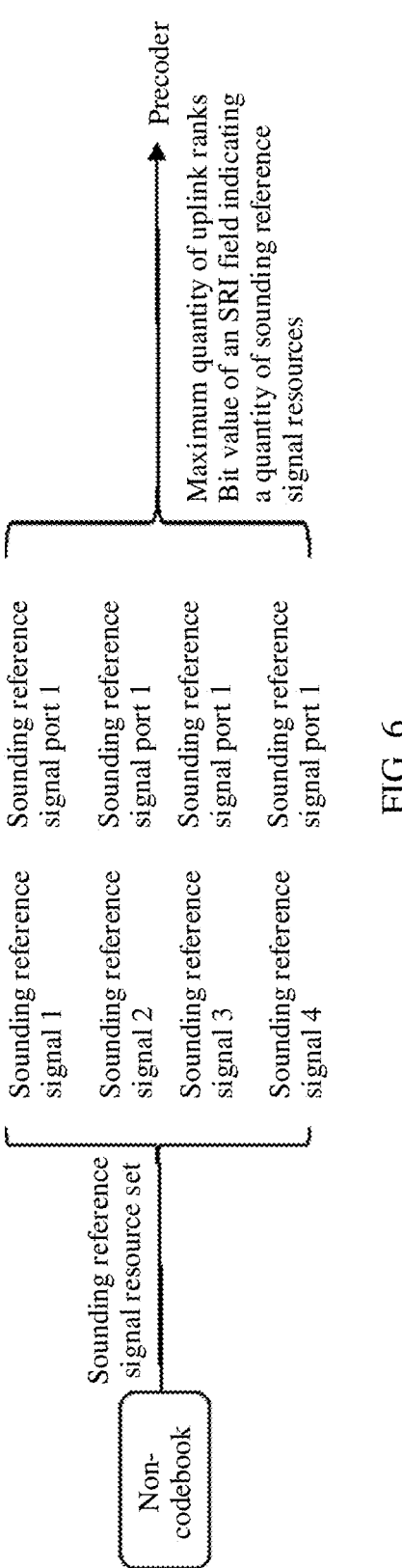
FIG. 6 is a schematic diagram of a process in which a terminal obtains a precoder in a non-codebook based uplink transmission scheme according to an embodiment of this application.

Specifically, for a process in which the UE obtains the precoder, refer to FIG. 6. After receiving the DCI, the UE obtains, based on the SRI field in the DCI, the index that is of the SRS and that is indicated by the TRP and the quantity of ranks used for the PUSCH transmission. The UE first determines a table based on a maximum quantity of uplink transport layers (1 to 4) configured based on the RRC. As shown in Table 4, $L_{max}=3$ represents that rank-3 uplink transmission is supported at most, that is, a maximum quantity of supported ranks is 3. Then, the UE selects one column in the table based on a quantity of SRS resources (configured by using the RCC). For example, when four SRS resources are configured for the UE, a column $N_{SRS}=4$ in Table 4 is selected. Then, the UE selects one row in the column based on a bit value of the SRI field. There is a mapping relationship between the bit value and an index of the SRS resource, that is, a number in each row represents the index of the SRS resource, and a quantity of SRIs in each row represents a quantity of ranks for the PUSCH. For example, as shown in Table 4: It is assumed that when the third row of the column $N_{SRS}=4$ is selected, SRI=3 may be obtained. In this case, the UE learns that an actual quantity of ranks for the PUSCH transmission is 1, and the precoder for sending the PUSCH is a precoder 3 on an SRS resource 3.

TABLE 4

Sounding reference signal resource indicator for non-codebook based
physical uplink shared channel transmission, $L_{max}=3$ (SRI for
non-codebook based PUSCH transmission, $L_{max}=3$)

| Bit field mapped to index (Bit field mapped to index) | Sounding reference signal resource indicator, quantity = 2 (SRI(s), $N_{SRS}=2$) | Bit field mapped to index (Bit field mapped to index) | Sounding reference signal resource indicator, quantity = 3 (SRI(s), $N_{SRS}=3$) | Bit field mapped to index (Bit field mapped to index) | Sounding reference signal resource indicator, quantity = 4 (SRI(s), $N_{SRS}=4$) |
| --- | --- | --- | --- | --- | --- |
| 0 | 0 | 0 | 0 | 0 | 0 |
| 1 | 1 | 1 | 1 | 1 | 1 |
| 2 | 0, 1 | 2 | 2 | 2 | 2 |
| 3-15 | Reserved | 3 | 0, 1 | 3 | 3 |
| | | 4 | 0, 2 | 4 | 0, 1 |
| | | 5 | 1, 2 | 5 | 0, 2 |
| | | 6 | 0, 1, 2 | 6 | 0, 3 |
| | | 7-15 | Reserved | 7 | 1, 2 |
| | | | | 8 | 1, 3 |
| | | | | 9 | 2, 3 |
| | | | | 10 | 0, 1, 2 |
| | | | | 11 | 0, 1, 3 |
| | | | | 12 | 0, 2, 3 |
| | | | | 13 | 1, 2, 3 |
| | | | | 14-15 | Reserved |

4. Slot Aggregation Transmission Scheme

Currently, in NR, to improve uplink coverage, and improve performance of cell edge UE or UE performance in a scenario with a poor channel condition, NR supports an uplink slot aggregation (slot aggregation) transmission scheme. Specifically, slot aggregation mainly affects a manner of sending a PUSCH in time domain, and does not affect manners of indicating a precoder and a rank. In other words, in both the foregoing CB and NCB uplink transmission schemes, the PUSCH may be sent in the slot aggregation scheme.

A main principle of the slot aggregation is as follows: Same data is repeatedly sent in several consecutive slots or mini-slots, that is, the same data is sent in each of the several consecutive slots. In this way, a TRP receives the same data in the several consecutive slots and performs combination or other processing, to improve uplink data transmission reliability.

Currently, the slot aggregation transmission scheme in NR has the following characteristics:

Only rank-1 PUSCH transmission is supported.

Slots that are aggregated are usually triggered by using DCI in the first slot, that is, an aggregated slot usually uses a configuration, for example, configurations of a demodulation reference signal (demodulation reference signal, DMRS) port, a precoder, or a PUSCH time-domain resource, indicated by the DCI in the first slot.

A same transmission block (transmission Block, TB) is sent in each slot, that is, same data is sent in all the slots that are aggregated. Herein, the same transmission block is a repeatedly sent PUSCH.

In the aggregated slot, a redundancy version (Redundancy version, RV) of the TB may be configured by using RRC. Specifically, a same RV or different RVs may be configured.

The TRP may notify, by using RRC signaling "Aggregation-Factor-UL", UE whether the slot aggregation scheme is used. For example, in Aggregation-Factor-UL={1, 2, 4, 8}, 2, 4, and 8 indicate that consecutive 2, 4, and 8 slots or mini-slots are aggregated for sending, and 1 indicates that slot aggregation is not performed. Specifically, when Aggregation-Factor-UL=1, the slot aggregation scheme is not applicable to the UE. When Aggregation-Factor-UL>1, the UE learns that the aggregation scheme is used.

Figure 7:
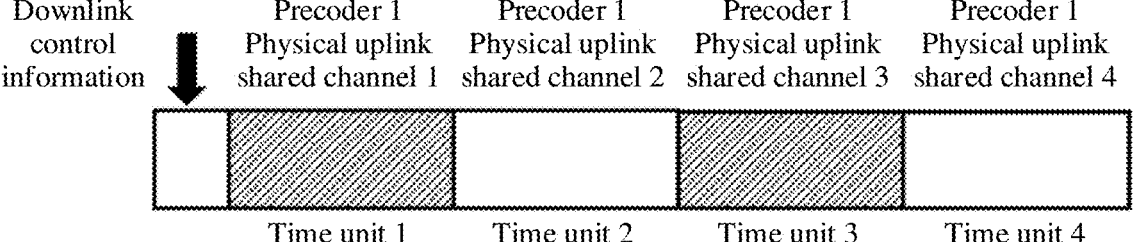
FIG. 7 is a schematic diagram in which PUSCHs are transmitted in four time units according to an embodiment of this application.

For example, FIG. 7 is a schematic diagram of aggregation of four time units (for example, four slots), that is, Aggregation-Factor-UL=4. It can be learned that same data TB 0 is sent in the four slots that are aggregated. As shown in the figure, a PUSCH 1, a PUSCH 2, a PUSCH 3, and a PUSCH 4 indicate that a same PUSCH is repeatedly sent for four times. Embodiments of this application further include another aggregation transmission solution in which aggregation is performed at a time domain resource granularity. For example, aggregation is performed at a mini-slot granularity, or aggregation is performed at a symbol granularity. This is not limited in this application.

5. Time Domain Resource, Frequency Domain Resource, and Port

In embodiments of this application, a time domain resource may be one or more radio frames, one or more subframes, one or more slots (slots) or time units, one or more mini-slots (mini-slots), or one or more symbols; or may be a time window, for example, a system information (system information, SI) window, including a plurality of frames or subframes. A time length of one symbol is not limited in embodiments of this application. A length of one symbol may vary for different subcarrier spacings. Symbols may include uplink symbols and downlink symbols. The uplink symbol may be referred to as a single-carrier frequency division multiple access (single-carrier frequency division multiple access, SC-FDMA) symbol or an orthogonal frequency division multiplexing (orthogonal frequency division multiplexing, OFDM) symbol. The downlink symbol may be an OFDM symbol.

In embodiments of this application, a frequency domain resource is a resource block (Resource block, RB), a resource block group (Resource block group, RBG), a predefined subband (subband), a band (band), a bandwidth part (bandwidth part, BWP), a component carrier (component carrier, CC), or a cell (cell).

In embodiments of this application, a port (port) is a transmit antenna identified by a receive end device or a transmit antenna that can be distinguished in space. One antenna port may be configured for each virtual antenna, the virtual antenna may be a weighted combination of a plurality of physical antennas, and each antenna port may correspond to one reference signal port, for example, an SRS port.

This application provides a plurality of technical solutions for improving uplink transmission reliability. Specifically, for a single-station transmission scenario, namely, a scenario in which a terminal communicates with one TRP, when performing uplink transmission, the terminal may send data by using different precoders, so that when a channel condition is changed, transmission decoding performance can also be ensured, and uplink transmission reliability is improved.

In addition, for a multi-station transmission scenario, namely, a scenario in which a terminal communicates with two or more TRPs, this application provides two different uplink transmission technical solutions: a repetition transmission solution and a joint reception solution. By applying the technical solutions provided in embodiments of this application, PUSCH transmission reliability can be effectively improved.

The following separately describes the uplink transmission technology solutions provided in embodiments of this application in the single-station transmission scenario and the multi-station transmission scenario.

Figure 8:
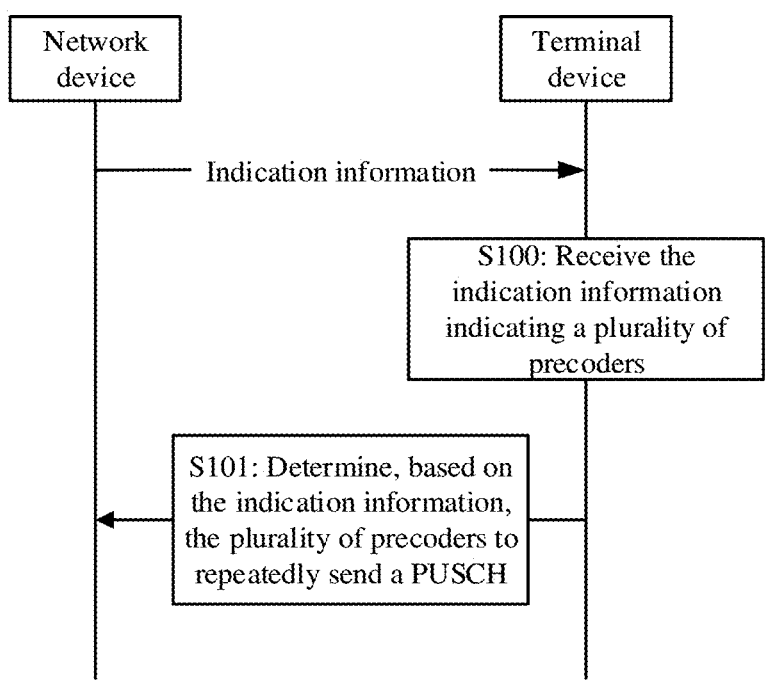
FIG. 8 is a schematic diagram of a PUSCH transmission method in a single-station transmission scenario according to an embodiment of this application.

Embodiment 1: PUSCH Transmission Method in Single-Station Transmission Scenario Refer to FIG. 8. When wireless communication is performed between a network device and a terminal, a PUSCH transmission method provided in this embodiment includes the following steps.

Step 100: The terminal receives indication information indicating a plurality of precoders (precoders).

Specifically, the terminal receives the indication information from the network device. The indication information may be DCI, and the DCI may directly or indirectly indicate the plurality of precoders by using an SRI field or a TPMI field.

In an implementation, the plurality of precoders are indicated by using the SRI field, and the precoders are jointly indicated by using one SRI in the SRI field; or the plurality of precoders are independently indicated by using a plurality of SRIs in the SRI field. For example, in the NCB scheme shown in Table 4, if four SRS resources are configured for UE, that is, the column $N_{SRS}=4$ is selected, the UE selects a row in the column based on a bit value in the SRI field. A number in each row represents an index of the SRS resource. If the bit value in the SRI field ranges from 0 to 3, each row indicates only one precoder, and a plurality of precoders may be independently indicated by using a plurality of SRIs. If the bit value in the SRI field ranges from 4 to 13, each row may indicate a plurality of precoders, in other words, the plurality of precoders may be jointly indicated by using one SRI.

A specific implementation of using the SRI field to indicate the plurality of precoders may be that the plurality of precoders are indicated by using a plurality of different SRI fields, a new DCI field, different bits of the SRI field, a new SRI table, or a reserved entry (entry) of an SRI table provided in an existing protocol.

A specific implementation of using the SRI field to indicate the plurality of precoders may be that the plurality of precoders are indicated by using a plurality of different SRI fields, a new DCI field, different bits of the SRI field, a new SRI table, or a reserved entry (entry) of an SRI table provided in an existing protocol.

(1) A new SRI table is designed to support indication of the plurality of precoders.

In this implementation, a value that is of one precoder and that is indicated by an SRI is extended to two or more values, to indicate two or more precoders in the SRI corresponding to one entry. In this manner, only one port can be used for each SRS resource, that is, each SRS resource supports only one port (rank=1 transmission).

The following uses an example in which a maximum quantity of ranks supported by UE is 3 ($L_{max}$=3) and an SRI in NCB PUSCH transmission indicates two precoders for description.

As shown in the new Table 5, the UE supports rank-3 uplink transmission at most. The second column of the table is indexes of precoders corresponding to two SRS resources, L=1, and L=2. The fourth column is indexes of precoders corresponding to three SRS resources, L=1, and L=2. The sixth column is indexes of precoders corresponding to four SRS resources, L=1, L=2, and L=3. In the fifth column, index numbers 0-3 correspond to L=1 (that is, rank-1), index numbers 4-9 correspond to L=2 (rank-2), and index numbers 10-13 correspond to L=3 (rank=3).

Using content of the fifth column and the sixth column as an example, an index number in the fifth column is 0, and corresponding content of the sixth column is as follows: 0, x, which means that when the UE supports rank-1 uplink transmission, that is, the UE uses one SRS resource, namely, one SRS port, to repeatedly send a PUSCH, the UE may repeatedly send the PUSCH based on precoders corresponding to SRI=0 and SRI=x. Specifically, in one transmission, the UE may send the PUSCH based on a precoder 0 corresponding to SRI=0, and in another transmission, the UE may send the PUSCH based on a precoder x corresponding to SRI=x, where x can be 1, 2, or 3 and needs to be different from 0.

For another example, an index number in the fifth column is 4, and corresponding content of the sixth column is 0, x; 1, y, which means that when the UE supports rank-2 uplink transmission, that is, the UE uses two SRS resources, namely, two SRS ports (to be specific, only one port can be used for each SRS resource), to repeatedly send a PUSCH. In one transmission, the UE may send the PUSCH based on a precoder 0 and a precoder 1 that correspond to SRI=0, 1, and in another transmission, the UE may send the PUSCH based on a precoder x and a precoder y that correspond to SRI=x, y, where x may be 1, 2, or 3, and y may be 0, 2, or 3.

For another example, an index number in the fifth column is 10, and corresponding content of the sixth column is 0, x; 1, y; 2, z, which means that when the UE supports rank-3 uplink transmission, that is, the UE uses three SRS resources, namely, three SRS ports, to repeatedly send a PUSCH. In one transmission, the UE may send the PUSCH based on a precoder 0, a precoder 1, and a precoder 2 that correspond to SRI=0, 1, 2, and in another transmission, the UE may send the PUSCH based on a precoder x, a precoder y, and a precoder z that correspond to SRI=x, y, z, where x may be 1, 2, or 3; y may be 0, 2, or 3; and z may be 0, 1, or 3.

It should be noted that values of x, y, and z are merely examples, and adaptive design may be performed during specific implementation.

It should be noted that in this application, a sequence of values of SRIs corresponding to indexes is not limited.

For example, content that corresponds to the index 4 in the fifth column is 0, x; 1, y, which may also be represented as 0, 1; x, y, used to indicate that the precoder 0 and the precoder 1 that correspond to SRI=0, 1 are used for one PUSCH repetition transmission, and the precoder x and the precoder y that correspond to SRI=x, y are used for another PUSCH repetition transmission.

For another example, content that corresponds to the index 10 in the fifth column is 0, x; 1, y; 2, z, which may also be represented as 0, 1, 2; x, y, z, used to indicate that the precoder 0, the precoder 1, and the precoder 2 that correspond to SRI=0, 1, 2 are used for one PUSCH repetition transmission, and the precoder x, the precoder y, and the precoder z that correspond to SRI=x, y, z are used for another PUSCH repetition transmission.

TABLE 5

| | | | | | |
|---|---|---|---|---|---|
| | | | SRI table, $L_{max}$ = 3 | | |
| Bit field mapped to index (Bit field mapped to index) | Sounding reference signal resource indicator, quantity = 2 (SRI(s), $N_{SRS}$ = 2) | Bit field mapped to index (Bit field mapped to index) | Sounding reference signal resource indicator, quantity = 3 (SRI(s), $N_{SRS}$ = 3) | Bit field mapped to index (Bit field mapped to index) | Sounding reference signal resource indicator, quantity = 4 (SRI(s), $N_{SRS}$ = 4) |
| 0 | 0, x | 0 | 0, x | 0 | 0, x |
| 1 | 1, x | 1 | 1, x | 1 | 1, x |
| 2 | 0, x; 1, y | 2 | 2, x | 2 | 2, x |
| 3-15 | Reserved | 3 | 0, x; 1, y | 3 | 3, x |
| | | 4 | 0, x; 2, y | 4 | 0, x; 1, y |
| | | 5 | 1, x; 2, y | 5 | 0, x; 2, y |
| | | 6 | 0, x; 1, y; 2, z | 6 | 0, x; 3, y |
| | | 7-15 | Reserved | 7 | 1, x; 2, y |
| | | | | 8 | 1, x; 3, y |
| | | | | 9 | 2, x; 3, y |
| | | | | 10 | 0, x; 1, y; 2, z |
| | | | | 11 | 0, x; 1, y; 3, z |
| | | | | 12 | 0, x; 2, y; 3, z |
| | | | | 13 | 1, x; 2, y; 3, z |
| | | | | 14-15 | Reserved |

(2) Another manner in which a new SRI table is designed to support indication of the plurality of precoders is as follows:

In this implementation, an SRI is used to indicate the UE to use two or more precoder values during PUSCH repetition transmission, to indicate two or more precoders in the SRI corresponding to one entry. In this manner, no limitation is imposed on that only one port can be used for each SRS resource, that is, each SRS resource can support a plurality of ports (multi-rank transmission).

The following uses an example in which a maximum quantity of ranks supported by UE is 3 ($L_{max}$=3) and an SRI in NCB PUSCH transmission indicates two precoders for description.

Columns 1 and 2 indicate that a maximum of two SRS resources can be used. In this case, the UE supports rank=2 at most.

Columns 3 and 4 indicate that a maximum of three SRS resources can be used, and =3 indicates that rank=3 transmission is supported at most. In this case, the UE supports rank=3 at most.

Columns 5 and 6 indicate that a maximum of four SRS resources can be used, and $L_{max}=3$ indicates that rank=3 transmission is supported at most. In this case, the UE supports rank=3 at most.

In this case, a new rule imposes no limitation on that only one port can be used for each SRS resource, that is, each SRS resource can support a plurality of ports (multi-rank transmission). A specific quantity of ports used for each SRS resource may be indicated by reusing existing RRC signaling nrofSRS-Ports; or new RRC signaling or DCI signaling is used to indicate a specific quantity of ports or a specific port sequence number used for each SRS resource. For example, content that corresponds to an index 4 in the fifth column is 1, 3. In this case, RRC signaling or DCI signaling is used to indicate a quantity (for example, 2) of ports specifically used for each SRS resource, or indicate a port sequence number (for example, 0 and 1) specifically used for each SRS resource. In this case, the UE separately repeatedly sends a PUSCH by using a precoder 1 and a precoder 3, where PUSCH transmission is rank=2 transmission and two SRS ports are used.

It should be noted that values of SRIs corresponding to index numbers in Table 6 and a sequence of the values are merely examples. In a specific implementation, there are other values or other sequences, provided that different precoders used for PUSCH repetition transmission are indicated by using the SRIs, the values or the sequence fall/falls within coverage of embodiments of this application. Details are not described herein again.

The foregoing uses only $L_{max}=3$ as an example to describe how to indicate a plurality of precoders by using the SRI when the UE supports rank=3. A table of indicating a plurality of precoders by using an SRI when the UE supports rank=2, 4, or another quantity of ranks may be designed based on the example. Details are not described herein again.

entries (entries)) are required to indicate a quantity of layers and TPMIs. However, because the quantity of layers may be already determined by using the first four bits, for example, layer=1, candidate TPMIs may be only 0 to 5, so that the second segment of the TPMI field needs to indicate only the TPMIs. For example, three bits (0 to 8) are used to indicate the TPMIs 0 to 5. As shown in Table 7, on an original basis that four bits indicate a TPMI table of 16 entries, three bits are added to indicate eight entries (index numbers 16 to 23). In a codebookSubset=fullyAndPartialAndNonCoherent mode, index numbers 0 to 5 are respectively used to indicate TPMI=0, TPMI=1, TPMI=2, TPMI=3, TPMI=4, and TPMI=5. A corresponding quantity of layers is learned from the first four bits, and therefore does not need to be repeatedly indicated by the index numbers 0 to 5. For example, the UE receives the indication information, and the first four bits are 0111. By searching Table 1, a corresponding index number is 8, a quantity of layers is 2, and TPMI=2. Similarly, by searching Table 5 based on the last three bits 011, a corresponding index number is 3, a corresponding TPMI is 3, and it is already determined, based on the first four bits, that the quantity of layers is 2. Therefore, the indication information received by the UE indicates two layers, TPMI=0, and TPMI=3. This means that when a PUSCH is repeatedly transmitted by using two layers, a precoder corresponding to TPMI=0 is used for one PUSCH transmission, and a precoder corresponding to TPMI=3 is used for another PUSCH transmission.

In a codebookSubset=NonCoherent mode, index numbers 0 and 1 are used to respectively indicate TPMI=0 and TPMI=1. Meanings are not described in detail again.

Table 7 may exist independently or may be combined with Table 1. An implementation form of Table 7 is not limited in this application.

TABLE 6

| SRI table, $L_{max}$ = 3 | | | | | |
|---|---|---|---|---|---|
| Bit field mapped to index (Bit field mapped to index) | Sounding reference signal resource indicator, quantity = 2 (SRI(s), $N_{SRS}$ = 2) | Bit field mapped to index (Bit field mapped to index) | Sounding reference signal resource indicator, quantity = 3 (SRI(s), $N_{SRS}$ = 3) | Bit field mapped to index (Bit field mapped to index) | Sounding reference signal resource indicator, quantity = 4 (SRI(s), $N_{SRS}$ = 4) |
| 0 | 0, 1 | 0 | 0, 1 | 0 | 0, 1 |
| 1-8 | Reserved | 1 | 1, 2 | 1 | 0, 2 |
| | | 2 | 0, 2 | 2 | 0, 3 |
| | | 3-8 | Reserved | 3 | 1, 2 |
| | | | | 4 | 1, 3 |
| | | | | 5 | 2, 3 |
| | | | | 6-8 | Reserved |

In another implementation, the plurality of precoders are respectively indicated by a plurality of TPMIs in a TPMI field, and each TPMI corresponds to one precoder; or the plurality of precoders are separately indicated by one TPMI in a TPMI field, and each TPMI corresponds to a plurality of precoders.

A manner of respectively indicating the plurality of precoders by the plurality of TPMIs in the TPMI field may be implemented in a plurality of manners.

(1) A quantity of bits of the TPMI may be increased to indicate the plurality of TPMIs. For example, as shown in Table 1, a maximum of four bits (which may indicate 16

TABLE 7

| Bit field mapped to index (Bit field mapped to index) | Codebook subset = Fully, partial, and non-coherent (codebookSubset = fullyAnd PartialAndNonCoherent) | Bit field mapped to index (Bit field mapped to index) | Codebook subset = Non-coherent (codebookSubset = nonCoherent) |
|---|---|---|---|
| 0 | TPMI = 0 | 0 | TPMI = 0 |
| 1 | TPMI = 1 | 1 | TPMI = 1 |
| 2 | TPMI = 2 | 2-8 | Reserved |
| 3 | TPMI = 3 | | |
| 4 | TPMI = 4 | | |
| 5 | TPMI = 5 | | |
| 6-8 | Reserved | | |

(2) In another implementation, a reserved (reserved) entry (entry) in an existing TPMI table is used, and the entry is enabled to indicate the plurality of TPMIs. For example, in Table 8, content indicated by an entry whose index number is 9 is: 1 layer, TPMI=1, and TPMI=3, and two TPMIs are respectively obtained through measurement by using two SRS resources, and respectively indicate different precoders. This means that when a PUSCH is repeatedly transmitted by using one layer, a precoder corresponding to TPMI=1 is used for one PUSCH transmission, and a precoder corresponding to TPMI=3 is used for another PUSCH transmission.

Alternatively, for example, entry 10: 2 layers, TPMI=0, and TPMI=2. This means that when a PUSCH is repeatedly transmitted by using two layers, a precoder corresponding to TPMI=0 is used for one PUSCH transmission, and a precoder corresponding to TPMI=2 is used for another PUSCH transmission. In this embodiment, the quantity of layers in the entry indicates a sum of quantities of layers corresponding to all the TPMIs. For example, for 2 layers in the table, the quantity of layers is 2.

TABLE 8

| Bit field mapped to index (Bit field mapped to index) | Codebook subset = Fully, partial, and non-coherent (codebookSubset = fullyAnd PartialAndNonCoherent) | Bit field mapped to index (Bit field mapped to index) | Codebook subset = Non-coherent (codebookSubset = nonCoherent) |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | 1 layer: TPMI = 0, TPMI = 1 |
| 4 | 1 layer: TPMI = 3 | 4 | 2 layer: TPMI = 0, TPMI = 1 |
| 5 | 1 layer: TPMI = 4 | 5-15 | Reserved |
| 6 | 1 layer: TPMI = 5 | | |
| 7 | 2 layers: TPMI = 1 | | |
| 8 | 2 layers: TPMI = 2 | | |
| 9 | 1 layer: TPMI = 1, TPMI = 3 | | |
| 10 | 2 layers: TPMI = 0, TPMI = 2 | | |
| 11-15 | Reserved | | |

Step 101: The terminal determines, based on the indication information, the plurality of precoders to repeatedly send a PUSCH, where precoders used for at least two of the PUSCHs are different.

For example, in the CB scheme shown in FIG. 3, the terminal searches the TPMI Table 1 by using an SRS resource index indicated by the SRI field in the DCI and based on the TPMI field in the DCI, to obtain a plurality of TPMI values, and then searches the codebook table such as that shown in Table 2 or Table 3 based on the specific plurality of TPMI values, to obtain a plurality of corresponding precoders. A specific implementation process is similar to the foregoing process of obtaining the precoder in the CB scheme. In this embodiment, the plurality of different precoders may be obtained to repeatedly send the PUSCH.

Alternatively, in the NCB scheme shown in FIG. 5, the terminal obtains, based on the SRI field in the DCI, indexes of a plurality of SRSs and a quantity of ranks for PUSCH transmission that are indicated by the network device, and determines the precoder for sending the PUSCH. A specific implementation process is similar to the foregoing process of obtaining the precoder in the NCB scheme. In this embodiment, the plurality of different precoders may be obtained to repeatedly send the PUSCH.

Figure 9:
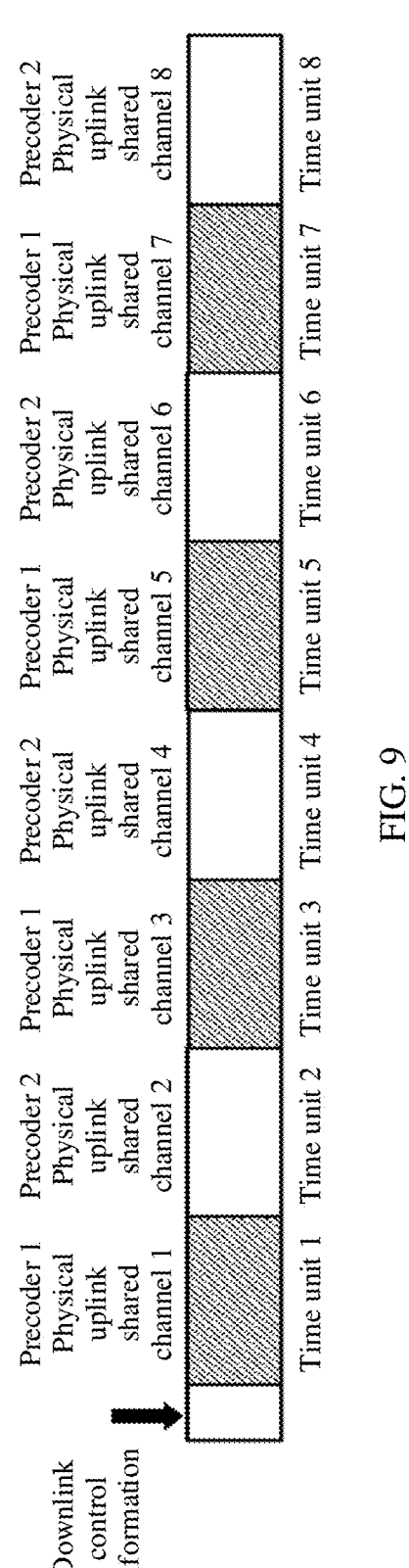
FIG. 9 is a schematic diagram in which PUSCHs are sent in eight time units according to an embodiment of this application.

For example, as shown in FIG. 9, the terminal repeatedly sends the PUSCH on different time domain resources, and different precoders are used for at least two of the PUSCHs. For example, in eight time units (for example, eight slots), a PUSCH 1, a PUSCH 3, a PUSCH 5, and a PUSCH 7 are sent by using a precoder 1, and a PUSCH 2, a PUSCH 4, a PUSCH 6, and a PUSCH 8 are sent by using a precoder 2 (where the PUSCHs 1 to 8 are a same PUSCH, and the same PUSCH is repeatedly sent for eight times herein). When a channel condition is changed in the eight slots or a location of the terminal is changed, because two different precoders are used, the terminal can adapt to the channel change, transmission decoding performance is ensured, and uplink transmission reliability is improved. In comparison with the technical solution in which only one precoder is configured by using the DCI, when a location of UE in the eight slots that are aggregated is changed, a same precoder used in the eight slots is no longer applicable. Consequently, decoding performance of data received by the network device deteriorates, uplink performance of the UE cannot be ensured, and performance of cell edge UE cannot be ensured or uplink coverage cannot be improved. Therefore, according to the technical solution that is of the PUSCH transmission in the single-station scenario and that is provided in this embodiment of this application, the uplink transmission reliability can be effectively improved, the decoding performance of the network device can be improved, and the uplink coverage can be improved.

The following continues to describe two uplink transmission reliability improvement technical solutions provided in this application in a multi-station scenario: PUSCH repetition transmission (PUSCH repetition transmission) and PUSCH joint reception (PUSCH joint reception).

Embodiment 2

In this embodiment, a PUSCH repetition transmission (PUSCH repetition transmission) solution is described. Specifically, UE repeatedly transmits a PUSCH, and after receiving the PUSCH, a network device combines demodulated soft information, to improve decoding performance A basic flowchart is shown in FIG. 10.

Figure 10:
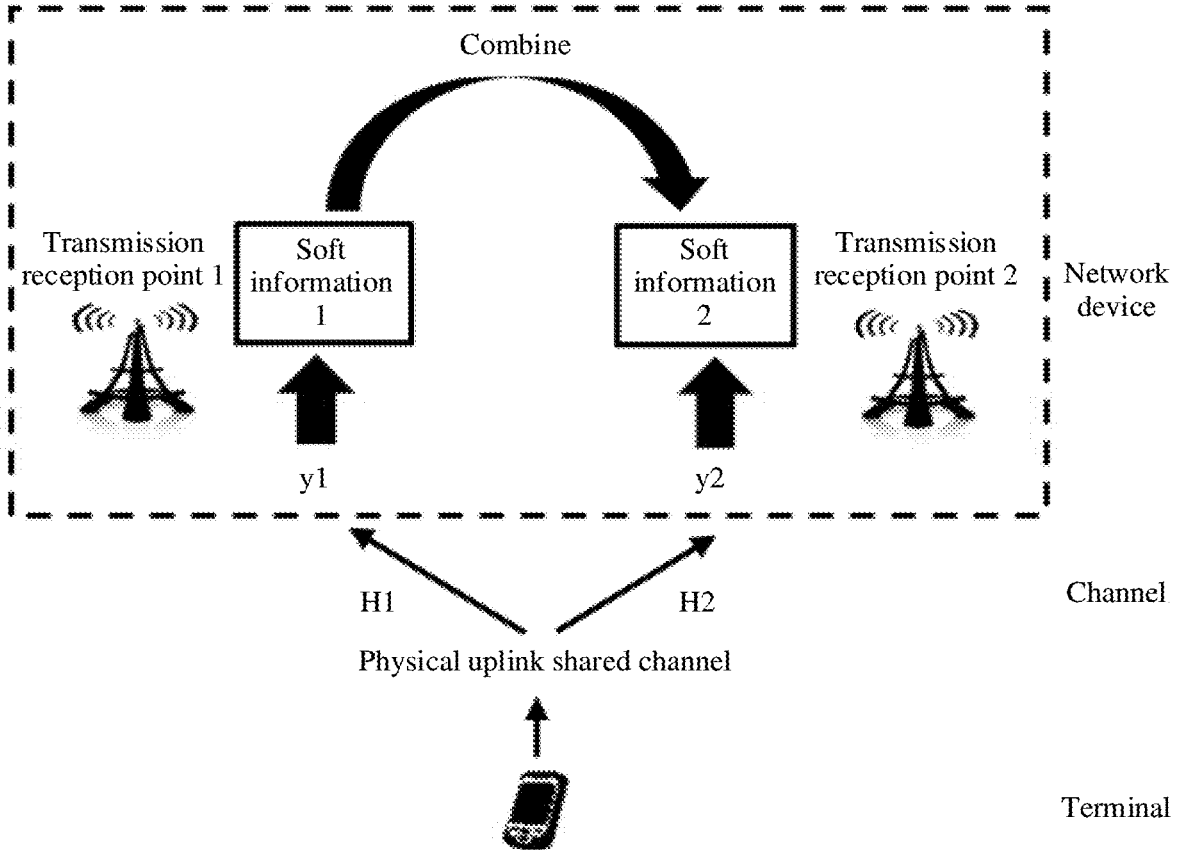
FIG. 10 is a schematic diagram of PUSCH repetition transmission according to an embodiment of this application.

FIG. 10 mainly includes three parts: a terminal (which is referred to as UE for short subsequently), an air interface channel, and a network device (for example, a gNB). The UE receives indication information indicating a precoder, and determines, based on the indication information, the precoder used to repeatedly send a PUSCH. The plurality of PUSCHs arrive at the network device after being transmitted through different channels (two different channel matrices H1 and H2 in the figure). The network device demodulates the plurality of PUSCHs to obtain a plurality of pieces of soft information corresponding to the PUSCHs, and combines the plurality of pieces of soft information for decoding.

Specifically, in this case, it is equivalent to that the network device receives the plurality of PUSCHs, namely, a plurality of received uplink signals (y1 and y2 are shown in the figure). In this case, a plurality of TRPs of the network device demodulate y1 and y2, to obtain the plurality of pieces of demodulated soft information (Soft Information) (where the soft information corresponds to hard information, the hard information is a determined bit, for example, [0, 1 . . . ] and the soft information is an undetermined bit, for example, a decoding result is 1 at a probability of 90%, and a decoding result is 0 at a probability of 10%). In this case, the network device combines the plurality of pieces of received soft information, namely, soft information 1 and soft information 2 that are respectively obtained based on y1 and y2 in the figure, and then decodes combined soft information, to improve decoding performance.

In another implementation, the network device may first decode soft information received by different TRPs, and then perform combination and decoding if a decoding error occurs.

In this transmission repetition scenario, precoders used by the terminal to send the PUSCHs may be the same, or precoders used for at least two of the PUSCHs may be different.

The following uses a CB scheme and an NCB scheme as examples to specifically describe an implementation process of performing uplink transmission by using different precoders when a terminal repeatedly sends a PUSCH in a multi-station scenario.

Embodiment 3

Figure 11:
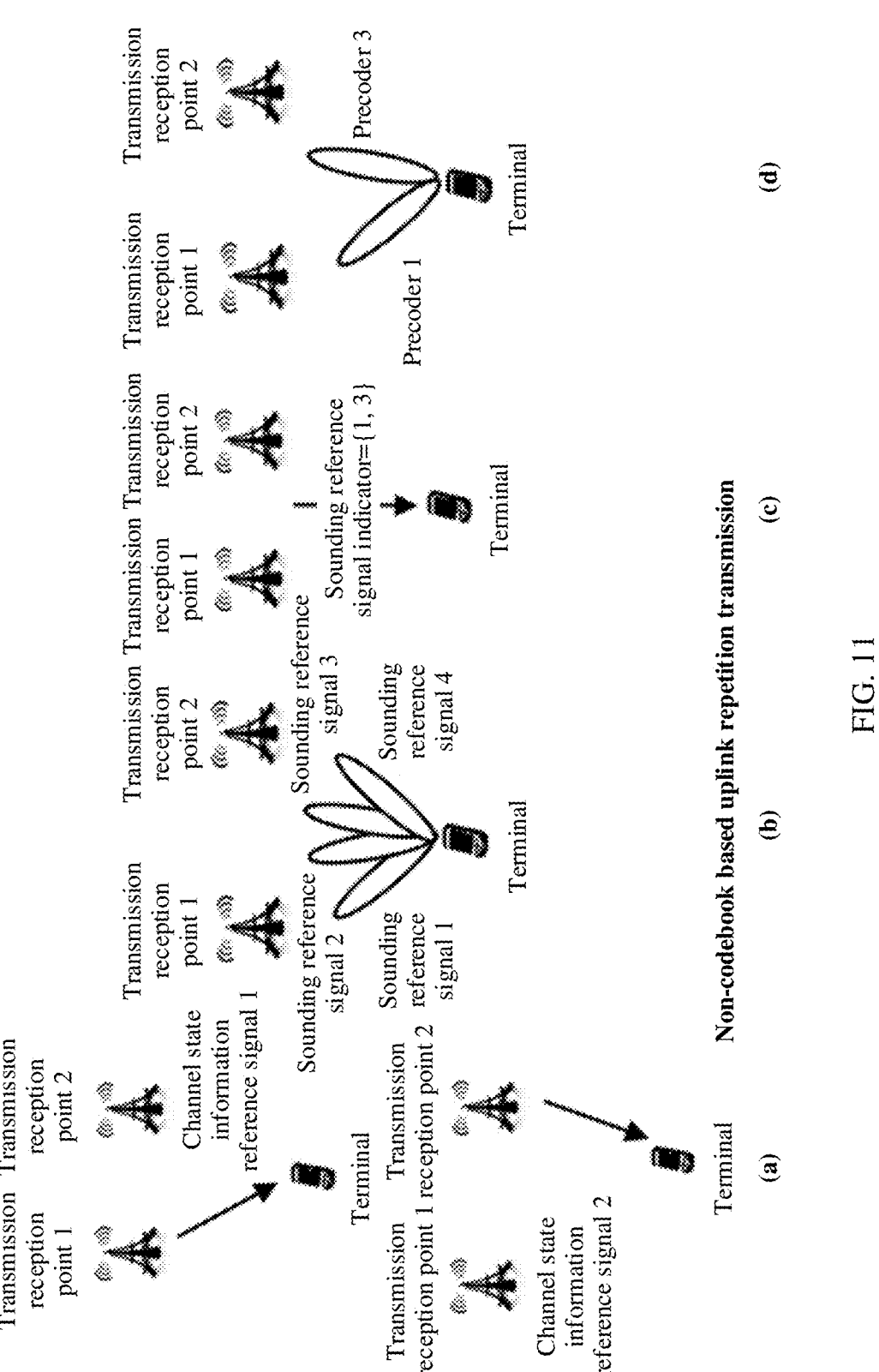
FIG. 11 is a schematic diagram of PUSCH repetition transmission in an NCB scheme according to an embodiment of this application.

In Embodiment 3, a main procedure of PUSCH repetition transmission in an NCB scheme, as shown in FIG. 11, is mainly described. Specific implementation steps are as follows:

Step (a): A TRP 1 and a TRP 2 separately send a CSI-RS 1 and a CSI-RS 2 to UE, where CSI-RSs sent by different TRPs are configured as different QCL relationships, and manners of sending the two CSI-RSs are not limited. For example, the two CSI-RSs may be sent in a time division multiplexing manner, or sent by using a same frequency domain resource/port or different frequency domain resources/ports.

Step (b): The UE performs channel measurement based on the plurality of received CSI-RSs, to respectively obtain a plurality of SRS precoders; and the UE configures a plurality of SRS resources based on the plurality of SRS precoders, and sends a plurality of SRSs.

Specifically, the UE obtains a plurality of channels by performing measurement based on the plurality of CSI-RSs, and selects the plurality of SRS precoders. Using two TRPs as an example, the UE separately performs channel estimation based on the CSI-RS 1 delivered by the TRP 1 and the CSI-RS 2 delivered by the TRP 2 to obtain two channel matrices H1 and H2. In this case, the UE needs to separately select SRS precoders based on the two channel matrices, that is, needs to separately perform singular value decomposition (singular value decomposition, SVD) on H1 and H2 to obtain eigenvectors, to be specific, performs SVD([H1]) to obtain an eigenvector V1 and selects an SRS precoder 1 based on the eigenvector V1, and performs SVD([H2]) to obtain an eigenvector V2 and selects an SRS precoder 2 based on the eigenvector V2; and configures two SRS resources corresponding to the SRS precoder 1 and the SRS precoder 2. The plurality of configured SRS resources may be a plurality of SRS resources in one SRS resource set, or a plurality of SRS resources in a plurality of SRS resource sets.

In a specific implementation, there may be a plurality of methods for configuring the plurality of SRS resources by the UE.

(1) The UE may choose to configure M SRS resource sets. Each SRS resource set includes a maximum of four SRS resources, and each SRS resource includes X SRS ports, where M may be greater than 1, for example, equal to 2. In this case, if X=1 and Y=2, the CSI-RS 1 corresponds to four SRS resources, which are respectively SRS resources 1, 2, 3, and 4, in an SRS resource set 1, and the CSI-RS 2 corresponds to four SRS resources, which are respectively SRS resources 5, 6, 7, and 8 in an SRS resource set 2 (which may also be referred to as SRS resources 1, 2, 3, and 4 in the SRS resource set 2). Alternatively, M=1, X=2, and Y=4, and two SRS ports of each SRS resource respectively correspond to measurement results of the two CSI-RSs. For example, each of the four SRS resources 1, 2, 3, and 4 in the SRS resource set 1 includes two SRS ports, an SRS port 1 of the four SRS resources corresponds to the CSI-RS 1, and an SRS port 2 of the four SRS resources corresponds to the CSI-RS 2.

(2) The UE configures one SRS resource set, remains a total maximum of four SRS resources unchanged, and obtains 4/N SRS resources through measurement based on each CSI-RS. For example, when receiving N=2 CSI-RSs, the UE still sends a maximum of four SRS resources, but each CSI-RS corresponds to two SRS resources, that is, the CSI-RS 1 corresponds to SRS resources 1 and 2, and the CSI-RS 2 corresponds to SRS resources 3 and 4.

(3) No matter which configuration method is used, the UE may choose to send the SRSs in a time division multiplexing manner or send the SRSs by using different ports. For example, according to the configuration method in (1), the UE may configure two SRS resource sets, which respectively correspond to channels obtained by performing measurement by using the two CSI-RSs and the SRSs are sent by using different time domain resources, or the SRSs are sent by using different ports.

Step (c): The network device selects appropriate precoders from the plurality of SRS precoders, and delivers the appropriate precoders by using an SRI. For example, as shown in FIG. 11, the network device selects SRS resources whose index numbers are 1 and 3 from the SRS resources 1 and 2 and the SRS resources 3 and 4, and indicates the SRS resources 1 and 3 to the UE by using an SRI field, to indirectly indicate the precoders to be used by the UE. In a specific implementation, the plurality of precoders are jointly indicated by one SRI in the SRI field; or the plurality of precoders are independently indicated by using a plurality of SRIs in the SRI field.

Joint indication by using the SRI field means that one SRI is used to indicate all the selected precoders. Independent indication by using the plurality of SRIs means that different SRIs are used to indicate different precoders selected based on different CSI-RSs. The different SRIs may be a plurality of different SRI fields, a new DCI field, different bits in an SRI field, a new SRI table, or a reserved entry in an existing SRI table. For details, refer to the descriptions in Embodiment 1 herein. Details are not described again.

Step (d): The UE selects the precoders and a rank based on the SRI, and sends a PUSCH. For example, if the SRI indicates the SRS resources 1 and 3, the UE sends the PUSCH by using the precoders corresponding to the SRS resources 1 and 3.

A process of determining the precoders based on the indication of the SRI is described in the foregoing NCB scheme. Different from the foregoing single-station PUSCH repetition transmission scenario, in this embodiment, the SRI indicates the plurality of precoders, and the UE needs to determine, based on the indication of the SRI field, the plurality of precoders for repeatedly sending the plurality of PUSCHs.

As shown in FIG. 9, a terminal may send PUSCHs 1, 3, 5, and 7 by using a precoder 1, and repeatedly send PUSCHs 2, 4, 6, and 8 by using a precoder 2. Different from the single-station PUSCH repetition transmission, in a multi-station scenario, the UE sends PUSCHs to a plurality of TRPs, and different precoders are used for the PUSCHs, so that a diversity gain is obtained. In addition, when the terminal moves to different cell coverage areas, transmission decoding performance can also be ensured, and uplink transmission reliability is improved.

Embodiment 4

Figure 12:
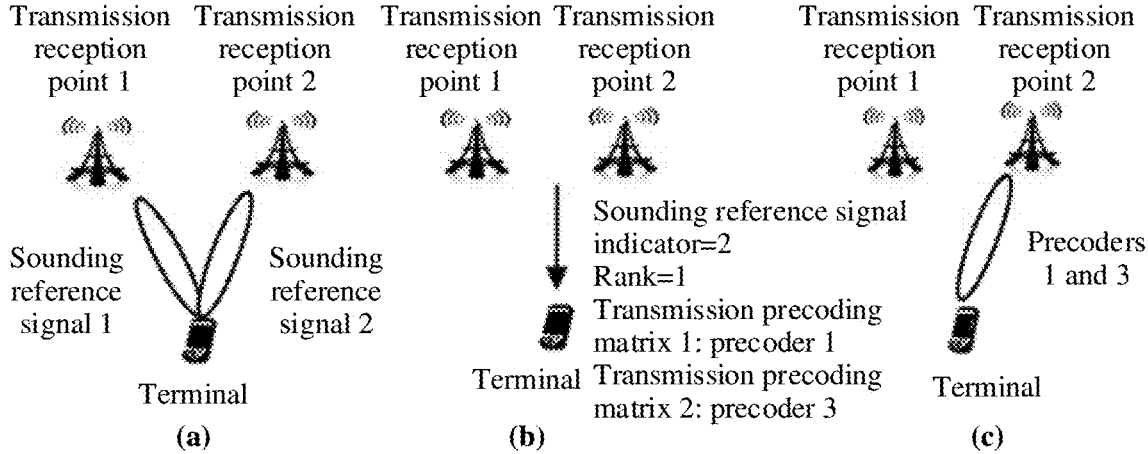
FIG. 12 is a schematic diagram of PUSCH repetition transmission in a CB scheme according to an embodiment of this application.

In Embodiment 4, a main procedure of PUSCH repetition transmission in a CB scheme, as shown in FIG. 12, is mainly described. Specific implementation steps are as follows:

Step (a): UE respectively sends SRSs to a TRP 1 and a TRP 2. For example, as shown in FIG. 12, there may be two SRSs, or there may be more than two SRSs, for example, four SRSs.

Step (b): The TRP performs channel measurement based on the SRSs to obtain an uplink channel state, selects appropriate precoders and a quantity of ranks based on a channel condition, and delivers the precoders and the quantity of ranks to the UE by using DCI. To be specific, the TRP sends, to the UE by using the DCI, indication information indicating the plurality of precoders. In an implementation, the indication information may be separately sent by the TRP 1 and the TRP 2 to the UE. The indication information sent by the different TRPs is configured as different QCL relationships or different TCI states. In other words, different precoders correspond to different TRPs. In another implementation, the indication information may alternatively be sent by the TRP 1 or the TRP 2 to the UE. The indication information is configured as different QCL relationships or different TCI states by configuring different QCL relationships or different TCI states in another field in the DCI in which the indication information is located. For example, a plurality of TCI states may be configured in a TCI field in the DCI, to indicate that different precoders indicated by a TPMI field included in the DCI correspond to different TRPs. In this case, because there may be a plurality of channel conditions in a multi-station state, the TPMI field in the DCI needs to be separately determined based on H1 and H2. This may be implemented in the following plurality of manners:

(1) A quantity of bits of the TPMI may be increased to indicate a plurality of TPMIs. For example, as shown in Table 1, a maximum of four bits (which may indicate 16 entries (entries)) are required to indicate a quantity of layers and TPMIs. However, because the quantity of layers may be already determined by using the first four bits, for example, layer=1, candidate TPMIs may be only 0 to 5, so that the second segment of the TPMI field needs to indicate only the TPMIs. For example, three bits (0 to 8) are used to indicate the TPMIs 0 to 5. As shown in Table 7, on an original basis that four bits indicate a TPMI table of 16 entries, three bits are added to indicate eight entries (index numbers 16 to 23). In a codebookSubset=fullyAndPartialAndNonCoherent mode, index numbers 0 to 5 are respectively used to indicate TPMI=0, TPMI=1, TPMI=2, TPMI=3, TPMI=4, and TPMI=5. A corresponding quantity of layers is learned from the first four bits, and therefore does not need to be repeatedly indicated by the index numbers 0 to 5. For example, the UE receives the indication information, and the first four bits are 0111. By searching Table 1, a corresponding index number is 8, a quantity of layers is 2, and TPMI=2. Similarly, by searching Table 5 based on the last three bits 011, a corresponding index number is 3, a corresponding TPMI is 3, and it is already determined, based on the first four bits, that the quantity of layers is 2. Therefore, the indication information received by the UE indicates two layers, TPMI=0, and TPMI=3. This means that when a PUSCH is repeatedly transmitted by using two layers, a precoder corresponding to TPMI=0 is used for one PUSCH transmission, and a precoder corresponding to TPMI=3 is used for another PUSCH transmission.

In a codebookSubset=NonCoherent mode, index numbers 0 and 1 are used to respectively indicate TPMI=0 and TPMI=1. Meanings are not described in detail again.

(2) In another implementation, a reserved (reserved) entry (entry) in an existing TPMI table is used, and the entry is enabled to indicate the plurality of TPMIs. For example, in Table 8, content indicated by an entry whose index number is 9 is: 1 layer, TPMI=1, and TPMI=3, and two TPMIs are respectively obtained through measurement by using two SRS resources, and respectively indicate different precoders. This means that when a PUSCH is repeatedly transmitted by using one layer, a precoder corresponding to TPMI=0 is used for one PUSCH transmission, and a precoder corresponding to TPMI=3 is used for another PUSCH transmission.

Alternatively, for example, entry 10: 2 layers, TPMI=0, and TPMI=2. This means that when a PUSCH is repeatedly transmitted by using two layers, a precoder corresponding to TPMI=0 is used for one PUSCH transmission, and a precoder corresponding to TPMI=3 is used for another PUSCH transmission. In this embodiment, the quantity of layers in the entry, for example, 2 layers in the table, is 2, and indicates a sum of quantities of layers corresponding to all the TPMIs; or may indicate a quantity of ranks corresponding to one of the TPMIs; in this case, a rank corresponding to another TPMI is also the quantity of layers.

(3) When a network device indicates, to the UE in a specific manner, that a current transmission manner is multi-station uplink transmission, a new TPMI table may alternatively be used. The UE may obtain a plurality of TPMIs by using the new TPMI table. Each entry included in the new Table 9 and the new Table 10 may indicate a plurality of TPMIs. Descriptions of the entry are the same as those in (2).

For example, in Table 9, five bits are used to indicate 32 entries, a row corresponding to each entry (except reserved) includes one layer and two TPMIs, and the quantity of layers indicates a quantity of layers corresponding to each of the two TPMIs.

For example, an entry whose index number is 0 is used to indicate layer=1: TPMI=0 and TPMI=1. This means that when the UE repeatedly transmits the PUSCH by using one layer based on the indication information, not only a precoder corresponding to TPMI=0 may be used, but also a precoder corresponding to TPMI=1 may be used. For another example, an entry whose index number is 15 is used to indicate 2 layers: TPMI=0 and TPMI=1. This means that the UE repeatedly transmits the PUSCH by using two layers based on the indication information. A precoder corresponding to TPMI=0 may be used for one repetition transmission, and a precoder corresponding to TPMI=1 may be used for another repetition transmission.

It should be noted that, 2 layers: TPMI=0 corresponding to an index number 1 of a noncoherent codebook subset indicates that when the UE repeatedly transmits the PUSCH by using two layers, a same precoder corresponding to TPMI=0 is used.

TABLE 9

| Bit field mapped to index (Bit field mapped to index) | Codebook subset = Fully, partial, and non-coherent (codebookSubset = fullyAnd PartialAndNonCoherent) | Bit field mapped to index (Bit field mapped to index) | Codebook subset = Non-coherent (codebookSubset = nonCoherent) |
|---|---|---|---|
| 0 | 1 layer: TPMI = 0, TPMI = 1 | 0 | 1 layer: TPMI = 0, TPMI = 1 |
| 1 | 1 layer: TPMI = 0, TPMI = 2 | 1 | 2 layers: TPMI = 0 |
| 2 | 1 layer: TPMI = 0, TPMI = 3 | 2 | Reserved |
| 3 | 1 layer: TPMI = 0, TPMI = 4 | | |
| 4 | 1 layer: TPMI = 0, TPMI = 5 | | |
| 5 | 1 layer: TPMI = 1, TPMI = 2 | | |
| 6 | 1 layer: TPMI = 1, TPMI = 3 | | |
| 7 | 1 layer: TPMI = 1, TPMI = 4 | | |
| 8 | 1 layer: TPMI = 1, TPMI = 5 | | |
| 9 | 1 layer: TPMI = 2, TPMI = 3 | | |
| 10 | 1 layer: TPMI = 2, TPMI = 4 | | |
| 11 | 1 layer: TPMI = 2, TPMI = 5 | | |
| 12 | 1 layer: TPMI = 3, TPMI = 4 | | |
| 13 | 1 layer: TPMI = 3, TPMI = 5 | | |
| 14 | 1 layer: TPMI = 4, TPMI = 5 | | |
| 15 | 2 layers: TPMI = 0, TPMI = 1 | | |
| 16 | 2 layers: TPMI = 0, TPMI = 2 | | |
| 17 | 2 layers: TPMI = 1, TPMI = 2 | | |
| 18-31 | Reserved | | |

For another example, in Table 10, five bits are used to indicate 32 entries, a row in each entry (except reserved) includes one layer and two TPMIs, and the quantity of layers indicates a sum of the quantities of layers respectively corresponding to the two TPMIs.

An entry whose index number is 0 is used to indicate 2 layers: TPMI=0 and TPMI=1. This means that the UE repeatedly sends the PUSCH based on the indication information. A precoder corresponding to TPMI=0 and one layer may be used for one PUSCH transmission, and a precoder corresponding to TPMI=1 and one layer may be used for another PUSCH transmission. Therefore, a sum of the quantities of layers corresponding to the two TPMIs is 1+1=2. For another example, an entry whose index number is 15 is used to indicate 4 layers: TPMI=0 and TPMI=1. This means that the UE repeatedly sends the PUSCH based on the indication information. A precoder corresponding to TPMI=0 and two layers may be used for one PUSCH transmission, and a precoder corresponding to TPMI=1 and two layers may be used for another PUSCH transmission. Therefore, a sum of the quantities of layers corresponding to the two TPPMIs is 2+2=4.

TABLE 10

| Bit field mapped to index (Bit field mapped to index) | Codebook subset = Fully, partial, and non-coherent (codebookSubset = fullyAnd PartialAndNonCoherent) | Bit field mapped to index (Bit field mapped to index) | Codebook subset = Non-coherent (codebookSubset = nonCoherent) |
|---|---|---|---|
| 0 | 2 layers: TPMI = 0, TPMI = 1 | 0 | 2 layer: TPMI = 0, TPMI = 1 |
| 1 | 2 layers: TPMI = 0, TPMI = 2 | 1 | 4 layers: TPMI = 0 |
| 2 | 2 layers: TPMI = 0, TPMI = 3 | 2-31 | Reserved |
| 3 | 2 layers: TPMI = 0, TPMI = 4 | | |
| 4 | 2 layers: TPMI = 0, TPMI = 5 | | |
| 5 | 2 layers: TPMI = 1, TPMI = 2 | | |
| 6 | 2 layers: TPMI = 1, TPMI = 3 | | |
| 7 | 2 layers: TPMI = 1, TPMI = 4 | | |
| 8 | 2 layers: TPMI = 1, TPMI = 5 | | |
| 9 | 2 layers: TPMI = 2, TPMI = 3 | | |
| 10 | 2 layers: TPMI = 2, TPMI = 4 | | |
| 11 | 2 layers: TPMI = 2, TPMI = 5 | | |
| 12 | 2 layers: TPMI = 3, TPMI = 4 | | |
| 13 | 2 layers: TPMI = 3, TPMI = 5 | | |
| 14 | 2 layers: TPMI = 4, TPMI = 5 | | |
| 15 | 4 layers: TPMI = 0, TPMI = 1 | | |
| 16 | 4 layers: TPMI = 0, TPMI = 2 | | |
| 17 | 4 layers: TPMI = 1, TPMI = 2 | | |
| 18-31 | Reserved | | |

Step (c): The UE obtains indexes of the plurality of precoders and a quantity of actually transmitted uplink ranks based on an SRI, a TRI, or a TPMI in the DCI, to send the PUSCH. For example, as shown in FIG. 12, a TPMI 1 indicates a precoder 1, and a TPMI 2 indicates a precoder 3. That is, the UE sends the PUSCH by using the precoder 1 and the precoder 3.

A process of determining the precoders as indicated by the SRI, the TRI, and the TPMI in the DCI is described in the foregoing CB scheme. Different from the foregoing descriptions, in this embodiment, the TPMI indicates the plurality of precoders, and the UE needs to determine, based on the indication of the TPMI field, the plurality of precoders for repeatedly sending the plurality of PUSCHs.

For the NCB transmission scheme and the CB transmission scheme, when the network device indicates the plurality of precoders (by using a plurality of SRIs in the NCB scheme, or by using a plurality of TPMIs in the CB scheme) to the UE in the foregoing manner, the UE may repeatedly transmit the PUSCHs, to further improve transmission reliability. For the PUSCH repetition transmission, the UE may select a plurality of manners to send a plurality of PUSCHs. For example, the UE sends the plurality of PUSCHs by using a same port or a plurality of different ports (ports), by using a same time domain resource or different time domain resources, or by using a same frequency domain resource or different frequency domain resources.

The following uses different ports, different time domain resources, and different frequency domain resources as examples. How the UE repeatedly sends a plurality of PUSCHs by using a same port, a same time domain resource, or a same frequency domain resource is simpler, so that details are not described herein again.

(i) Using Different Ports (PUSCH Spatial Multiplexing Transmission)

The UE may choose to use one or more different ports for sending a plurality of PUSCHs. In this embodiment, the port may be an SRS port for sending an SRS or a port for sending a PUSCH. This is not limited in this embodiment of this application.

Figure 13:
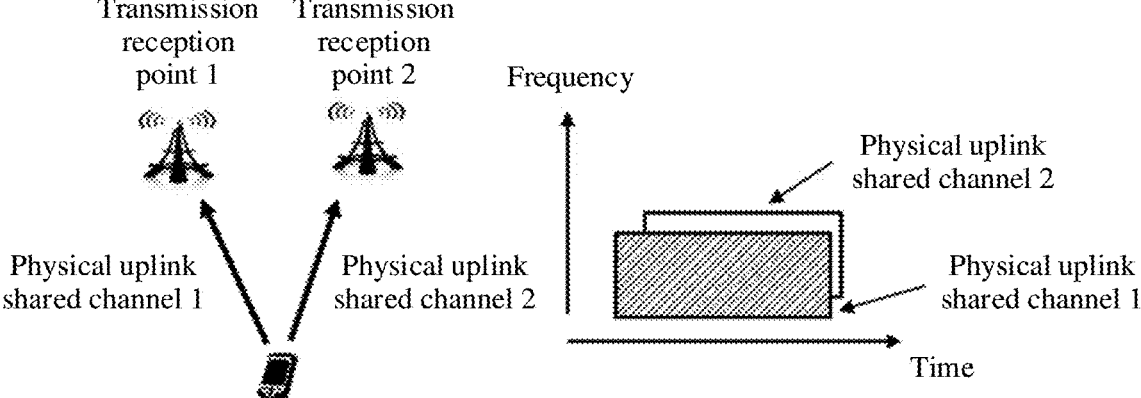
FIG. 13 is a schematic diagram of PUSCH spatial multiplexing transmission according to an embodiment of this application.

A specific sending manner is shown in FIG. 13. A PUSCH 1 and a PUSCH 2 are sent by using an identical time domain resource and an identical frequency domain resource, but by using different transmit ports. For example, if both transmission of the PUSCH 1 and transmission of the PUSCH 2 are rank-1 transmission (that is, both the PUSCH 1 and the PUSCH 2 are transmitted by using one port), the UE may send the PUSCH 1 by using a port 1 and send the PUSCH 2 by using a port 2. If both transmission of the PUSCH 1 and transmission of the PUSCH 2 are rank-2 transmission (that is, both the PUSCH 1 and the PUSCH 2 are transmitted by using two ports), the UE may send the PUSCH 1 by using ports 1 and 2, and send the PUSCH 2 by using ports 3 and 4.

(ii) Using Different Time Domain Resources (PUSCH Time Division Multiplexing Transmission)

Figure 14:
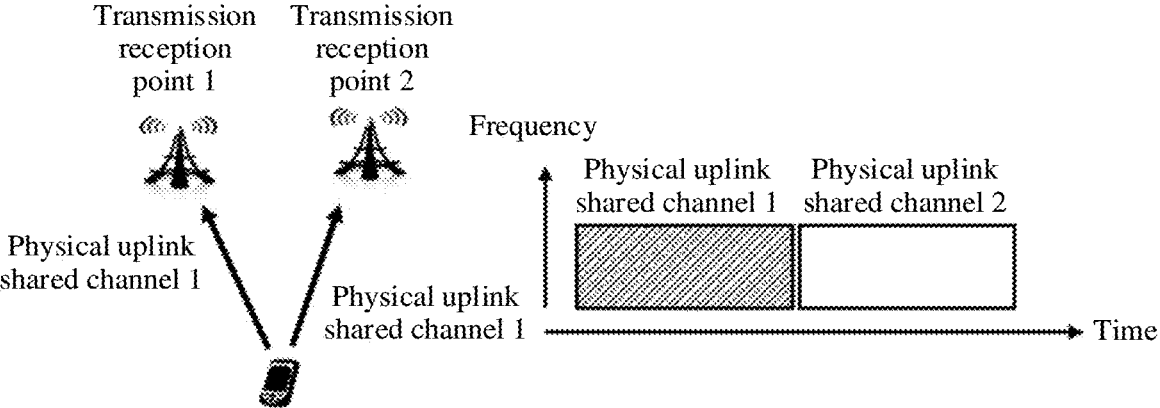
FIG. 14 is a schematic diagram of PUSCH time division multiplexing transmission according to an embodiment of this application.
Figure 15:
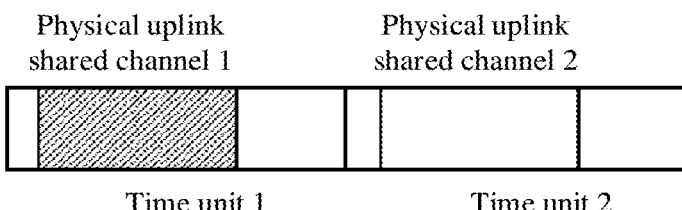
FIG. 15 is a schematic diagram of distribution of different PUSCH time domain positions according to an embodiment of this application.

In comparison with a slot aggregation transmission technology in which different ports are used for spatial multiplexing transmission, the UE may alternatively choose to repeatedly use a selected precoder in a plurality of consecutive or separated transmission time units by using different time domain resources, to perform PUSCH repetition transmission. A specific sending manner is shown in FIG. 14. A PUSCH 1 and a PUSCH 2 are sent by using an identical frequency domain resource and an identical transmit port, but time domain positions of the PUSCH 1 and the PUSCH 2 are different. Specifically, the different time domain positions of the PUSCHs may have the following several cases:

As shown in FIG. 15, different consecutive slots (for example, time units in the figure) are used. A PUSCH 1 is located in a slot 1, and a PUSCH 2 is located in a slot 2. Specifically, the PUSCH 1 and the PUSCH 2 are respectively located in same symbols or different symbols of the slot 1 and the slot 2. For example, the slot 1 and the slot 2 each include 14 symbols, the PUSCH 1 is located in symbols 4 to 6 of the slot 1, and the PUSCH is located in symbols 4 to 6 of the slot 2; or the PUSCH 1 is located in symbols 3 and 4 of the slot 1, and the PUSCH 2 is located in symbols 5 and 6 of the slot 2

Figure 16:
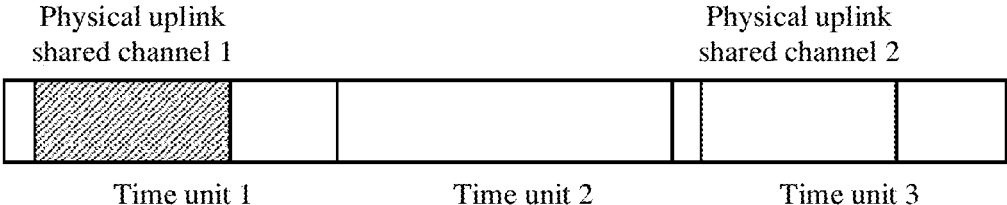
FIG. 16 is another schematic diagram of distribution of different PUSCH time domain positions according to an embodiment of this application.

As shown in FIG. 16, different inconsecutive slots are used. For example, a PUSCH is located in a slot 1, a PUSCH 2 is located in a slot 3, and the slot 1 and the slot 3 are inconsecutive. Because downlink symbols need to be avoided, the PUSCH 1 and the PUSCH 2 may be located in same symbols or different symbols of the slot 1 and the slot 3.

Figure 17:
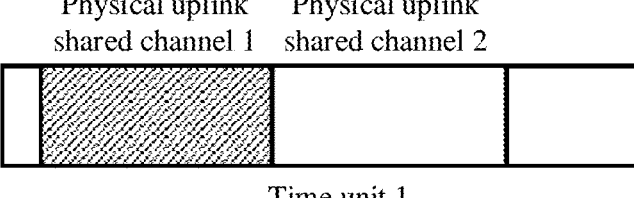
FIG. 17 is another schematic diagram of distribution of different PUSCH time domain positions according to an embodiment of this application.

As shown in FIG. 17, different consecutive mini-slots are used. A PUSCH 1 and a PUSCH 2 are located in different symbol positions in a same slot, and the different symbol positions are consecutive. For example, the PUSCH 1 is located on symbols 3 and 4 of a slot 1, and the PUSCH 2 is located on symbols 5 and 6 of the slot 1.

Figure 18:
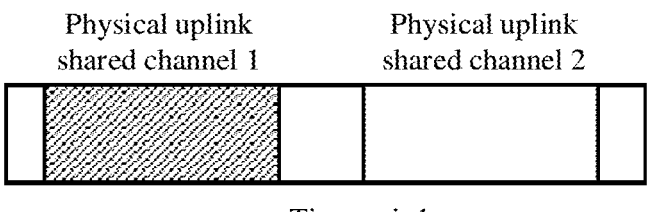
FIG. 18 is another schematic diagram of distribution of different PUSCH time domain positions according to an embodiment of this application.

As shown in FIG. 18, different inconsecutive mini-slots are used. Because downlink symbols in a slot need to be avoided, a PUSCH 1 and a PUSCH 2 may be located at different symbol positions in a same slot but are inconsecutive. For example, the PUSCH 1 is located on symbols 3 and 4 of a slot 1, and the PUSCH 2 is located on symbols 7 and 8 of the slot 1.

Figure 19:
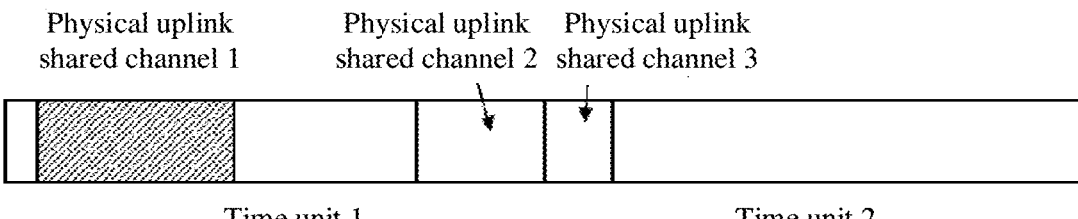
FIG. 19 is another schematic diagram of distribution of different PUSCH time domain positions according to an embodiment of this application.

As shown in FIG. 19, different inconsecutive mini-slots are used. If a PUSCH crosses a slot boundary, the PUSCH may be split into two PUSCHs. For example, a PUSCH 2 in FIG. 19 is split into a PUSCH 2 and a PUSCH 3 by a slot boundary. In this case, the PUSCH 2 and the PUSCH 3 may use a same precoder or different precoders. This is not limited in this embodiment of this application.

(iii) Using Different Frequency Domain Resources (PUSCH Frequency Division Multiplexing Transmission)

In addition to the foregoing two repetition transmission manners, the UE may alternatively choose to use different frequency domain resources and repeatedly use a selected precoder, to perform PUSCH repetition transmission.

Figure 20:
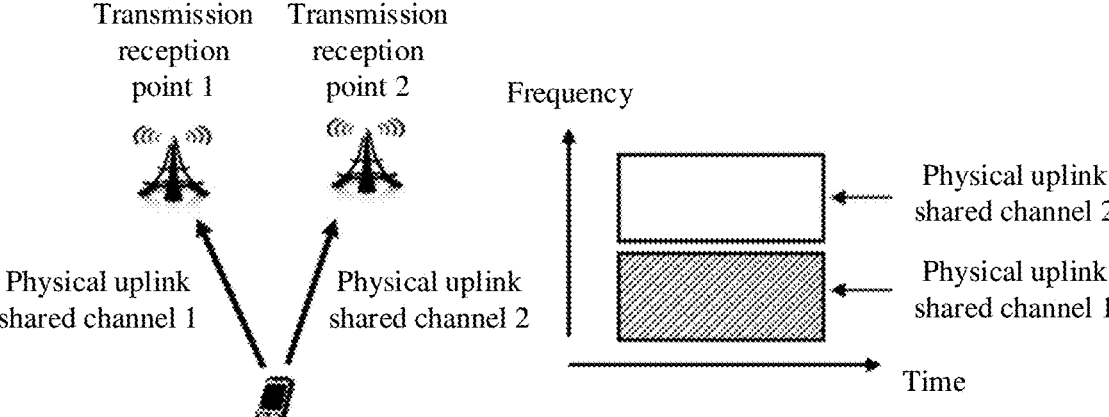
FIG. 20 is a schematic diagram of PUSCH frequency division multiplexing transmission according to an embodiment of this application.

As shown in FIG. 20, a PUSCH 1 and a PUSCH 2 use a same time domain resource, but use different frequency domain resources (for example, resource blocks (resource blocks, RBs) or physical resource groups (Physical Resource Groups, PRGs)). For example, the different frequency domain resources may be consecutive frequency domain resources or inconsecutive frequency domain resources. This is not limited in this embodiment of this application. In this case, the UE sends, on different frequency domain resources, the PUSCHs (the PUSCH 1 and the PUSCH 2) with different precoders.

Figures 21, 22, 23:
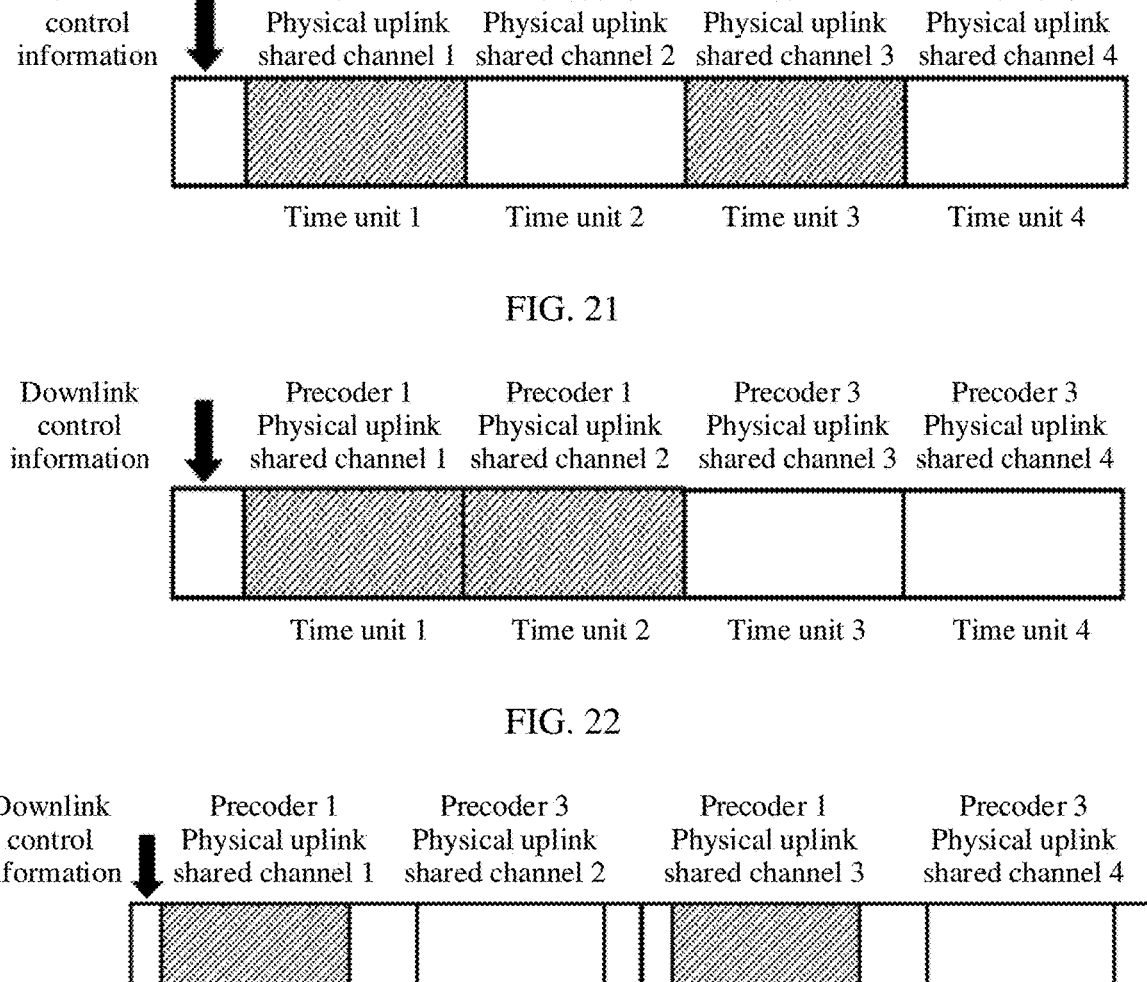
FIG. 21 is a schematic diagram in which PUSCHs are transmitted in four time units according to an embodiment of this application.
FIG. 22 is a schematic diagram in which PUSCHs are transmitted in four time units according to an embodiment of this application.
FIG. 23 is a schematic diagram in which PUSCHs are transmitted in time units according to an embodiment of this application.

In the foregoing plurality of repetition transmission manners, when the UE needs to use a plurality of precoders, for example, a precoder 1 is used to send a PUSCH 1, and a precoder 3 is used to send a PUSCH 2, the UE may perform PUSCH repetition transmission based on a specific precoder pattern (pattern) (where all the PUSCH 1 to a PUSCH 4 are a same PUSCH, and the same PUSCH is repeatedly sent for four times herein), for example, precoders {1, 3, 1, 3} in FIG. 21. Alternatively, other different repetition manners may be selected, for example, precoders {A, B}, precoders {A, B, A, B}, and precoders {A, A, B, B}. For example, the indication information sent by the TRP to the UE by using the DCI is precoders {1, 3}, and the TRP indicates the UE to repeatedly transmit the PUSCH for four times in an {A, B, A, B} manner in four consecutive time units (slots) in a time division multiplexing transmission manner. After receiving the indication information, the UE transmits the PUSCH by using precoders {1, 3, 1, 3}. The precoder 1 is used to send a PUSCH 1, the precoder 3 is used to send a PUSCH 2, the precoder 1 is used to send a PUSCH 3, and the precoder 3 is used to send a PUSCH 4. A schematic diagram of transmission is shown in FIG. 21.

In another implementation, the indication information sent by the TRP to the UE by using the DCI is precoders {1, 3}, and the TRP indicates the UE to repeatedly transmit the PUSCH for four times in an {A, A, B, B} manner in four consecutive time units (slots) in a time division multiplexing transmission manner. After receiving the indication information, the UE transmits the PUSCH by using precoders {1, 1, 3, 3}. The precoder 1 is used to send a PUSCH 1, the precoder 1 is used to send a PUSCH 2, the precoder 3 is used to send a PUSCH 3, and the precoder 3 is used to send a PUSCH 4. A schematic diagram of transmission is shown in FIG. 22 (where all the PUSCH 1 to the PUSCH 4 are a same PUSCH, and the same PUSCH is repeatedly sent for four times herein). There is another manner in which the UE repeatedly sends a plurality of PUSCHs in slots by using different precoders. PUSCH transmission reliability can be improved provided that different precoders are used for at least two of the PUSCHs. Details are not described herein.

In addition, for PUSCH repetition transmission in a time unit (slot), namely, PUSCH repetition transmission at a mini-slot level, the network device may alternatively indicate to repeatedly transmit the PUSCH in the slot by using different precoders. For example, as shown in FIG. 23, a PUSCH 1 and a PUSCH 2 are repeatedly sent in a slot 1, the PUSCH 1 is repeatedly transmitted by using a precoder 1, and the PUSCH 2 is repeatedly transmitted by using a precoder 3 (where all the PUSCH 1 to a PUSCH 4 are a same PUSCH, and the same PUSCH is repeatedly sent for four times herein). Further, the PUSCH 3 and the PUSCH 4 may be repeatedly sent in a slot 2. The PUSCH 3 is repeatedly transmitted by using the precoder 1, and the PUSCH 4 is repeatedly transmitted by using the precoder 3. Alternatively, in another implementation, a PUSCH 1 and a PUSCH 2 in a slot 1 are repeatedly transmitted by using a precoder 1, and a PUSCH 3 and a PUSCH 4 in a slot 2 are repeatedly transmitted by using a precoder 3.

There is another manner in which the UE repeatedly sends a plurality of PUSCHs in slots by using different precoders. PUSCH transmission reliability can be improved provided that different precoders are used for at least two of the PUSCHs. Details are not described herein.

In the foregoing Embodiment 3 and Embodiment 4, the existing CB and NCB transmission schemes are improved, so that uplink PUSCH repetition transmission in a multi-station scenario is implemented, uplink decoding performance is improved, and transmission reliability is improved.

The following describes another technical solution for improving uplink transmission reliability: PUSCH joint reception.

Embodiment 5

Figure 24:
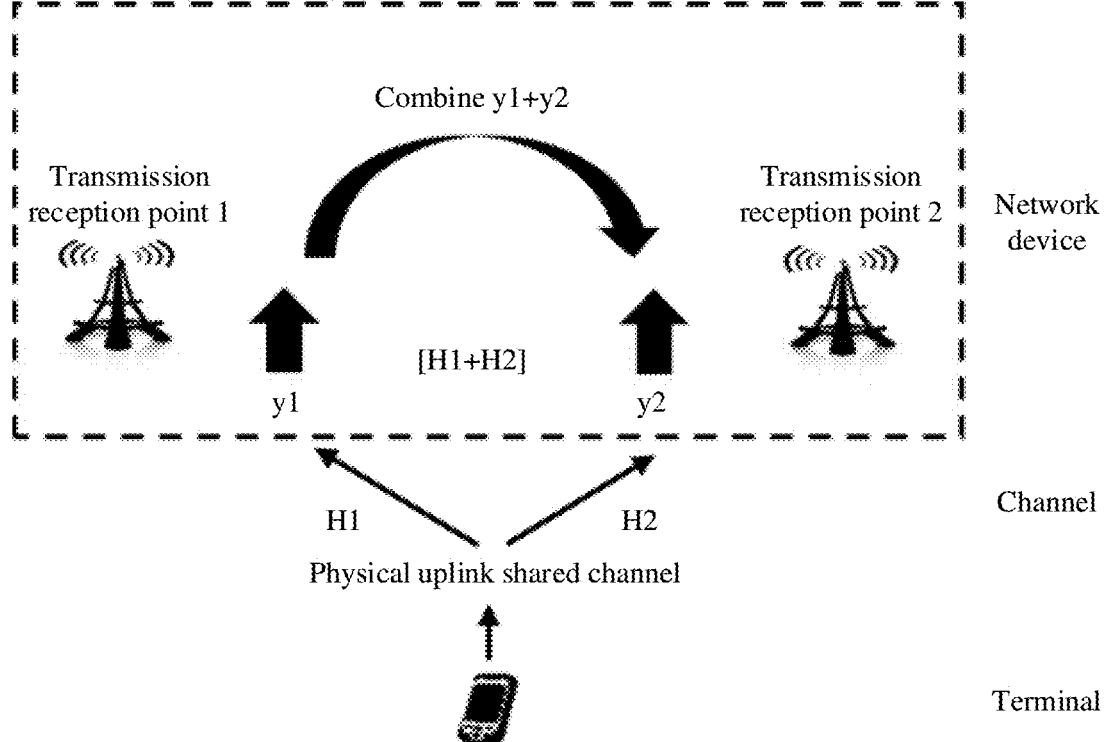
FIG. 24 is a schematic diagram of PUSCH joint reception according to an embodiment of this application.

In Embodiment 5, a PUSCH joint reception technology is mainly described. As shown in FIG. 24, in this technical solution, UE assumes that transmission channel matrices of a plurality of TRPs may be combined into a transmission channel matrix of a larger dimension, which is similar to a downlink distributed multiple-input multiple-output (distributed multiple-input multiple-output, DMIMO) technology. In this case, a network device directly combines PUSCHs instead of combining soft information, demodulates a combined PUSCH (received uplink signals y1+y2 in the figure), and performs subsequent decoding after obtaining separate soft information.

A difference between uplink joint reception and PUSCH repetition transmission lies in that an uplink precoder used for sounding is determined by using a joint channel matrix, that is, when the network device or the UE selects a precoder, the precoder is determined by using the joint matrix of two transmission channel matrices.

Embodiment 6

Figure 25:
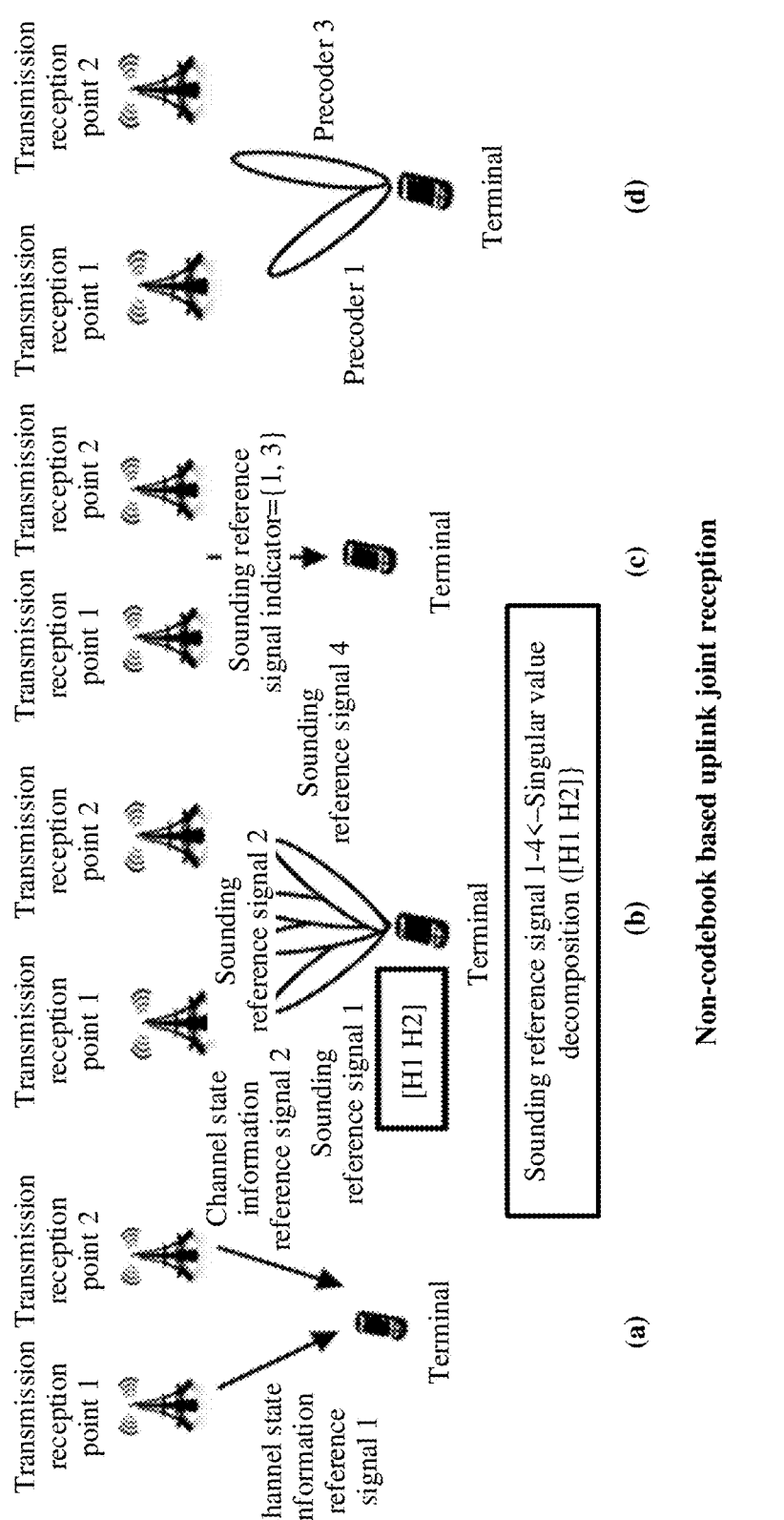
FIG. 25 is a schematic diagram of PUSCH joint reception in an NCB scheme according to an embodiment of this application.

In Embodiment 6, a main procedure of PUSCH joint reception in an NCB scheme, as shown in FIG. 25, is mainly described.

Step (a): A TRP 1 and a TRP 2 separately send a CSI-RS 1 and a CSI-RS 2 to UE, where CSI-RSs sent by different TRPs are configured as different QCL relationships, and manners of sending the two CSI-RSs are not limited. For example, the two CSI-RSs may be sent by using a same time domain resource or different time domain resources, or sent by using a same frequency domain resource/port or different frequency domain resources/ports.

Step (b): The UE performs joint channel measurement based on the plurality of received channel state information reference signals CSI-RSs, to obtain one or more SRS precoders.

Specifically, after receiving the plurality of CSI-RSs, the UE performs joint channel measurement on the plurality of CSI-RSs, that is, considers that channels H1 and H2 can be combined as a joint channel matrix $$\begin{bmatrix} H1 \\ H2 \end{bmatrix},$$

then performs singular value decomposition (SVD) on $$\begin{bmatrix} H1 \\ H2 \end{bmatrix}$$

to obtain an overall eigenvector $$V{:}SVD\left(\begin{bmatrix} H1 \\ H2 \end{bmatrix}\right),$$

and then selects the SRS precoder based on the eigenvector V. The terminal configures a plurality of SRS resources based on the selected SRS precoder, to send a plurality of SRSs. As shown in FIG. 25, the terminal configures four SRS resources based on the SRS precoder, to respectively send sounding reference signals, which are respectively an SRS 1, an SRS 2, an SRS 3, and an SRS 4.

The following describes the preceding steps:

(1) A difference between the method in this embodiment and the foregoing PUSCH repetition transmission scheme lies in, for example:

Assuming that each of the two TRPs is four transmit ports and the UE is two receive ports, in Embodiment 3, the UE needs to separately perform SVD on two [4*2] channel matrices, to obtain two SRS precoders respectively through selection; however, in Embodiment 6, SVD is directly performed on a [8*2] joint channel matrix and one or more SRS precoders are selected.

(2) In this embodiment, when configuring the SRS resources, the UE may comply with an existing protocol, that is, configure one SRS resource set including a maximum of four SRS resources. Alternatively, a new configuration manner may be used. For example, the UE configures X SRS resource sets each including a maximum of Y SRS resources, and each SRS resource includes Z SRS ports. X/Y/Z is not limited, that is, a quantity of SRS resource sets/SRS resources/SRS ports is not limited.

(3) In a multi-station scenario or in a case in which the UE receives a plurality of CSI-RSs, to be specific, the UE indicates, in a specific manner, for example, based on a specific parameter/dynamic signaling/semi-static signaling, that a current transmission scenario is a multi-station uplink transmission scheme; or when the UE receives the plurality of CSI-RSs, the UE performs joint channel measurement based on all the CSI-RSs to obtain one or more SRS precoders, and configures a plurality of corresponding SRS resources based on the SRS precoder; in other words, the plurality of SRS resources are separately configured by using the SRS precoder obtained through the joint channel measurement based on the plurality of CSI-RSs. For example, a CSI-RS 1 & a CSI-RS 2 . . . correspond to SRS resources 1, 2, 3, and 4. A manner in which the UE is indicated as being in a multi-station transmission scenario is not limited in this embodiment of this application.

Step (c): The TRP 1 or the TRP 2 selects one or more appropriate precoders from the SRS precoders, and delivers the one or more appropriate precoders by using indication information, for example, an SRI. As shown in FIG. 25, a sounding reference signal resource indicator SRI={1, 3} indicates a precoder 1 (precoder 1) corresponding to an SRS resource 1 and a precoder 3 (precoder 3) corresponding to an SRS resource 3.

Step (d): The UE sends, based on the indication information, a PUSCH by using the one or more precoders.

Still as shown in FIG. 25, the precoder and a rank are selected based on the SRI to send the PUSCH. For example, if an SRI field indicates the SRS resources 1 and 3, the UE separately sends the PUSCH by using the precoder 1 and the precoder 3 corresponding to the SRS resources 1 and 3.

That the SRI field indicates the plurality of precoders includes: The precoders are jointly indicated by one SRI in the SRI field, or the precoders are independently indicated by a plurality of SRIs in the SRI field. A specific implementation thereof is as described in Embodiment 1. Details are not described herein again.

Embodiment 7

Figure 26:
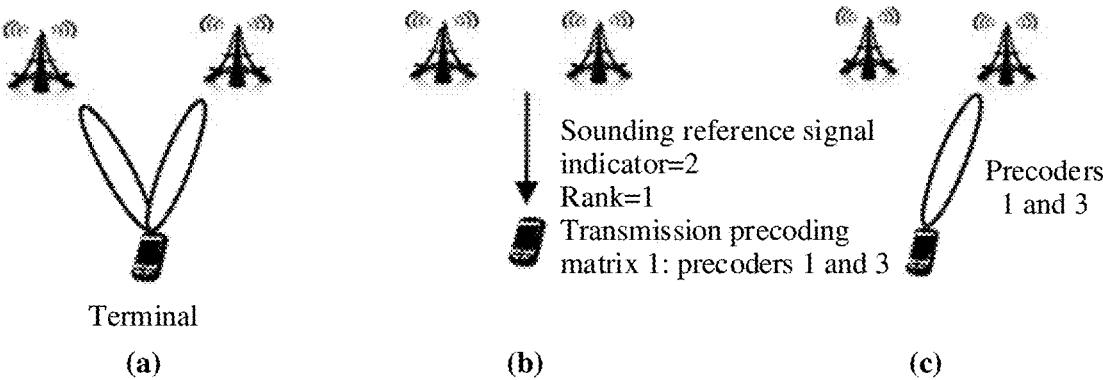
FIG. 26 is a schematic diagram of PUSCH joint reception in a CB scheme according to an embodiment of this application.

In this embodiment, a main procedure of PUSCH joint reception in a CB scheme, as shown in FIG. 26, is mainly described.

Step (a): UE respectively sends SRSs, for example, two SRSs shown in FIG. 26, or more than two SRSs, for example, four SRSs, to a TRP 1 and a TRP 2 by using a plurality of SRS resources.

Step (b): The TRP performs joint channel measurement based on the SRSs, selects appropriate precoders and a quantity of ranks based on a measurement result, and delivers the appropriate precoders and the quantity of ranks to the UE by using DCI. The TRP sends, to the UE, indication information indicating the plurality of precoders. The indication information is configured as different QCL relationships or different TCI states, that is, the different precoders correspond to different TRPs. The indication information is configured as different QCL relationships or different TCI states by configuring different QCL relationships or different TCI states in another field in the DCI in which the indication information is located. For example, a plurality of TCI states may be configured in a TCI field in the DCI, to indicate that different precoders indicated by a TPMI field included in the DCI correspond to different TRPs.

Step (c): The UE obtains indexes of the plurality of precoders and a quantity of actually transmitted uplink ranks based on an SRI, a TRI, or a TPMI in the DCI, to send a PUSCH. For example, as shown in FIG. 26, a TPMI 1 indicates a precoder 1, and a TPMI 2 indicates a precoder 3. That is, the UE sends the PUSCH by using the precoder 1 and the precoder 3.

In this embodiment, it is assumed that a plurality of uplink transmission channel matrices may be combined into an uplink transmission channel matrix of a larger dimension. Specifically, a network device determines the precoders through joint channel measurement, so that PUSCH joint reception in a multi-station scenario is implemented, received uplink signals are combined to improve uplink decoding performance, and transmission reliability is improved.

The foregoing separately describes implementation processes of PUSCH repetition transmission and joint reception. In some scenarios, PUSCH repetition transmission and joint reception may be combined to further improve uplink transmission reliability.

Embodiment 8

The foregoing Embodiment 5, Embodiment 6, and Embodiment 7 separately describe the joint reception technical solution. Based on this, the joint reception technical solution may be combined with the foregoing repetition transmission solution, that is, a PUSCH is repeatedly transmitted in a joint reception scenario.

First, UE is configured by using RRC signaling. The UE may be configured to be in the CB uplink transmission scheme or the NCB uplink transmission scheme described in the foregoing embodiment. When RRC signaling received by the UE is "Codebook", the UE is configured to be in the CB uplink transmission scheme. When RRC signaling received by the UE is "NonCodebook", the UE is configured to be in the NCB uplink transmission scheme.

After receiving the RRC signaling, the UE may perform PUSCH joint reception in the NCB scheme according to the technical solution in the foregoing Embodiment 6, or perform PUSCH joint reception in the CB scheme according to the technical solution in the foregoing Embodiment 7. On this basis, a PUSCH sent by the UE to a TRP may be repeatedly transmitted. Specifically, after selecting a precoder based on indication information, the UE may repeatedly send the PUSCH by using the precoder. One precoder or a plurality of different precoders may be used for PUSCH repetition transmission.

That the UE repeatedly transmits the PUSCH by using one precoder is specifically: The UE repeatedly sends the plurality of PUSCHs on a same time domain resource or different time domain resources by using one precoder; the UE sends the plurality of PUSCHs on a same frequency domain resource or different frequency domain resources by using one precoder; or the UE sends the plurality of PUSCHs by using a same port or different ports by using one precoder. Specifically, FIG. 25 is used as an example. In a joint reception NCB scenario, the UE selects a precoder 1 (a precoder 1 in the figure) and a precoder 3 (a precoder 3 in the figure) based on indication information, and then uses the precoder 1 to send a PUSCH-A and uses a precoder 2 to send a PUSCH-B. In this case, the UE may select one precoder to perform repetition transmission, for example, use the precoder 1 to repeatedly send the PUSCH-A, and use the precoder 3 to repeatedly send the PUSCH-B. Therefore, based on the joint reception, uplink transmission reliability is further improved.

When the UE repeatedly transmits the PUSCH by using a plurality of different precoders, it is equivalent to combining the foregoing joint reception technical solution and the repetition transmission technical solutions in Embodiment 2 to Embodiment 4 of this application. Still using FIG. 25 as an example, in a joint reception NCB scenario, the UE selects a precoder 1 (a precoder 1 in the figure) and a precoder 3 (a precoder 3 in the figure) based on indication information, and then sends a PUSCH-A by using the precoder 1 and sends a PUSCH-B is sent by using a precoder 2. In this case, the UE may choose to repeatedly send the PUSCH by using the plurality of precoders. For example, the PUSCH-A is repeatedly sent by using the precoder 1 and the precoder 3, and the PUSCH-B is repeatedly sent by using the precoder 1 and the precoder 3.

Certainly, in another implementation, two precoders used to repeatedly send the PUSCH-A may be different from two precoders used to repeatedly send the PUSCH-B. Different from an existing slot aggregation transmission manner in which only a single same precoder can be used, the UE receives indication information indicating a plurality of precoders according to the repetition transmission technical solutions in Embodiment 2 to Embodiment 4, and uses the plurality of different precoders. All the plurality of precoders are selected through joint channel measurement, to obtain a diversity gain. In addition, when the terminal moves to different cell coverage areas, transmission decoding performance can also be ensured, and uplink transmission reliability is improved.

In this embodiment, the UE sends the PUSCH by using a same port or different plurality of ports (ports), a same or different time domain resources, or a same or different frequency domain resources. This is the same as that in Embodiment 3 and Embodiment 4. Details are not described herein.

In the foregoing embodiments provided in this application, the methods provided in embodiments of this application are separately described from perspectives of the network device, the terminal device, and interaction between the network device and the terminal device. To implement functions in the foregoing methods provided in embodiments of this application, the network device and the terminal device may include a hardware structure and a software module, and implement the foregoing functions in a form of the hardware structure, the software module, or a combination of the hardware structure and the software module. One of the foregoing functions may be performed in a form of a hardware structure, a software module, or a combination of the hardware structure and the software module.

Figure 27:
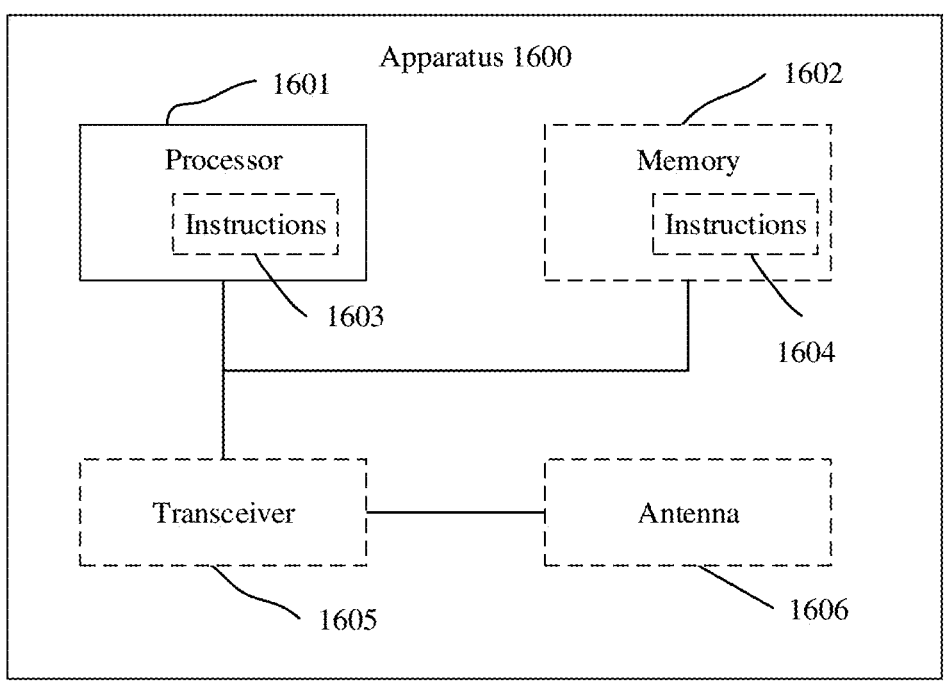
FIG. 27 is a schematic diagram of a structure of an apparatus according to an embodiment of this application.

FIG. 27 is a schematic diagram of a structure of an apparatus according to an embodiment of this application. The apparatus may be configured to implement the methods described in the foregoing Embodiment 1 to Embodiment 8. For details, refer to the descriptions in the foregoing Embodiment 1 to Embodiment 8.

The apparatus may include one or more processors 1601. The processor 1601 may also be referred to as a processing unit, and can implement a function of the network device or the terminal device in the method provided in embodiments of this application. The processor 1601 may be a general-purpose processor, a special-purpose processor, or the like.

In an optional design, the processor 1601 may alternatively store instructions and/or data 1603, and the instructions and/or data 1603 may be run by the processor, to enable the apparatus 1600 to perform the method described in the foregoing method embodiments.

In another optional design, the processor 1601 may include a communication unit configured to implement receiving and sending functions. For example, the communication unit may be a communication interface, a transceiver circuit, an interface, or an interface circuit. The processor 1601 may implement, by using the communication unit, the method performed by the network device or the method performed by the terminal device in the methods provided in embodiments of this application.

Optionally, the apparatus 1600 may include one or more memories 1602, and the one or more memories 1602 may store instructions 1604. The instructions may be run on the processor, to enable the apparatus 1600 to perform the method described in the foregoing method embodiments. Optionally, the memory may further store data. Optionally, the processor may alternatively store instructions and/or data. The processor and the memory may be separately disposed, or may be integrated together.

Optionally, the apparatus 1600 may further include a transceiver 1605 and an antenna 1606. The processor 1601 may be referred to as a processing unit, and control the apparatus 1600. The transceiver 1605 may be referred to as a communication interface, a communication unit, a transceiver machine, a transceiver circuit, a transceiver, or the like, and is configured to implement receiving and sending functions.

The apparatus may be a terminal device; or may be a component (for example, an integrated circuit or a chip) of a terminal device.

In a possible design, an apparatus 1600 (for example, an integrated circuit, a wireless device, a circuit module, or a terminal device) may include:

a transceiver 1605, configured to receive indication information indicating a plurality of precoders; and a processor 1601, configured to determine the plurality of precoders based on the indication information, where the transceiver 1605 is further configured to repeatedly send a PUSCH based on the precoders determined by the processor, where precoders used for at least two of the PUSCHs are different.

In an implementation, a plurality of SRS resources configured by the processor 1601 may be a plurality of SRS resources in one SRS resource set, or may be a plurality of SRS resources in a plurality of SRS resource sets.

In an implementation, the transceiver 1605 may send the PUSCHs by using a same time domain resource, or may send the PUSCHs by using different time domain resources.

To be specific, the transceiver may send the PUSCHs at different time domain positions, where the different time domain positions may be different slots, consecutive slots, or different time domain symbols in a same slot.

In an implementation, the transceiver 1605 may send the PUSCHs by using a same port, or may send the PUSCHs by using different ports, where the port may be an SRS port for sending an SRS, or may be a port for sending a PUSCH.

In an implementation, the transceiver 1605 may send the PUSCHs by using a same frequency domain resource, or may send the PUSCHs by using different frequency domain resources, where the frequency domain resources may be consecutive or inconsecutive.

In an implementation, the processor 1605 can further combine soft information of the plurality of PUSCHs, to simultaneously demodulate the plurality of PUSCHs, and combine and decode demodulated soft information, so as to improve a probability of correct uplink decoding.

The apparatus 1600 provided in this embodiment can implement the technical effects that can be obtained by using the method in any one of Embodiment 1 to Embodiment 4. For details, refer to the descriptions in Embodiment 1 to Embodiment 4. Details are not described herein again.

In another possible design, an apparatus 1600 (for example, an integrated circuit, a wireless device, a circuit module, or a terminal device) may include:

a transceiver 1605, configured to receive a plurality of CSI-RSs; and a processor 1601, configured to perform joint channel measurement based on the plurality of received CSI-RSs, to obtain one or more SRS precoders, where the processor 1601 is further configured to configure a plurality of SRS resources based on the SRS precoder;

the transceiver 1605 is further configured to send a plurality of SRSs on the plurality of SRS resources;

the transceiver 1605 is further configured to receive indication information indicating one or more precoders;

the processor 1601 is further configured to determine the one or more precoders based on the indication information; and the transceiver 1605 is further configured to send a PUSCH based on the one or more precoders determined by the processor.

The plurality of CSI-RSs are configured as different QCL relationships. In other words, the plurality of CSI-RSs are CSI-RSs from different network devices.

In an implementation, the processor 1601 separately configures the plurality of SRS resources based on the SRS precoder obtained by performing joint channel measurement based on the plurality of CSI-RSs. In other words, the plurality of SRS resources respectively correspond to the plurality of CSI-RSs.

In an implementation, the plurality of SRS resources configured by the processor 1601 may be a plurality of SRS resources in one SRS resource set, or may be a plurality of SRS resources in a plurality of SRS resource sets. In an implementation, at least two of the plurality of precoders received by the transceiver 1605 are different. In other words, precoders used for the at least two of the PUSCHs sent by the transceiver 1605 are different.

According to this technical solution, on a basis that the processor 1601 performs joint channel measurement on the plurality of CSI-RSs to obtain the SRS precoder, to provide a condition for the network device to jointly receive the plurality of PUSCHs, different PUSCHs sent to different network devices may be repeatedly transmitted by using different precoders, so that uplink transmission reliability can be further improved.

In an implementation, the plurality of precoders received by the transceiver 1605 are selected by the network device from the plurality of SRS precoders and indicated by using an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, the processor 1601 can further combine soft information of the plurality of PUSCHs, to simultaneously demodulate the plurality of PUSCHs, and combine and decode demodulated soft information, so as to improve a probability of correct uplink decoding.

The apparatus 1600 provided in this embodiment can implement the technical effects that can be obtained by using the method in Embodiment 6. For details, refer to the descriptions in Embodiment 6. Details are not described herein again.

Alternatively, the apparatus 1600 may be a network device; or may be a component (for example, an integrated circuit or a chip) of the network device. Alternatively, the apparatus may be another communication unit, configured to implement the method in embodiments of this application.

In a possible design, an apparatus 1600 (for example, a network device, a base station, or a baseband chip) may include:

a transceiver 1605, configured to send a plurality of CSI-RSs, where the transceiver 1605 is configured to receive a plurality of SRSs, where the plurality of SRSs correspond to a plurality of SRS precoders obtained by performing channel measurement based on the CSI-RSs, that is, the plurality of SRSs correspond to the plurality of SRS precoders, and the plurality of SRSs are obtained by performing channel measurement based on the CSI-RSs; and a processor 1601, configured to select a plurality of precoders from the plurality of SRS precoders based on the SRSs, where the transceiver 1605 is configured to send indication information indicating the plurality of precoders.

The plurality of CSI-RSs are configured as different QCL relationships. In other words, the plurality of CSI-RSs are CSI-RSs from different network devices.

In an implementation, the indication information that is delivered by the transceiver 1605 and that indicates the plurality of precoders is an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, the transceiver 1605 may further receive a plurality of repeatedly sent PUSCHs, and precoders used for at least two of the PUSCHs are different.

In an implementation, the processor 1601 can further combine soft information of the plurality of PUSCHs, to simultaneously demodulate the plurality of PUSCHs, and combine and decode demodulated soft information, so as to improve a probability of correct uplink decoding.

The apparatus 1600 provided in this embodiment can implement the technical effects that can be obtained by using the method in Embodiment 3. For details, refer to the descriptions in Embodiment 3. Details are not described herein again.

In another possible design, an apparatus 1600 (for example, a network device, a base station, or a baseband chip) may include:

a transceiver 1605, configured to receive a plurality of SRSs; and a processor 1601, configured to: obtain uplink channel states by performing measurement based on the plurality of received SRSs, and select a plurality of precoders based on the uplink channel states, where the transceiver 1605 is configured to send indication information indicating the plurality of precoders.

In an implementation, the indication information is configured as different QCL relationships or TCI states. That is, the different precoders correspond to different network devices.

In an implementation, the indication information that is delivered by the transceiver 1605 and that indicates the plurality of precoders is a TPMI field. The TPMI field includes a plurality of TPMIs, and each TPMI corresponds to one precoder; or the plurality of precoders are separately indicated by one TPMI in the TPMI field, and each TPMI corresponds to a plurality of precoders. The plurality of precoders indicated by the TPMI field are respectively determined based on different channel matrices. There are a plurality of implementations in which the TPMI field includes the plurality of TPMIs. For example, a quantity of bits in the TPMI field is increased, so that the quantity of bits in the TPMI field can simultaneously indicate the plurality of TPMIs; a reserved index (index) in a TPMI table (table) is used, so that the reserved index can indicate the plurality of TPMIs; or a new TPMI table is used, so that the TPMI table includes an index (index) that indicates the plurality of TPMIs. In an implementation, the transceiver 1605 may further receive a plurality of repeatedly sent PUSCHs, and precoders used for at least two of the PUSCHs are different.

In an implementation, the processor 1601 combines soft information of the plurality of PUSCHs, to simultaneously demodulate the plurality of PUSCHs, and combines and decodes demodulated soft information, so as to improve a probability of correct uplink decoding.

The apparatus 1600 provided in this embodiment can implement the technical effects that can be obtained by using the method in Embodiment 4. For details, refer to the descriptions in Embodiment 4. Details are not described herein again.

In a possible design, an apparatus 1600 (for example, a network device, a base station, or a baseband chip) may include:

a transceiver 1605, configured to send CSI-RSs, where the transceiver 1605 is configured to receive a plurality of SRSs, where the plurality of SRSs correspond to SRS precoders obtained by performing joint channel measurement based on the CSI-RSs; and a processor 1601, configured to select one or more precoders from the plurality of SRS precoders based on the plurality of SRSs, where the transceiver 1605 is configured to send indication information indicating the one or more precoders.

The plurality of CSI-RSs are configured as different QCL relationships, to indicate that the CSI-RSs are from different network devices.

In an implementation, the indication information that is delivered by the transceiver 1605 and that indicates the plurality of precoders is an SRI field. The plurality of precoders may be jointly indicated by using one SRI in the SRI field, to be specific, all the selected precoders are indicated by using the SRI; or may be independently indicated by using a plurality of SRIs in the SRI field, to be specific, different SRIs are used to indicate different precoders selected based on different CSI-RSs.

In an implementation, at least two of the plurality of precoders received by the transceiver 1605 are different. In other words, precoders used for at least two of PUSCHs sent by the transceiver 1605 are different.

In an implementation, the transceiver 1605 may receive the PUSCHs repeatedly sent by using the precoders.

According to this technical solution, on a basis that the processor 1601 performs joint channel measurement on the plurality of CSI-RSs to obtain the SRS precoders, to provide a condition for the processor 1601 to jointly receive the plurality of PUSCHs, different PUSCHs sent to different processors 1601 may be repeatedly transmitted by using different precoders, so that uplink transmission reliability can be further improved.

In an implementation, the processor 1601 can further combine soft information of the plurality of PUSCHs, to simultaneously demodulate the plurality of PUSCHs, and combine and decode demodulated soft information, so as to improve a probability of correct uplink decoding.

The apparatus 1600 provided in this embodiment can implement the technical effects that can be obtained by using the method in Embodiment 6 and Embodiment 8. For details, refer to the descriptions in Embodiment 6 and Embodiment 8. Details are not described herein again.

In another possible design, an apparatus 1600 (for example, a network device, a base station, or a baseband chip) may include:

a transceiver 1605, configured to receive a plurality of SRSs; and a processor 1601, configured to perform joint channel measurement based on the plurality of SRSs, where the processor 1601 is configured to select one or more precoders based on a joint channel measurement result, and the transceiver 1605 is configured to send indication information indicating the one or more precoders.

In an implementation, the processor 1601 performs joint channel measurement based on the plurality of SRSs to obtain an uplink joint channel state, selects the appropriate precoder, and sends the indication information to a terminal. The indication information is configured as different QCL relationships or different TCI states. In other words, the indication information indicating the plurality of precoders may be delivered to the terminal through one interface, or may be separately delivered to the terminal through a plurality of interfaces.

In an implementation, at least two of the plurality of precoders received by the transceiver 1605 are different.

In an implementation, the transceiver 1605 may receive a PUSCH repeatedly sent by using the precoders.

In an implementation, the processor 1601 can further combine soft information of the plurality of PUSCHs, to simultaneously demodulate the plurality of PUSCHs, and combine and decode demodulated soft information, so as to improve a probability of correct uplink decoding.

The apparatus 1600 provided in this embodiment can implement the technical effects that can be obtained by using the method in Embodiment 7 and Embodiment 8. For details, refer to the descriptions in Embodiment 7 and Embodiment 8. Details are not described herein again.

Figure 28:
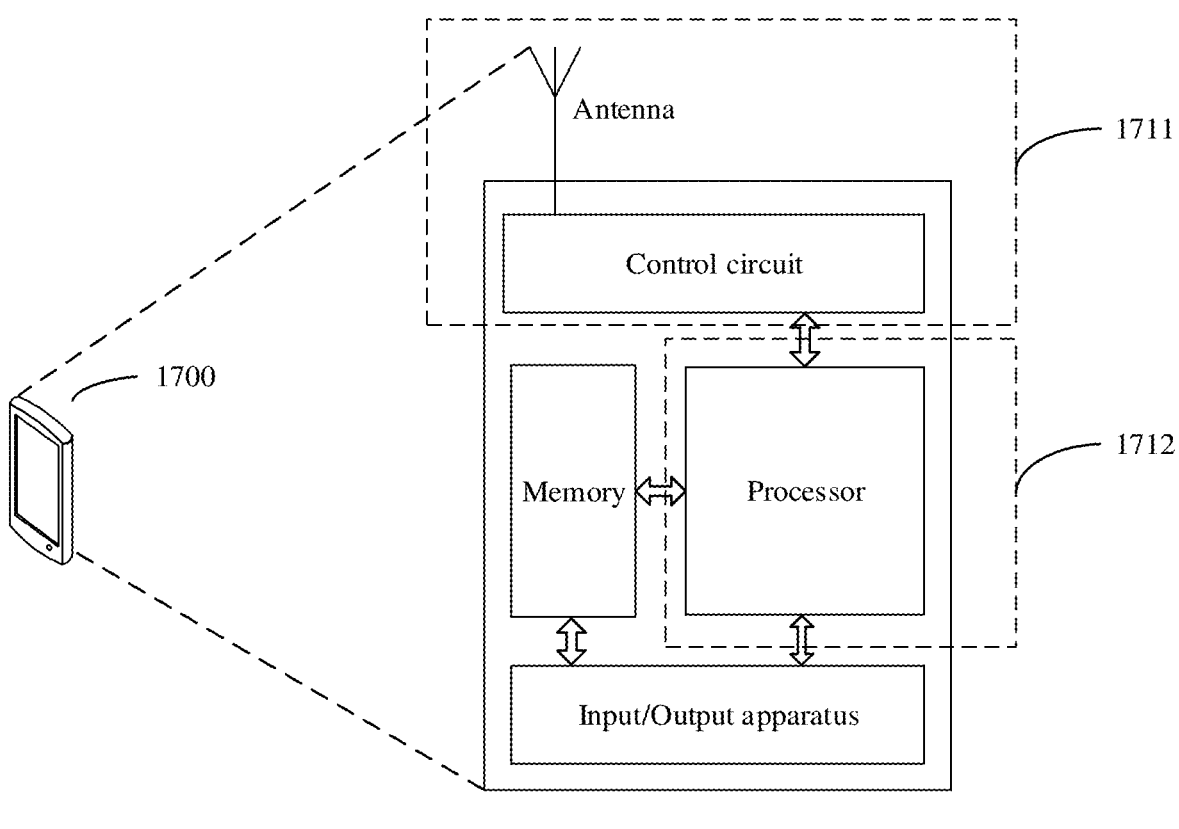
FIG. 28 is a schematic diagram of a structure of a terminal device according to an embodiment of this application.

FIG. 28 is a schematic diagram of a structure of a terminal device. The terminal device is applicable to any scenario shown in embodiments of this application. For ease of description, FIG. 28 shows only main components of the terminal device. As shown in FIG. 28, the terminal device includes a processor, a memory, a control circuit, an antenna, and an input/output apparatus. The processor is mainly configured to process a communication protocol and communication data, control the entire terminal, execute a software program, and process data of the software program. The memory is configured to store the software program and the data. The radio frequency circuit is mainly configured to perform conversion between a baseband signal and a radio frequency signal, and process the radio frequency signal. The antenna is mainly configured to send and receive radio frequency signals in a form of an electromagnetic wave. The input/output apparatus, for example, a touchscreen, a display, a keyboard, is mainly configured to: receive data entered by a user and output data to the user.

After the terminal device is powered on, the processor may read a software program in a storage unit, parse and execute instructions of the software program, and process data of the software program. When data needs to be sent in a wireless manner, the processor performs baseband processing on the to-be-sent data, and outputs a baseband signal to the radio frequency circuit. The radio frequency circuit processes the baseband signal to obtain a radio frequency signal, and sends the radio frequency signal to the outside in an electromagnetic wave form by using the antenna. When data is sent to the terminal device, the radio frequency circuit receives a radio frequency signal through the antenna, further converts the radio frequency signal into a baseband signal, and outputs the baseband signal to the processor. The processor converts the baseband signal into data, and processes the data.

For ease of description, FIG. 28 shows only one memory and one processor. In an actual terminal device, there may be a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process a communication protocol and communication data. The central processing unit is mainly configured to control the entire terminal device, execute software program, and process data of the software program. A person skilled in the art can understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a software program form, where the processor executes a software program to implement a baseband processing function.

In an example, the antenna and the control circuit that have receiving and sending functions may be considered as a communication unit 1711 of the terminal device, and the processor having a processing function may be considered as a processing unit 1712 of the terminal device. As shown in FIG. 28, the terminal device includes the communication unit 1711 and the processing unit 1712. The communication unit may also be referred to as a transceiver, a transceiver machine, a transceiver apparatus, or the like. Optionally, a component that is in the communication unit 1711 and that is configured to implement the receiving function may be considered as a receiving unit, and a component that is in the communication unit 1711 and that is configured to implement the sending function may be considered as a sending unit. That is, the communication unit 1711 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like. Optionally, the receiving unit and the sending unit may be one integrated unit, or may be a plurality of independent units. The receiving unit and the sending unit may be in one geographical position, or may be distributed in a plurality of geographical positions.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, or may be any conventional processor or the like. The steps of the method disclosed with reference to this embodiment of this application may be directly performed by a hardware processor, or may be performed by using a combination of hardware in the processor and a software module.

In embodiments of this application, the memory may be a nonvolatile memory, such as a hard disk drive (hard disk drive, HDD) or a solid-state drive (solid-state drive, SSD), or may be a volatile memory (volatile memory), such as a random access memory (random access memory, RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, all or some of the procedures or functions according to embodiments of this application are generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid-state disk, SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method of transmitting data on a physical uplink shared channel (PUSCH), wherein the method comprises:

receiving, by a terminal, indication information indicating a plurality of precoders;

determining, by the terminal based on the indication information, the plurality of precoders; and repeatedly sending, by the terminal, a PUSCH a plurality of times using the plurality of precoders, wherein the precoders used for at least two of the plurality of times of sending the PUSCH are different, wherein, before the receiving, the method further comprises:

performing, by the terminal, channel measurement based on a plurality of received channel state information reference signals (CSI-RSs), to respectively obtain a plurality of sounding reference signal (SRS) precoders;

configuring, by the terminal, a plurality of SRS resources based on the plurality of SRS precoders; and sending, by the terminal, a plurality of SRSs using the plurality of SRS resources.

2. The method according to claim 1, wherein, in the configuring, the plurality of SRS resources are respectively configured based on the plurality of SRS precoders obtained by performing the channel measurement based on the plurality of CSI-RSs.

3. The method according to claim 1, wherein the plurality of precoders are indicated by a sounding reference signal resource indicator (SRI) field, and the plurality of precoders are jointly indicated by one SRI in the SRI field; or the plurality of precoders are independently indicated by a plurality of SRIs in the SRI field.

4. The method according to claim 2, wherein the plurality of precoders are respectively indicated, in a transmission precoding matrix indicator (TPMI) field, by a plurality of TPMIs, and each TPMI among the plurality of TPMIs corresponds to one precoder among the plurality of precoders; or the plurality of precoders are separately indicated by one TPMI in a TPMI field, and the one TPMI corresponds to the plurality of precoders.

5. The method according to claim 1, wherein the plurality of SRS resources configured by the terminal are SRS resources in one SRS resource set, or SRS resources in a plurality of SRS resource sets.

6. The method according to claim 1, wherein, in the repeatedly sending, the PUSCH is sent by using a same time domain resource, but with different ports or different frequency domain resources, or by using a same port, but with different frequency domain resources or different time domain resources, or by using a same frequency domain resource, but with different ports or different time domain resources.

7. The method according to claim 1, wherein the performing comprises:

performing, by the terminal, the channel measurement on the plurality of received CSI-RSs to respectively obtain a plurality of channel matrices; and respective selecting, by the terminal, the plurality of SRS precoders based on the plurality of channel matrices.

8. A terminal, comprising:

a transceiver, configured to receive indication information indicating a plurality of precoders; and a processor, configured to determine the plurality of precoders based on the indication information, wherein the transceiver is further configured to repeatedly send a physical uplink shared channel PUSCH) a plurality of times based on the plurality of precoders determined by the processor, wherein the precoders used for at least two of the plurality of times of sending the PUSCH are different;

the transceiver is further configured to receive a plurality of channel state information reference signals (CSI-RSs);

the processor is further configured to perform channel measurement based on the plurality of received CSI-RSs, to respectively obtain a plurality of sounding reference signal (SRS) precoders;

the processor is further configured to configure a plurality of SRS resources based on the plurality of SRS precoders; and the transceiver is further configured to send a plurality of SRSs on the plurality of SRS resources.

9. The terminal according to claim 8, wherein the processor is configured to respectively configure the plurality of SRS resources based on the plurality of SRS precoders obtained by performing the channel measurement based on the plurality of CSI-RSs.

10. The terminal according to claim 8, wherein the plurality of precoders are indicated by a sounding reference signal resource indicator (SRI) field, and the plurality of precoders are jointly indicated by one SRI in the SRI field; or the plurality of precoders are independently indicated by a plurality of SRIs in the SRI field.

11. The terminal according to claim 8, wherein the plurality of precoders are respectively indicated, in a transmission precoding matrix indicator (TPMI) field, by a plurality of TPMIs, and each TPMI among the plurality of TPMIs corresponds to one precoder among the plurality of precoders; or the plurality of precoders are separately indicated by one TPMI in a TPMI field, and the one TPMI corresponds to the plurality of precoders.

12. The terminal according to claim 8, wherein the plurality of SRS resources configured by the processor are SRS resources in one SRS resource set, or SRS resources in a plurality of SRS resource sets.

13. The terminal according to claim 8, wherein
the transceiver is further configured to repeatedly send the PUSCH
by using a same time domain resource, but with different ports or different frequency domain resources, or
by using a same port, but with different frequency domain resources or different time domain resources, or
by using a same frequency domain resource, but with different ports or different time domain resources.

14. The terminal according to claim 8, wherein the processor is configured to:
perform the channel measurement on the plurality of received CSI-RSs to respectively obtain a plurality of channel matrices and
respective select the plurality of SRS precoders based on the plurality of channel matrices.

15. A non-transitory computer-readable storage medium storing computer instructions executable by a processor to enable a terminal to perform a method of transmitting data on a physical uplink shared channel (PUSCH), wherein the method comprises:
receiving, by the terminal, indication information indicating a plurality of precoders;
determining, by the terminal based on the indication information, the plurality of precoders; and
repeatedly sending, by the terminal, a PUSCH a plurality of times using the plurality of precoders, wherein the precoders used for at least two of the plurality of times of sending the PUSCH are different,
wherein, before the receiving, the method further comprises:
performing, by the terminal, channel measurement based on a plurality of received channel state information reference signals (CSI-RSs), to respectively obtain a plurality of sounding reference signal (SRS) precoders;

configuring, by the terminal, a plurality of SRS resources based on the plurality of SRS precoders; and
sending, by the terminal, a plurality of SRSs using the plurality of SRS resources.

16. The non-transitory computer-readable storage medium according to claim 15, wherein, in the configuring, the plurality of SRS resources are respectively configured based on the plurality of SRS precoders obtained by performing the channel measurement based on the plurality of CSI-RSs.

17. The non-transitory computer-readable storage medium according to claim 15, wherein the plurality of precoders are indicated by a sounding reference signal resource indicator (SRI) field, and
the plurality of precoders are jointly indicated by one SRI in the SRI field; or
the plurality of precoders are independently indicated by a plurality of SRIs in the SRI field.

18. The non-transitory computer-readable storage medium according to claim 15, wherein
the plurality of precoders are respectively indicated, in a transmission precoding matrix indicator (TPMI) field, by a plurality of TPMIs, and each TPMI among the plurality of TPMIs corresponds to one precoder among the plurality of precoders; or
the plurality of precoders are separately indicated by one TPMI in a TPMI field, and the one TPMI corresponds to the plurality of precoders.

19. The non-transitory computer-readable storage medium according to claim 15, wherein the plurality of SRS resources configured by the terminal are SRS resources in one SRS resource set, or SRS resources in a plurality of SRS resource sets.

20. The non-transitory computer-readable storage medium according to claim 15, wherein the performing comprises:
performing, by the terminal, the channel measurement on the plurality of received CSI-RSs to respectively obtain a plurality of channel matrices; and
respective selecting, by the terminal, the plurality of SRS precoders based on the plurality of channel matrices.

* * * * *